(12) United States Patent
Stites et al.

(10) Patent No.: US 10,780,330 B2
(45) Date of Patent: Sep. 22, 2020

(54) GOLF CLUB AND GOLF CLUB HEAD STRUCTURES

(71) Applicant: Karsten Manufacturing Corporation, Phoenix, AZ (US)

(72) Inventors: John T. Stites, Salisaw, OK (US); Yoshimasa Fujita, Ping-Tung Hsien (TW)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

(21) Appl. No.: 16/509,415

(22) Filed: Jul. 11, 2019

(65) Prior Publication Data

US 2019/0344134 A1    Nov. 14, 2019

Related U.S. Application Data

(63) Continuation of application No. 15/975,676, filed on May 9, 2018, now Pat. No. 10,363,465, which is a
(Continued)

(51) Int. Cl.
*A63B 53/04*    (2015.01)
*A63B 53/06*    (2015.01)
(Continued)

(52) U.S. Cl.
CPC .......... *A63B 53/06* (2013.01); *A63B 53/0466* (2013.01); *A63B 69/3632* (2013.01); *A63B 69/3685* (2013.01); *A63B 71/0619* (2013.01); *A63B 71/0622* (2013.01); *G06F 3/0346* (2013.01); *A63B 24/0062* (2013.01); *A63B 53/10* (2013.01); *A63B 53/14* (2013.01); *A63B 60/42* (2015.10); *A63B 60/52* (2015.10); *A63B 2053/0433* (2013.01);
(Continued)

(58) Field of Classification Search
CPC .... A63B 2053/0433; A63B 2053/0437; A63B 53/0466
USPC .................................................. 473/324–350
See application file for complete search history.

(56) References Cited

U.S. PATENT DOCUMENTS 1,133,129 A    3/1915  Govan
1,518,316 A *  12/1924 Ellingham ......... A63B 53/0487
                                                473/337
(Continued)

FOREIGN PATENT DOCUMENTS

EP    101426 A2 *   2/1984
EP    2377586      10/2011
(Continued)

OTHER PUBLICATIONS

Aug. 14, 2013—(WO) International Search Report and Written Opinion—App. PCT/US2013/025615.
(Continued)

*Primary Examiner* — Alvin A Hunter

(57) ABSTRACT

A golf club head has a body defining a ball striking face. The body further has a first leg extending away from the ball striking face and a second leg extending away from the ball striking face wherein a void is defined between the first leg and the second leg. The body further defines a cover that extends over the void. The golf club head may further have support structures and adjustable weight members.

20 Claims, 47 Drawing Sheets

Related U.S. Application Data continuation of application No. 15/075,985, filed on Mar. 21, 2016, now Pat. No. 10,130,854, which is a continuation of application No. 14/180,134, filed on Feb. 13, 2014, now Pat. No. 9,289,661, and a continuation of application No. 13/593,277, filed on Aug. 23, 2012, now Pat. No. 9,192,831, which is a continuation-in-part of application No. 13/250,051, filed on Sep. 30, 2011, now Pat. No. 8,668,595, and a continuation-in-part of application No. 12/723,951, filed on Mar. 15, 2010, now abandoned, which is a continuation-in-part of application No. 12/356,176, filed on Jan. 20, 2009, now Pat. No. 7,922,603.

(60) Provisional application No. 61/910,924, filed on Dec. 2, 2013, provisional application No. 61/598,832, filed on Feb. 14, 2012, provisional application No. 61/526,326, filed on Aug. 23, 2011, provisional application No. 61/480,322, filed on Apr. 28, 2011.

(51) Int. Cl.

| | | |
|---|---|---|
| *A63B 69/36* | (2006.01) | |
| *A63B 71/06* | (2006.01) | |
| *G06F 3/0346* | (2013.01) | |
| *A63B 60/52* | (2015.01) | |
| *A63B 60/00* | (2015.01) | |
| *A63B 60/42* | (2015.01) | |
| *A63B 24/00* | (2006.01) | |
| *A63B 53/10* | (2015.01) | |
| *A63B 53/14* | (2015.01) | |

(52) U.S. Cl.
CPC .......... *A63B 2053/0437* (2013.01); *A63B 2053/0491* (2013.01); *A63B 2060/002* (2015.10); *A63B 2071/0647* (2013.01); *A63B 2209/00* (2013.01); *A63B 2220/16* (2013.01); *A63B 2220/30* (2013.01); *A63B 2220/40* (2013.01); *A63B 2220/53* (2013.01); *A63B 2220/803* (2013.01); *A63B 2220/833* (2013.01); *A63B 2225/15* (2013.01); *A63B 2225/20* (2013.01); *A63B 2225/50* (2013.01)

(56) References Cited

U.S. PATENT DOCUMENTS

| | | | | |
|---|---|---|---|---|
| 1,697,998 | A | | 1/1929 | Novak et al. |
| 1,840,924 | A | | 1/1932 | Tucker |
| 2,004,968 | A | | 6/1935 | Young |
| 2,041,676 | A | | 5/1936 | Gallagher |
| 3,064,980 | A | * | 11/1962 | Steiner .............. A63B 53/0466 473/335 |
| 3,084,940 | A | | 4/1963 | Cissel |
| 3,212,783 | A | | 10/1965 | Bradley |
| 3,606,327 | A | | 9/1971 | Gorman |
| 3,652,094 | A | * | 3/1972 | Glover .................. A63B 53/08 473/337 |
| 3,966,210 | A | * | 6/1976 | Rozmus ............. A63B 53/0487 473/341 |
| 3,976,299 | A | * | 8/1976 | Lawrence ............... A63B 53/04 473/327 |
| 3,980,301 | A | | 9/1976 | Smith |
| 4,052,075 | A | * | 10/1977 | Daly ..................... A63B 53/08 473/338 |
| 4,313,607 | A | | 2/1982 | Thompson |
| 4,423,874 | A | * | 1/1984 | Stuff, Jr. ............. A63B 69/3685 473/338 |
| 4,431,192 | A | | 2/1984 | Stuff, Jr. |
| 4,444,392 | A | | 4/1984 | Duclos |
| 4,535,990 | A | | 8/1985 | Yamada |
| 4,650,191 | A | * | 3/1987 | Mills .................. A63B 69/3632 473/341 |
| 4,655,459 | A | * | 4/1987 | Antonious ......... A63B 53/0487 473/338 |
| 4,667,963 | A | | 5/1987 | Yoneyama |
| 4,811,949 | A | * | 3/1989 | Kobayashi ............ A63B 53/04 473/337 |
| 4,867,458 | A | * | 9/1989 | Sumikawa ............. A63B 53/04 473/336 |
| 5,013,041 | A | * | 5/1991 | Sun ....................... A63B 53/04 473/252 |
| 5,067,715 | A | | 11/1991 | Schmidt et al. |
| 5,186,465 | A | * | 2/1993 | Chorne .................. A63B 53/04 473/350 |
| 5,316,305 | A | | 5/1994 | McCabe |
| D354,103 | S | * | 1/1995 | Allen .......................... D21/752 |
| 5,380,010 | A | | 1/1995 | Werner et al. |
| 5,388,827 | A | * | 2/1995 | Reynolds, Jr. ......... A63B 53/02 473/306 |
| 5,451,056 | A | | 9/1995 | Manning |
| D363,749 | S | * | 10/1995 | Kenmi ........................ D21/752 |
| 5,464,217 | A | * | 11/1995 | Shenoha ................ A63B 53/04 473/350 |
| 5,497,995 | A | * | 3/1996 | Swisshelm ............. A63B 53/04 473/350 |
| 5,501,453 | A | * | 3/1996 | Hurst ..................... A63B 53/06 473/242 |
| 5,518,243 | A | | 5/1996 | Redman |
| 5,547,427 | A | | 8/1996 | Rigal et al. |
| 5,570,886 | A | | 11/1996 | Rigal et al. |
| 5,580,058 | A | * | 12/1996 | Coughlin ........... A63B 69/3685 273/250 |
| 5,692,972 | A | | 12/1997 | Langslet |
| D392,007 | S | * | 3/1998 | Fox .............................. D21/752 |
| 5,735,754 | A | | 4/1998 | Antonious |
| 5,746,664 | A | * | 5/1998 | Reynolds, Jr. ......... A63B 53/02 473/252 |
| 5,788,584 | A | | 8/1998 | Parente et al. |
| D398,946 | S | * | 9/1998 | Kenmi ........................ D21/733 |
| 5,803,830 | A | * | 9/1998 | Austin ................... A63B 53/04 473/328 |
| 5,839,975 | A | | 11/1998 | Lundberg |
| 5,873,791 | A | | 2/1999 | Allen |
| 5,888,148 | A | * | 3/1999 | Allen ..................... A63B 53/04 473/290 |
| D414,234 | S | * | 9/1999 | Darrah ....................... D21/759 |
| 6,015,354 | A | * | 1/2000 | Ahn ....................... A63B 53/04 473/256 |
| 6,149,533 | A | | 11/2000 | Finn |
| 6,159,109 | A | | 12/2000 | Langslet |
| 6,203,449 | B1 | | 3/2001 | Kenmi |
| 6,299,546 | B1 | | 10/2001 | Wang |
| 6,348,013 | B1 | | 2/2002 | Kosmatka |
| 6,354,961 | B1 | | 3/2002 | Allen |
| 6,394,910 | B1 | * | 5/2002 | McCarthy .......... A63B 53/0487 473/251 |
| 6,422,951 | B1 | | 7/2002 | Burrows |
| D465,251 | S | * | 11/2002 | Wood ......................... D21/752 |
| D473,276 | S | * | 4/2003 | Kenmi ........................ D21/752 |
| D480,441 | S | * | 10/2003 | Kenmi ........................ D21/752 |
| 6,652,390 | B2 | * | 11/2003 | Bradford ............. A63B 53/0487 473/341 |
| 6,663,503 | B1 | * | 12/2003 | Kenmi ................... A63B 53/04 473/328 |
| 6,773,360 | B2 | * | 8/2004 | Willett ............... A63B 53/0466 473/334 |
| D501,235 | S | * | 1/2005 | Imamoto .................... D21/752 |
| 6,863,624 | B1 | * | 3/2005 | Kessler ............. A63B 53/0466 473/328 |
| 7,070,514 | B1 | * | 7/2006 | Borunda ............ A63B 53/0466 473/333 |
| 7,121,956 | B2 | * | 10/2006 | Lo ........................ A63B 53/04 473/335 |
| 7,128,664 | B2 | | 10/2006 | Onoda et al. |
| 7,201,668 | B1 | * | 4/2007 | Pamias ................ A63B 53/007 473/288 |
| 7,226,366 | B2 | | 6/2007 | Galloway |

(56) References Cited

U.S. PATENT DOCUMENTS

| | | | |
|---|---|---|---|
| 7,255,653 B2* | 8/2007 | Saso | A63B 53/0466 473/345 |
| 7,294,064 B2 | 11/2007 | Tsurumaki et al. | |
| D566,213 S * | 4/2008 | Kim | D21/752 |
| 7,351,161 B2* | 4/2008 | Beach | A63B 53/0466 473/334 |
| 7,361,099 B2 | 4/2008 | Rice et al. | |
| 7,431,663 B2* | 10/2008 | Pamias | A63B 53/007 473/288 |
| 7,500,924 B2 | 3/2009 | Yokota | |
| 7,520,820 B2* | 4/2009 | Dimarco | A63B 53/0466 473/334 |
| 7,530,903 B2 | 5/2009 | Imamoto et al. | |
| 7,549,933 B2 | 6/2009 | Kumamoto | |
| 7,572,193 B2 | 8/2009 | Yokota | |
| 7,618,331 B2 | 11/2009 | Hirano | |
| 7,621,820 B2 | 11/2009 | Clausen et al. | |
| 7,651,412 B2 | 1/2010 | Meyer et al. | |
| 7,717,803 B2 | 5/2010 | DiMarco | |
| 7,749,101 B2 | 7/2010 | Imamoto et al. | |
| 7,753,809 B2* | 7/2010 | Cackett | A63B 53/0466 473/345 |
| 7,758,452 B2 | 7/2010 | Soracco | |
| 7,803,065 B2 | 9/2010 | Breier et al. | |
| 7,824,277 B2* | 11/2010 | Bennett | A63B 53/0466 473/328 |
| 7,871,336 B2 | 1/2011 | Breier et al. | |
| 7,878,924 B2 | 2/2011 | Clausen et al. | |
| 7,927,229 B2 | 4/2011 | Jertson et al. | |
| 7,927,231 B2* | 4/2011 | Sato | A63B 53/0466 473/334 |
| 7,931,542 B2 | 4/2011 | Kusumoto | |
| 7,938,739 B2* | 5/2011 | Cole | A63B 53/047 473/332 |
| 8,043,166 B2 | 10/2011 | Cackett et al. | |
| 8,092,316 B2 | 1/2012 | Breier et al. | |
| 8,105,175 B2 | 1/2012 | Breier et al. | |
| 8,177,657 B2 | 5/2012 | Clausen et al. | |
| 8,235,834 B2 | 8/2012 | De La Cruz et al. | |
| 8,235,841 B2 | 8/2012 | Stites et al. | |
| 8,272,974 B2* | 9/2012 | Mickelson | A63B 53/0466 473/314 |
| 8,303,434 B1* | 11/2012 | DePaul | A63B 53/0487 473/255 |
| 8,376,878 B2 | 2/2013 | Bennett et al. | |
| 8,388,465 B2 | 3/2013 | De La Cruz et al. | |
| 8,435,135 B2* | 5/2013 | Stites | A63B 53/0466 473/334 |
| 8,591,352 B2* | 11/2013 | Hirano | A63B 53/0466 473/336 |
| 8,628,433 B2* | 1/2014 | Stites | A63B 53/0466 473/327 |
| 8,632,417 B2 | 1/2014 | Sander et al. | |
| 8,734,265 B2* | 5/2014 | Soracco | A63B 53/0466 473/245 |
| 8,758,164 B2* | 6/2014 | Breier | A63B 53/0466 473/332 |
| 8,834,293 B2* | 9/2014 | Thomas | A63B 53/0466 473/332 |
| 8,834,294 B1* | 9/2014 | Seluga | A63B 53/04 473/338 |
| 8,876,622 B2 | 11/2014 | Beach et al. | |
| 8,900,069 B2 | 12/2014 | Beach et al. | |
| 8,951,145 B2 | 2/2015 | Bezilla et al. | |
| 8,956,244 B1* | 2/2015 | Westrum | A63B 53/04 473/338 |
| 8,992,339 B2* | 3/2015 | Matsunaga | A63B 53/04 473/335 |
| 9,101,808 B2 | 8/2015 | Stites et al. | |
| 9,114,293 B2* | 8/2015 | Soracco | A63B 53/06 |
| 9,168,435 B1* | 10/2015 | Boggs | A63B 53/04 |
| 9,168,438 B2* | 10/2015 | Boyd | A63B 53/04 |
| 9,174,096 B2 | 11/2015 | Sargent et al. | |
| 9,192,831 B2* | 11/2015 | Stites | A63B 53/0466 |
| 9,289,661 B2 | 3/2016 | Stites et al. | |
| 9,409,073 B2* | 8/2016 | Boyd | A63B 69/36 |
| 9,433,834 B2* | 9/2016 | Stites | A63B 53/0466 |
| 9,446,294 B2 | 9/2016 | Oldknow et al. | |
| 9,795,845 B2* | 10/2017 | Taylor | A63B 53/0466 |
| 10,245,474 B2* | 4/2019 | Boggs | A63B 53/04 |
| 2002/0019265 A1 | 2/2002 | Allen | |
| 2002/0137576 A1 | 9/2002 | Dammen | |
| 2002/0183134 A1 | 12/2002 | Allen et al. | |
| 2003/0045371 A1* | 3/2003 | Wood | A63B 53/0466 473/328 |
| 2005/0009630 A1 | 1/2005 | Chao et al. | |
| 2005/0101407 A1 | 5/2005 | Hirano | |
| 2005/0124435 A1 | 6/2005 | Gambetta et al. | |
| 2005/0215350 A1 | 9/2005 | Reyes et al. | |
| 2006/0122004 A1 | 6/2006 | Chen et al. | |
| 2007/0135231 A1* | 6/2007 | Lo | A63B 53/0466 473/336 |
| 2008/0119303 A1* | 5/2008 | Bennett | A63B 60/00 473/338 |
| 2008/0139339 A1 | 6/2008 | Cheng | |
| 2010/0197423 A1 | 8/2010 | Thomas et al. | |
| 2010/0304887 A1* | 12/2010 | Bennett | A63B 53/0475 473/336 |

FOREIGN PATENT DOCUMENTS

| | | | | | |
|---|---|---|---|---|---|
| GB | 2133295 | A | * | 7/1984 | |
| JP | 01043278 | A | * | 2/1989 | |
| JP | 07255886 | A | * | 10/1995 | |
| JP | 08112380 | A | * | 5/1996 | |
| JP | 08155063 | A | * | 6/1996 | |
| JP | 10137374 | A | * | 5/1998 | |
| JP | 10277180 | A | * | 10/1998 | |
| JP | 2004159680 | A | * | 6/2004 | |
| JP | 2005046442 | A | * | 2/2005 | |
| JP | 2006000435 | | | 1/2006 | |
| JP | 2006288793 | A | * | 10/2006 | |
| JP | 2007117728 | A | * | 5/2007 | |
| JP | 2007267777 | A | * | 10/2007 | |
| JP | 2008079627 | A | * | 4/2008 | |
| JP | 2008126081 | A | * | 6/2008 | |
| JP | 2010158316 | A | * | 7/2010 | |
| JP | 2010284553 | A | * | 12/2010 | |
| JP | 2011005011 | A | * | 1/2011 | A63B 53/0466 |
| JP | 2011125623 | A | * | 6/2011 | A63B 53/04 |
| JP | 2012135366 | A | * | 7/2012 | A63B 53/0466 |
| JP | 2013034856 | A | * | 2/2013 | |
| JP | 2014188308 | A | * | 10/2014 | A63B 53/0466 |
| JP | 2016158915 | A | * | 9/2016 | |
| WO | 2006073930 | | | 7/2006 | |

OTHER PUBLICATIONS

Jul. 7, 2010—(WO) International Search Report and Written Opinion, App. PCT/US2010/021355.

Nov. 30, 2012—(WO) International Search Report and Written Opinion, App. PCT/US2012/052107.

Dec. 18, 2012—(WO) International Search Report and Written Opinion, App. PCT/US20121057490.

Mar. 24, 2014—(WO) International Search Report and Written Opinion—App. PCT/US2013/061812.

* cited by examiner

GOLF CLUB AND GOLF CLUB HEAD STRUCTURES

RELATED APPLICATIONS

This is a continuation of U.S. patent application Ser. No. 15/975,676, filed on May 9, 2018, which is a continuation of U.S. patent application Ser. No. 15/075,985, filed Mar. 21, 2016, now U.S. Pat. No. 10,130,854 issued on Nov. 20, 2018, which is a continuation of U.S. patent application Ser. No. 14/180,134, filed Feb. 13, 2014, now U.S. Pat. No. 9,289,661 issued Mar. 22, 2016, which claims the benefit of and is a continuation of U.S. patent application Ser. No. 13/593,277, filed Aug. 23, 2012, now U.S. Pat. No. 9,192,831, issued on Nov. 24, 2015, which is a non-provisional of U.S. Provisional Application No. 61/526,326, filed on Aug. 23, 2011, and U.S. Provisional Application No. 61/598,832, filed on Feb. 14, 2012, and which application Ser. No. 13/593,277 also claims priority to and is a continuation-in-part of U.S. patent application Ser. No. 13/250,051, filed on Sep. 30, 2011, now U.S. Pat. No. 8,668,595, issued on Mar. 11, 2014, which claims priority to and is a non-provisional of U.S. Provisional Application No. 61/480,322, filed Apr. 28, 2011, and U.S. patent application Ser. No. 13/593,277 further claims priority to and is a continuation-in-part of U.S. patent application Ser. No. 12/723,951, filed on Mar. 15, 2010, which claims priority to and is a continuation-in-part of U.S. patent application Ser. No. 12/356,176, filed on Jan. 20, 2009, now U.S. Pat. No. 7,922,603, and application Ser. No. 14/180,134 also claims the benefit of and is a non-provisional of U.S. Provisional Application No. 61/910,924, filed Dec. 2, 2013, all of which applications are incorporated by reference herein and made a part hereof.

TECHNICAL FIELD

Aspects of this invention relate generally to golf clubs and golf club heads, and, in particular, to golf clubs and golf club heads having a portion of the club head removed or open, thereby creating a void in the club head, in order to reduce or redistribute weight associated with the club head to enhance performance.

BACKGROUND

Golf is enjoyed by a wide variety of players, players of different genders and players of dramatically different ages and/or skill levels. Golf club designers have successfully advanced the technology incorporated in golf clubs in response to the constant demand of golfers for improved performance. In one aspect, golfers tend to be sensitive to the "feel" of a golf club. The "feel" of a golf club comprises the combination of various component parts of the club and various features associated with the club that produce the sensations experienced by the player when a ball is swung at and/or struck. Club weight, weight distribution, swing weight, aerodynamics, swing speed, and the like all may affect the "feel" of the club as it swings and strikes a ball. "Feel" also has been found to be related to the sound produced when a club head strikes a ball to send the ball in motion. If a club head makes an unpleasant, undesirable, or surprising sound at impact, a user may flinch, give up on his/her swing, decelerate the swing, lose his/her grip, and/or not completely follow-through on the swing, thereby affecting distance, direction, and/or other performance aspects of the swing and the resulting ball motion. User anticipation of this unpleasant, undesirable, or surprising sound can affect a swing even before the ball is hit.

Also, the performance of a golf club can vary based on several factors, including weight distribution about the club head, which affects the location of the center of gravity of the golf club head. When the center of gravity is positioned behind the point of engagement on the contact surface, the golf ball follows a generally straight route. When the center of gravity is spaced to a side of the point of engagement, however, the golf ball may fly in an unintended direction and/or may follow a route that curves left or right, including ball flights that often are referred to as "pulls," "pushes," "draws," "fades," "hooks," or "slices." Similarly, when the center of gravity is spaced above or below the point of engagement, the flight of the golf ball may exhibit more boring or climbing trajectories, respectively.

Weight distribution about the club head can also affect moment of inertia associated with the club head. Thus, altering the moment of inertia can affect how the golf club performs including how the golf club head design impacts heel and toe mishits. Similarly, other factors such as point of impact and launch angle can also affect how the ball travels once it has been struck.

Club designers are often looking for new ways to distribute or redistribute weight associated with a golf club and/or golf club head. For instance, club designers are often looking to distribute weight to provide more forgiveness in a club head, improved accuracy, a desired ball flight and the like. In pursuit of such designs, club designers also face a challenge of maintaining a club head having a traditional aesthetic look desired by most golfers. While certain golf club and golf club head designs according to the prior art provide a number of advantageous features, they nevertheless have certain limitations. Accordingly, it would be advantageous to provide a golf club and golf club head having a reduced weight characteristic and improved weight distribution throughout the club head to enhance club performance. The present invention is provided to overcome certain of the limitations and drawbacks of the prior art, and to provide new features not heretofore available.

SUMMARY

At least some aspects of the disclosure relate to golf clubs and golf club heads having enhanced weight distribution about the club head. In one aspect, the golf club utilizes a geometric weight feature in the form of a void formed in the golf club head. The golf club head may include a cover extending over the void such that the void may not be visible from a top of the golf club head at an address position. In some examples, the golf club head may include certain support structures that enhance performance characteristics of the golf club head. In some additional examples, the golf club head may further include one or more adjustable weight arrangements.

These and additional features and advantages disclosed here will be further understood from the following detailed disclosure of certain embodiments.

Figure 1A:
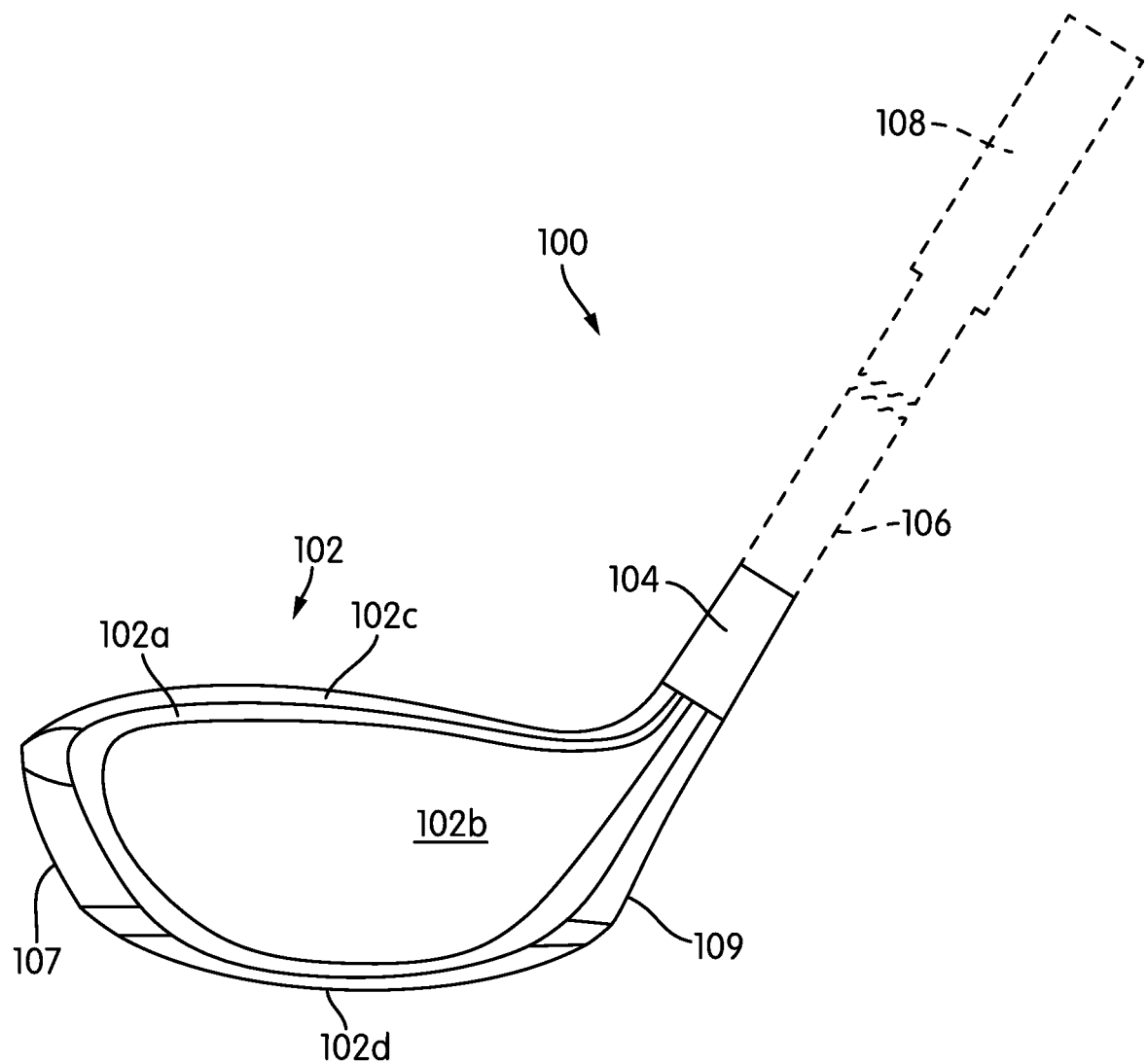
FIGS. 1A and 1B illustrate example golf club and golf club head structures according to one or more aspects described herein.

The figures referred to above are not drawn necessarily to scale, should be understood to provide a representation of particular embodiments of the invention, and are merely conceptual in nature and illustrative of the principles involved. Some features of the golf club and golf club head structures depicted in the drawings have been enlarged or distorted relative to others to facilitate explanation and understanding. In certain instances, the same reference numbers are used in the drawings for similar or identical components and features shown in various alternative embodiments. Golf clubs and golf club head structures as described herein may have configurations and components determined, in part, by the intended application and environment in which they are used.

DETAILED DESCRIPTION

In the following description of various example structures in accordance with the invention, reference is made to the accompanying drawings, which form a part hereof, and in which are shown by way of illustration various example articles, including one or more golf club or golf club head structures. Additionally, it is to be understood that other specific arrangements of parts and structures may be utilized and structural and functional modifications may be made without departing from the scope of the present invention. Also, while the terms "top," "bottom," "front," "back," "rear," "side," "underside," "overhead," and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention. Further, the invention generally will be described as it relates to wood-type golf clubs. In particular, the club heads disclosed herein will be drivers and fairway woods in exemplary embodiments. However, aspects of the invention may be used with any of several types of golf clubs, including hybrid type golf clubs, utility clubs, putters, and the like and nothing in the specification or figures should be construed to limit the invention to use with the wood-type golf clubs described.

FIG. 1 generally illustrates an example golf club 100 and/or golf club head 102 in accordance with this invention. In addition to the golf club head 102, the overall golf club structure 100 of this example includes a hosel 104, a shaft 106 received in and/or inserted into and/or through the hosel 104, and a grip or handle 108 attached to the shaft 106. Optionally, if desired, the external hosel 104 may be eliminated and the shaft 106 may be directly inserted into and/or otherwise attached to the head 102 (e.g., through an opening provided in the top of the club head 102, through an internal hosel (e.g., provided within an interior chamber defined by the club head 102), etc.). The hosel 104 may be considered to be an integral part of the golf club head 102 or could also be a separate structure attached to the golf club head 102.

The shaft 106 may be received in, engaged with, and/or attached to the club head 102 in any suitable or desired manner, including in conventional manners known and used in the art, without departing from the invention. As more specific examples, the shaft 106 may be engaged with the club head 102 via the hosel 104 and/or directly to the club head structure 102, e.g., via adhesives, cements, welding, soldering, mechanical connectors (such as threads, retaining elements, or the like) and further including releasable adjustable members or connectors, etc.; through a shaft-receiving sleeve or element extending into the body of the club head 102; etc. The shaft 106 also may be made from any suitable or desired materials, including conventional materials known and used in the art, such as graphite based materials, composite or other non-metal materials, steel materials (including stainless steel), aluminum materials, other metal alloy materials, polymeric materials, combinations of various materials, and the like. Also, the grip or handle 108 may be attached to, engaged with, and/or extend from the shaft 106 in any suitable or desired manner, including in conventional manners known and used in the art, e.g., using adhesives or cements; via welding, soldering, adhesives, or the like; via mechanical connectors (such as threads, retaining elements, etc.); etc. As another example, if desired, the grip or handle 108 may be integrally formed as a unitary, one-piece construction with the shaft 106. Additionally, any desired grip or handle 108 materials may be used without departing from this invention, including, for example: rubber materials, leather materials, rubber or other materials including cord or other fabric material embedded therein, polymeric materials, and the like.

Figure 1B:
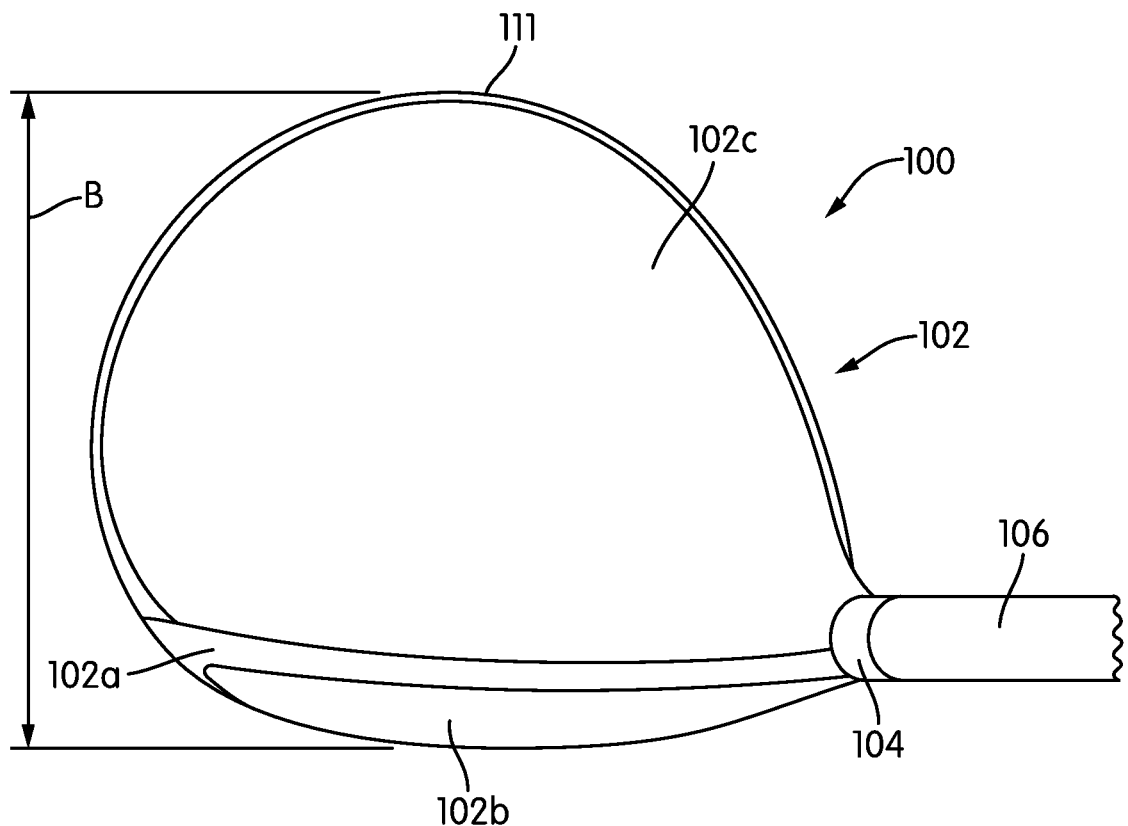

The club head 102 itself also may be constructed in any suitable or desired manner and/or from any suitable or desired materials without departing from this invention, including from conventional materials and/or in conventional manners known and used in the art. For example, in the example club head 102 shown in FIG. 1, the club head 102 includes a front face 102a that generally includes a ball striking surface 102b (optionally including a ball striking face plate integrally formed with the ball striking surface 102a or attached to the club head such that the face plate and a frame together constitute the overall ball striking surface 102a). The front face 102a may be considered a ball striking face 102a. The club head 102 may further include a top 102c or crown, a sole 102d, a toe 107 and a heel 109. The club head 102 may also include a rear 111 (FIG. 1B).

A wide variety of overall club head constructions are possible without departing from this invention. For example, if desired, some or all of the various individual parts of the club head 102 described above may be made from multiple pieces that are connected together (e.g., by welding, adhesives, or other fusing techniques; by mechanical connectors; etc.). The various parts (e.g., crown, sole, front face, rear, etc.) may be made from any desired materials and combinations of different materials, including materials that are conventionally known and used in the art, such as metal materials, including lightweight metal materials, and the like. More specific examples of suitable lightweight metal materials include steel, titanium and titanium alloys, aluminum and aluminum alloys, magnesium and magnesium alloys, etc. Additionally or alternatively, the various parts of the club head may be formed of one or more composite materials. Injection molded parts are also possible. The club head 102 also may be made by forging, casting, or other desired processes, including club head forming processes as are conventionally known and used in the art. The golf club head 102 could further be formed in a single integral piece.

The various individual parts that make up a club head structure 102, if made from multiple pieces, may be engaged with one another and/or held together in any suitable or desired manner, including in conventional manners known and used in the art. For example, the various parts of the club head structure 102, such as the front face 102a, ball striking surface 102b, the top 102c, the sole 102d, etc., may be joined and/or fixed together (directly or indirectly through intermediate members) by adhesives, cements, welding, soldering, or other bonding or finishing techniques; by mechanical connectors (such as threads, screws, nuts, bolts, or other connectors); and the like. If desired, the mating edges of various parts of the club head structure 102 may include one or more raised ribs, tabs, ledges, or other engagement elements that fit into or onto corresponding grooves, slots, surfaces, ledges, openings, or other structures provided in or on the facing side edge to which it is joined. Cements, adhesives, mechanical connectors, finishing material, or the like may be used in combination with the raised rib/groove/ledge/edge or other connecting structures described above to further help secure the various parts of the club head structure 102 together.

The dimensions and/or other characteristics of a golf club head structure according to examples of this invention may vary significantly without departing from the invention, and the dimensions may be consistent with those commonly used in the art for similar club heads and clubs.

Several embodiments of golf club heads are disclosed herein. It is understood that the description of the club head and various components described above regarding FIGS. 1A and 1B will apply to the other embodiments described herein. It will be appreciated that the several different embodiments may utilize a geometric weighting feature.

The geometric weighting feature may provide for reduced head weight and/or redistributed weight to achieve desired performance. For example, more weight may be positioned towards the rear ends of the heel and toe of the club head. In the various embodiments disclosed herein, the golf club head may have a body having spaced legs defining a void, space or gap in between the legs. The club heads herein may be considered to have a portion removed to define the void, space or gap. The body may include a cover that is positioned over the void and/or the legs, and may be an integral component of the body or separately attached. Additional support members and/or weight assemblies may also be utilized with certain embodiments.

Figure 2A:
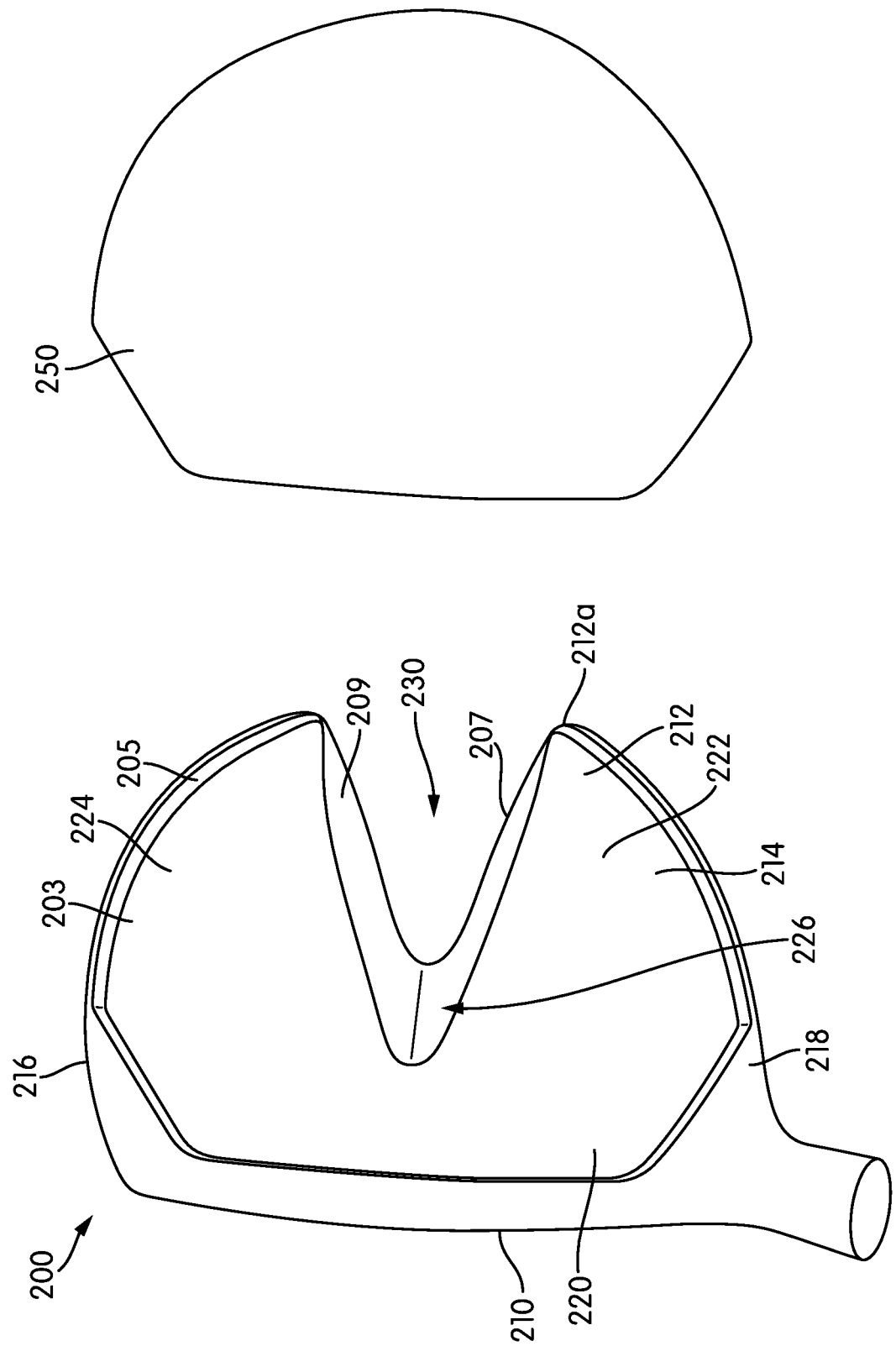
FIGS. 2A-2C illustrate an example golf club head having a void formed in a rear of the golf club head body and a cover according to one or more aspects described herein.
Figure 2B:
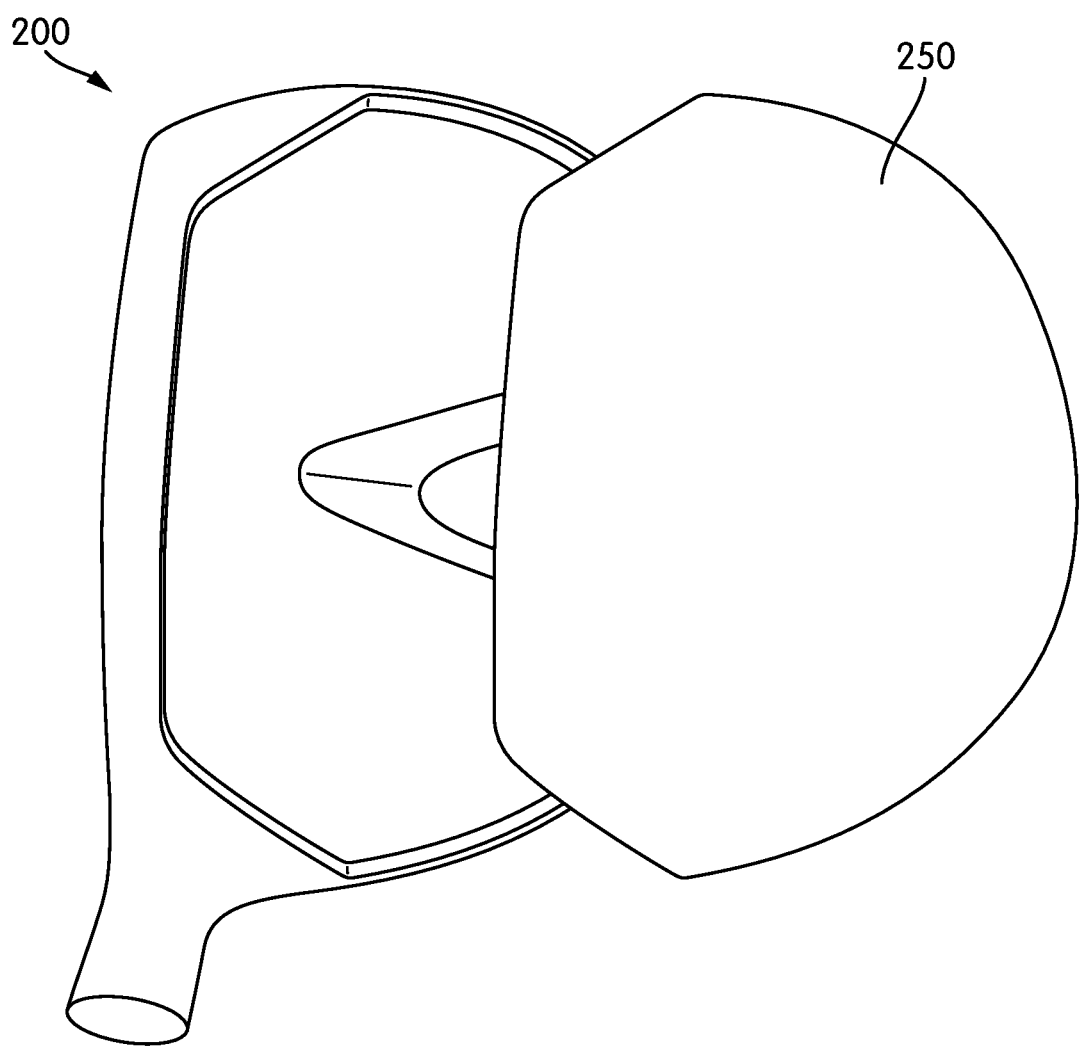
Figure 2C:
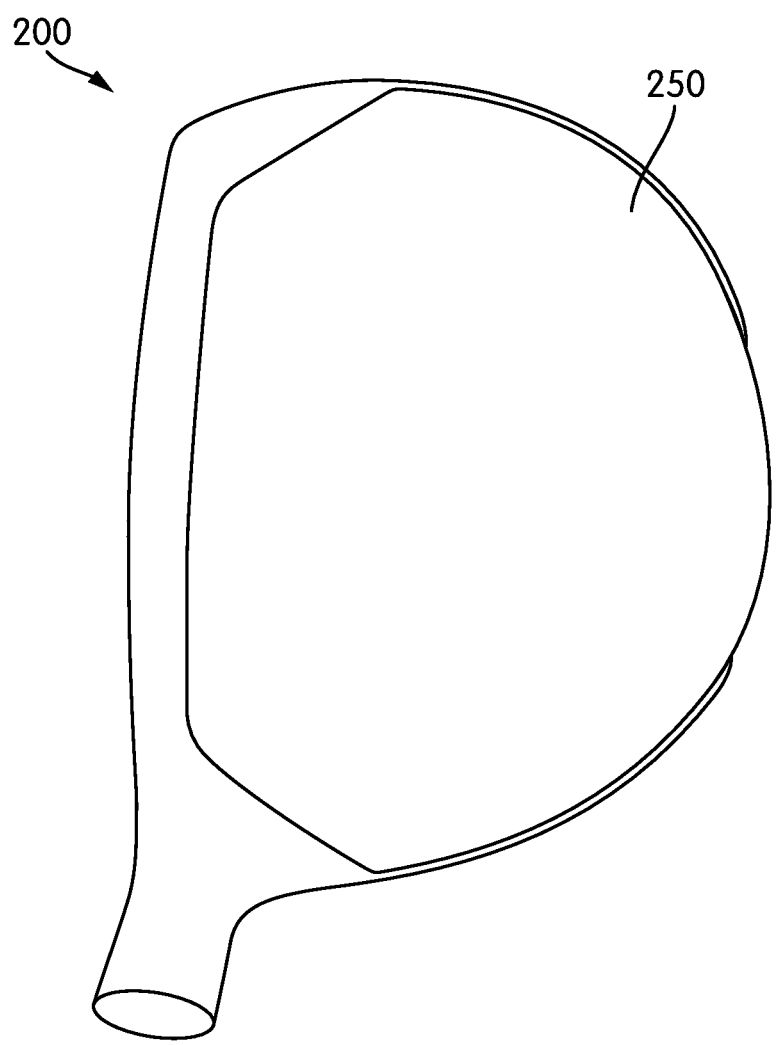

FIGS. 2A-2C illustrate one example golf club head according to at least some aspects of the invention. The golf club head is generally designated with the reference numeral 200. The golf club head 200 generally includes a golf club head body 202 and a cover 250. As will be described in greater detail below, the body 202 has several structures and defines various surfaces. The cover 250 is connected to the body 202 to form the golf club head 102. As described herein, it is appreciated that the body 202 and cover 250 can be formed as an integral structure as well.

As further shown in FIG. 2A, the golf club head body 202 further includes and defines a front 210, a rear 212, a top 214, a toe 216, a heel 218 and a sole (not shown in FIGS. 2A-2C). The front 210 generally defines a ball striking face. The ball striking face may take various forms and in an exemplary embodiment, may utilize variable face thickness designs such as disclosed in U.S. patent application Ser. No. 13/211,961 which is incorporated by reference herein and made a part hereof. The ball striking face may further have a constant thickness. It is further understood that the ball striking face 210 may be separately connected to the golf club head body 202 such as in a welding process. The golf club head 200 may, in some arrangements, include a geometric weighting feature. In one exemplary embodiment, the club head 200 has a void 230, gap, or space, formed generally in the rear 212 of the golf club head body 202. The void 230 may, in some examples, be substantially v-shaped and may extend entirely through the golf club head 200 (e.g., from the top 214 to the sole). The golf club head body 202 further has a base 220 and a first leg 222 and a second leg 224. The first leg 222 extends away from the front 210 or ball striking face 210 and the second leg 224 extends away from the ball striking face 210. The void 230 is defined between the first leg 222 and the second leg 224. The void 230 opens into the rear of the golf club head. The body 202 may form the hosel at the heel 218 of the body 202. It is understood that the various structures of the body 202 may define an internal cavity having an internal volume.

As shown in FIG. 2A, the void 230 may extend from a rear edge 212a of the golf club head 200, inward, toward a center or central region of the golf club head 200 and towards the ball striking face 210. The void 230 may be wider proximal the rear edge 212a of the golf club head than proximal the center of the golf club head 200, thereby forming the v-shape. The void 230 formed in the golf club head 200 may reduce the overall weight associated with the golf club head, redistribute weight of the club, and may aid in adjusting the performance characteristics of the golf club head 200. In some examples, the first leg 222 defines a first side 207 and the second leg defines a second side 209. The sides 207, 209 are generally in confronting relation. The sides 207, 209 of the v-shaped void 230 may be generally linear. That is, the sides 207, 209 may provide a generally flat surface. It is understood that the sides 207,209 may further be non-linear and define interrupted surfaces, or non-flat surfaces. As further shown in FIG. 2A, as the void 230 is v-shaped, the legs 222, 224 and the sides 207, 209 converge towards the ball striking face 210 to an interface area 226. The interface area 226 may be positioned in or proximate the central region of the club head 200 and this position may vary as described further herein. As described in greater detail below, the sides 207, 209 and interface area 226 may have certain performance-enhancing structures associated therewith on internal surfaces in the internal cavity defined by the club head body 202, as well as outer surfaces of the sides 207, 209. As also described in greater detail below, the legs 222, 224 and interface area 226 may have moveable weight assemblies operably associated therewith to further enhance the performance characteristics of the golf club head 200. The thicknesses of the material forming the golf club head body including materials making up the legs can also vary as desired. The volume of the internal cavity including the volumes of the legs could also be filled with a filler material if desired.

In some examples, the golf club head 200 may be formed as a single piece. For instance, the front 210, rear 212, top 214, toe 216, heel 218 and sole may be a single piece unit. The golf club head 200 may be formed using known methods of manufacture, such as casting, molding, forging, etc, and various combinations thereof. Thus, the golf club head body 202 may be cast in a metal material such as titanium. The void 230 may be formed in the golf club head during the initial manufacturing process of the golf club head (e.g., during casting) or may be formed into the golf club head 200 using an additional process (e.g., by cutting).

In some arrangements, a recess 203 may be formed in the top 214 of the golf club head body 202. The recess 203 may form a ridge or lip 205 around a perimeter, or substantially around a perimeter, of the golf club head 200. The recess may vary in depth and may be between 0.1 and 0.3 inches deep. The recess 203 may be configured to receive a cover, such as the cover 250, which will be discussed more fully below. Further, in examples in which the recess 203 is configured to receive the cover 250, the recess 203 may be shaped to correspond to the cover 250.

As mentioned above, and as shown in FIGS. 2A and 2B, the golf club head 200 further includes the cover 250. The cover 250 may, in some examples, cover the rear 212, or a portion of the rear 212, of the golf club head body 202 such that the void 230 is not visible when the golf club head 200 is in use, especially when the golf club head 200 is at an address position with the golfer standing over the golf club head 200. That is, with the cover 250 in position, the golf club head 200 may appear similar to a conventional golf club head that does not include a void 230 in the rear 212 of the golf club head 200. However, the performance advantages (e.g., reduced weight, redistributed weight, etc.) would be provided. The cover 250 may, in some examples, extend over the top 214 of the golf club head body 202 such that the void 230 may be visible when the golf club head 200 is viewed from the sole but the void 230 may be obstructed from view when viewed from the top of the club 200. Additionally or alternatively, the cover 250 may extend over the entire rear 212 of the golf club head 200 and may cover the top and sole of the golf club head such that the void is not visible when the golf club head is viewed from any angle.

In some arrangements, the cover 250 may be received in the recess 203 formed in the top 214 of the golf club head 200. In some examples, the depth and/or shape of the recess 203 may correspond to the thickness and/or shape of the cover 250. For instance, when the cover 250 is installed on the golf club head 200, a top surface of the cover 250 may be flush with a top of the ridge or lip 205 formed by the recess 203.

The cover 250 may be formed of any suitable material, such as lightweight metals, alloys, composite, plastic, etc. A polymer-based cover 250 may further have a nano-coating to provide a metallic-type finish or some other treatment to provide such look. The cover 250 may be connected to the golf club head using known methods of connection, including mechanical fasteners, snap fits, screws, adhesives, friction fits, and the like. In some examples, the cover 250 may be connected to the golf club head 200 by a friction fit between the ridge or lip 205 formed by the recess 203 on the top 214 of the golf club head 200.

In some arrangements, the cover 250 may be removable and or interchangeable with other covers. For instance, FIG. 2A illustrates the golf club head 200 with the cover 250 removed. FIG. 2B illustrates the golf club head 200 with the cover 250 partially in place, while FIG. 2C illustrates the golf club head 200 with the cover 250 in place along the top of the golf club head 200. The cover 250 generally forms the crown of the golf club head 200. As shown in FIGS. 2A-2C, when the cover 250 is in place, the void 230 is not visible from the top 214 of the golf club head 200. That is, in an address position, a user would not be able to see the void 230 formed in the golf club head 200. Rather, the golf club head 200 would have the appearance of a conventional golf club head. As shown in FIG. 2C, the golf club head 200 appears similar to a conventional golf club head when viewed from the top with the cover 250 in place.

In some arrangements, the cover 250 may be interchangeable with other covers having different performance characteristics. For instance, the cover may be interchanged with other covers having different weighting characteristics. Alternative covers may further have different aesthetic characteristics or may incorporate different training guides.

Figure 3A:
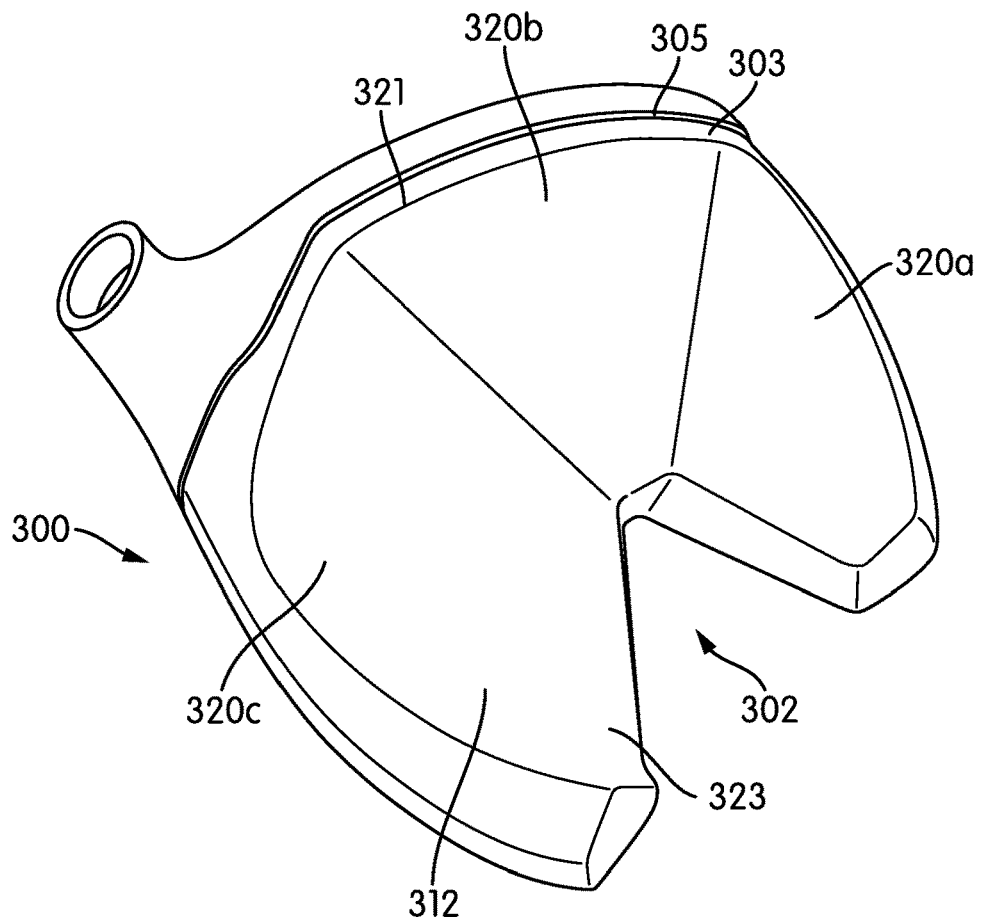
FIGS. 3A-3D illustrate example golf club head bodies according to one or more aspects described herein.
Figure 3B:
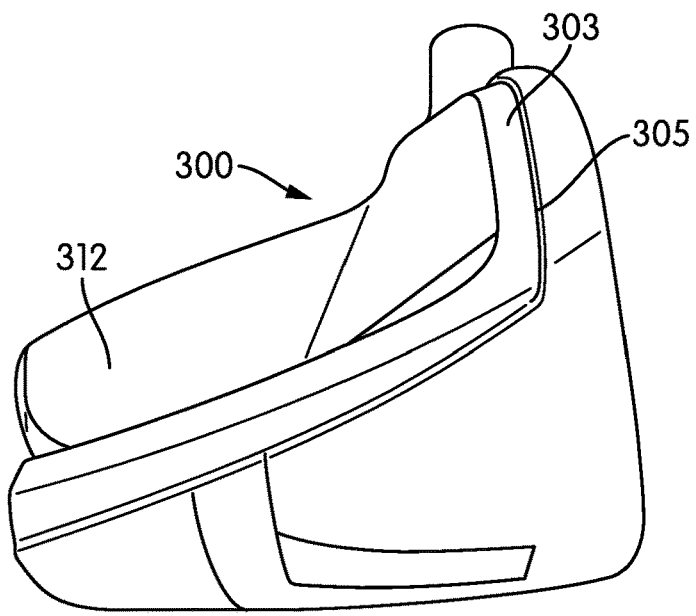

FIGS. 3A-3D illustrate another golf club head arrangement for a golf club head 300 and having golf club head body and a cover wherein the cover may be considered to be a portion of the club head body. The golf club head 300 has a void 302 formed in the rear 312 of the golf club head 300. Similar to the golf club head 200 of FIGS. 2A-2C, the golf club head 300 includes a front, a rear, a top, a sole, a toe and a heel. The golf club head 300 further includes a pair of spaced legs that define the geometric weighting feature in the form of a void 302 formed in the rear 312 of the golf club head 300. As shown in FIGS. 3A and 3B, the void 302 may be substantially v-shaped in some examples. The void 302 may be other shapes as desired. For instance, a square, rectangular, triangular, etc. shaped void may be used without departing from the invention.

The top of the golf club head body may include a plurality of angled surfaces 320a-320c. In some examples, the angled surfaces 320a-320c may be generally planar and may extend downward, from a top edge 321 of the front of the golf club head 300 to a top edge 323 of the v-shaped void 302. That is, the top of the golf club head 300 may gradually slope downward, from a top edge 321 of the front of the golf club head to the top edge 323 of the void. In some examples, the top may be formed of multiple angled surfaces 320a-320c. For instance, FIG. 3A illustrates three angled surfaces 320a-320c extending downward, from the top of the golf club head toward the sole. The three angled surfaces may extend in differing directions (e.g., from front to rear, toe to heel, heel to toe, etc.) to form the top surface of the golf club head 300.

The angled surfaces 320a-320c forming the top of the golf club head 300 may further aid in reducing weight associated with the golf club head and/or redistributing weight to adjust the center of gravity of the golf club head 300. That is, the angled surfaces 320a-320c allow for removal of additional material that would form a conventional golf club head. That additional material may add additional weight to an upper portion of the golf club head, thereby moving the center of gravity upward, which may not be desirable. Accordingly, providing the angled surfaces 320a-320c aids in moving the center of gravity downward, toward a sole of the golf club head 300. It is further understood that the legs of the club head body may be dimensioned differently wherein surface areas of the angled surfaces are also different. Such differences in the legs can further adjust the performance characteristics of the golf club.

The void 302 may then extend entirely through the rear of the golf club head, from the top of the body to the sole of the golf club head. As shown in FIGS. 3A and 3B, the void 302 may extend inward, from a rear edge of the golf club head toward a center portion of the golf club head, and the void may be wider proximal the rear edge than proximal the center of the golf club head wherein it is understood that the legs converge to an interface area.

Figure 3C:
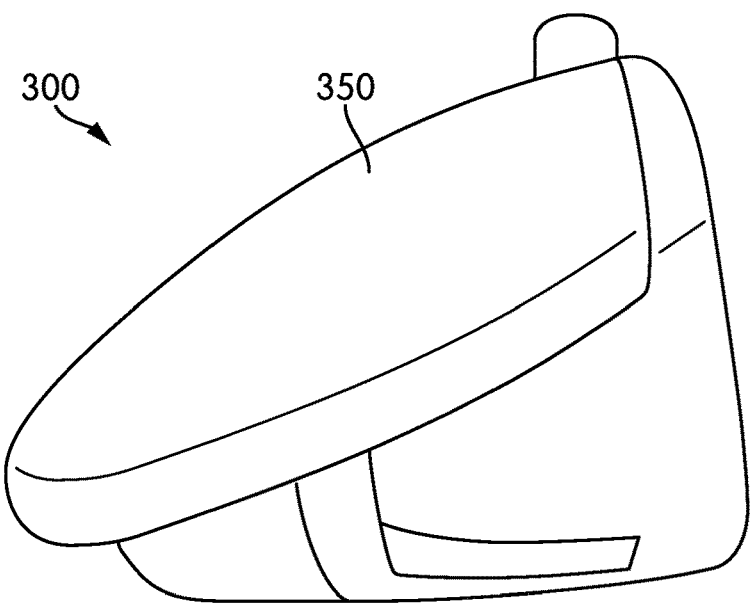
Figure 3D:
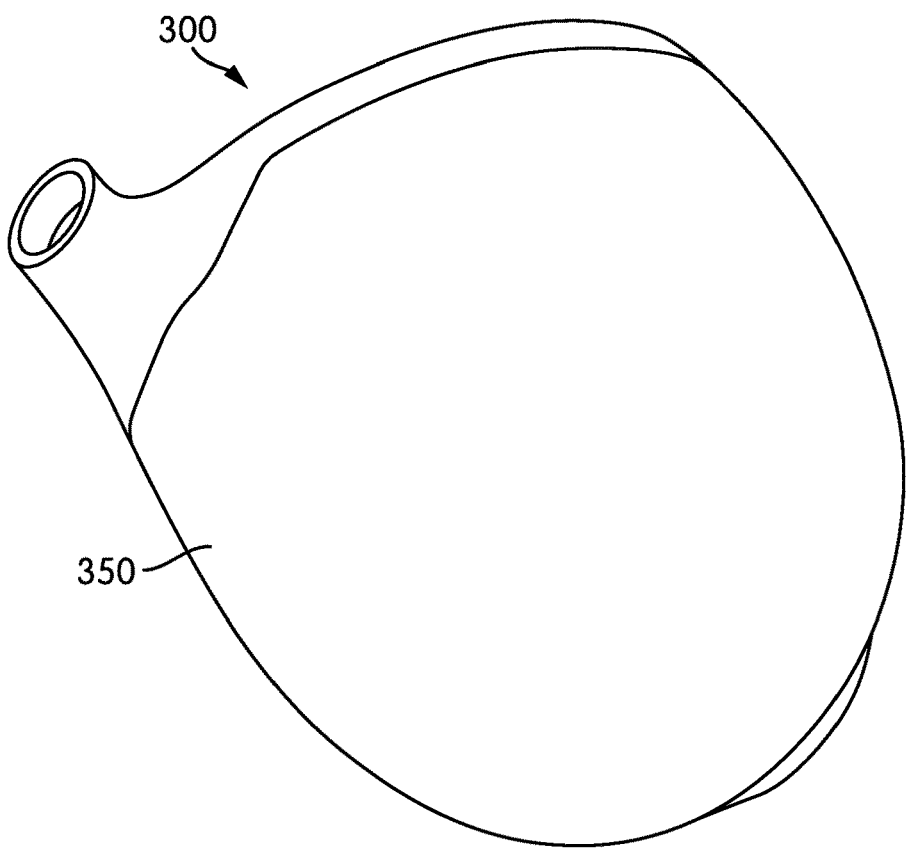

Similar to the arrangement discussed above, the golf club head 300 may further include a cover 350 that may be received on the top surface of the golf club head 300. FIGS. 3C and 3D illustrate the golf club head with the cover 350 in place. Similar to the arrangement discussed above, the cover 350 may be received in a recess 303 formed in the top of the body of the golf club head 300. In some examples, the cover 350 may extend over one or more exterior sides of the golf club head 300, as shown in FIG. 3C.

The cover 350 may be connected to the golf club head using known methods of connection, such as mechanical fasteners, adhesives, friction fits, snap fits, and the like. Further, the cover 350 may be formed of known materials, such as plastics, composites, metals, etc.

Similar to the arrangement discussed above, the cover may obscure the angled surfaces 320a-320c of the top of the golf club head 300 and the v-shaped void 302. Thus, when viewed from the top or in an at address position, the golf club head 300 may have the appearance of a conventional golf club head when the cover 350 is installed.

Figure 4A:
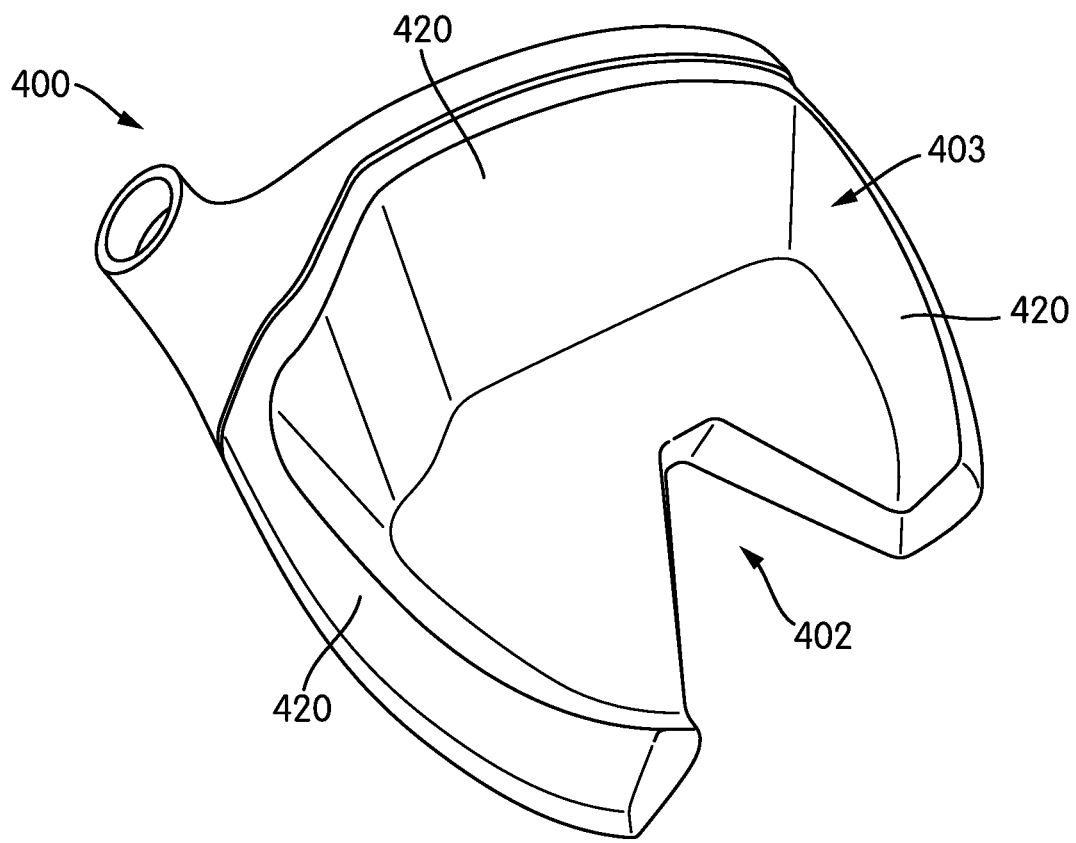
FIGS. 4A and 4B illustrate another example golf club head body according to one or more aspects described herein.
Figure 4B:
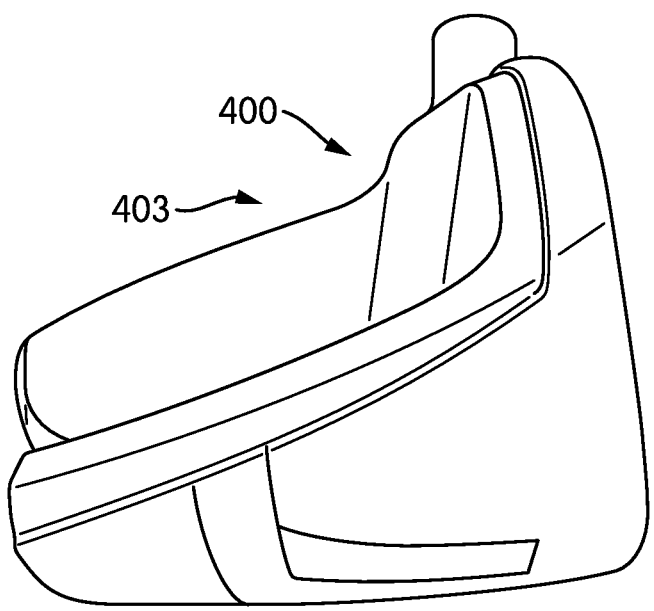

FIGS. 4A and 4B illustrate another example golf club head according to one or more aspects described herein. The golf club head 400 may include a recessed region 403 in the rear of the golf club head 400. The recess 403 may aid in reducing overall weight associated with the golf club and may aid in moving the center of gravity lower on the golf club head by reducing weight near the top of the golf club head. The recessed region 403 may be formed by sidewalls 420. The sidewalls 420 may extend downward, from a top of the golf club head toward a sole of the golf club head and may be substantially vertical. In some examples, at least one sidewall may be substantially parallel to the front of the golf club head, or generally parallel to a ball striking face. In other examples, the sidewalls 420 may be angled.

The golf club head 400 may further include a geometric weighting feature in the form of a void 402 formed in a bottom surface of the recessed region 403. In some examples, the void 402 may be substantially v-shaped and may aid in reducing weight associated with the golf club head, or may also further redistribute weight towards the rear of the heel and toe. The void 402 may extend from a rear edge of the golf club head inward, toward a center of the golf club head. In some examples, the void may extend completely through the rear of the golf club head (e.g., from the bottom surface of the recessed region to the sole of the golf club head) and may be wider proximal the rear edge of the golf club head than the center of the golf club head. In some arrangements, the void may include sides that are substantially planar.

Similar to the arrangements discussed above, the arrangement of golf club head 400 may aid in reducing overall weight and/or redistributing weight associated with the golf club head and may alter the performance characteristics of the golf club head. However, the golf club head 400 may not look like a conventional golf club head, which may be distracting to players and may not conform with one or more parameters of golf club design requirements. Accordingly, a cover may be provided to provide the appearance of a conventional golf club head while still providing the performance advantages of the golf club heads having voids as discussed above.

Figure 5A:
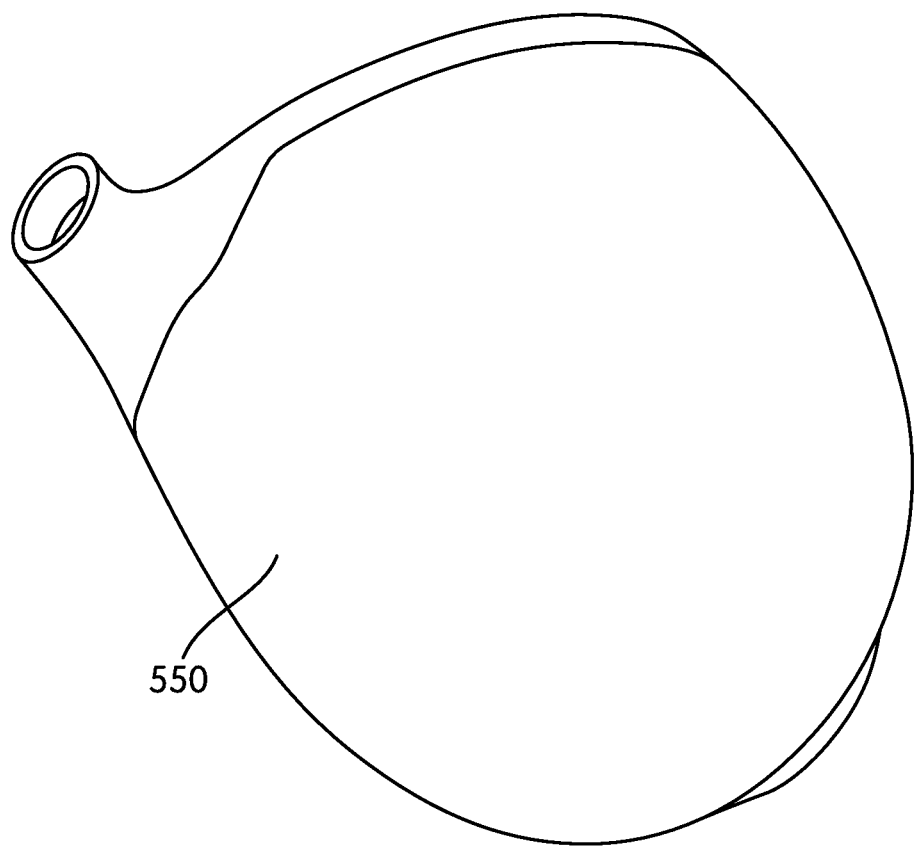
FIGS. 5A and 5B illustrate a golf club head cover for use with the golf club head bodies of FIGS. 3A-4B according to one or more aspects described herein.
Figure 5B:
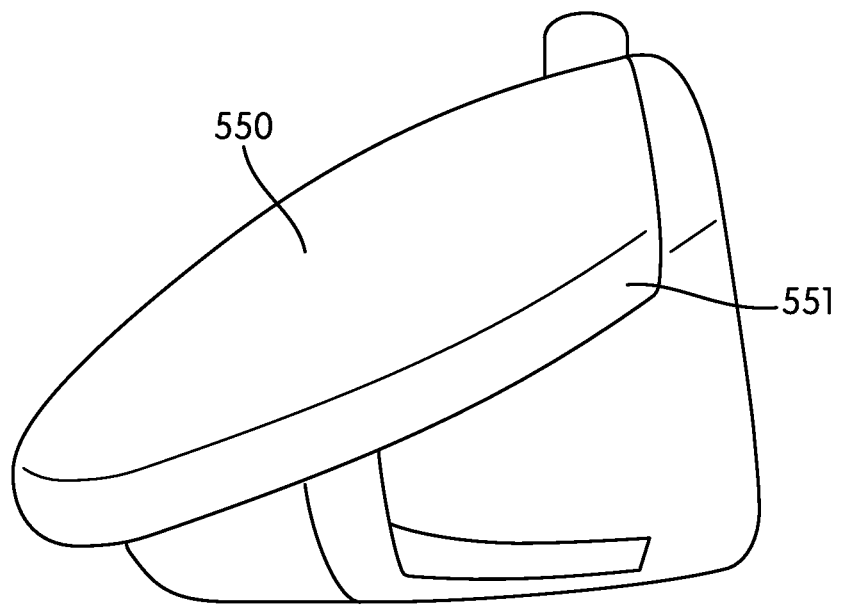

FIGS. 5A and 5B illustrate the golf club head 400 including a cover 550 extending over at least a portion of the rear of the golf club in order to provide the appearance of a conventional golf club head. The cover arrangement of FIGS. 5A and 5B may also be used with other golf club heads described herein (such as golf club head 200, golf club head 300, and other embodiments). The cover 550 may extend over the top of the golf club head 400 such that it obscures the void and/or recessed region of the golf club head and provides the appearance of a conventional golf club head. The cover 550 may be connected to the golf club head 300 or 400 using known methods of connection, such as mechanical fasteners, snap fits, friction fits, adhesives, and the like.

In some arrangements, as shown in FIG. 5B, the cover 550 may extend over a top edge of the golf club head and along a side of the golf club head. Thus, the cover 550 may include a depending peripheral skirt 551. This may aid in providing a conventional appearance for the golf club head. The golf club head cover 550 may cover the entire rear of the golf club head 400 (e.g., extend over the top and sole of the golf club head from the toe to the heel) to obscure the void from all angles of the golf club head. Alternatively, the cover 550 may extend over the top of the golf club head (e.g., from the rear to the front and from the toe to the heel along the top of the golf club head) to obscure the void 402 and/or recessed region when the golf club head 400 is viewed from the top (e.g., an at address position). However, in this arrangement, the void may still be visible when the golf club head is viewed from the bottom or sole.

Figure 6A:
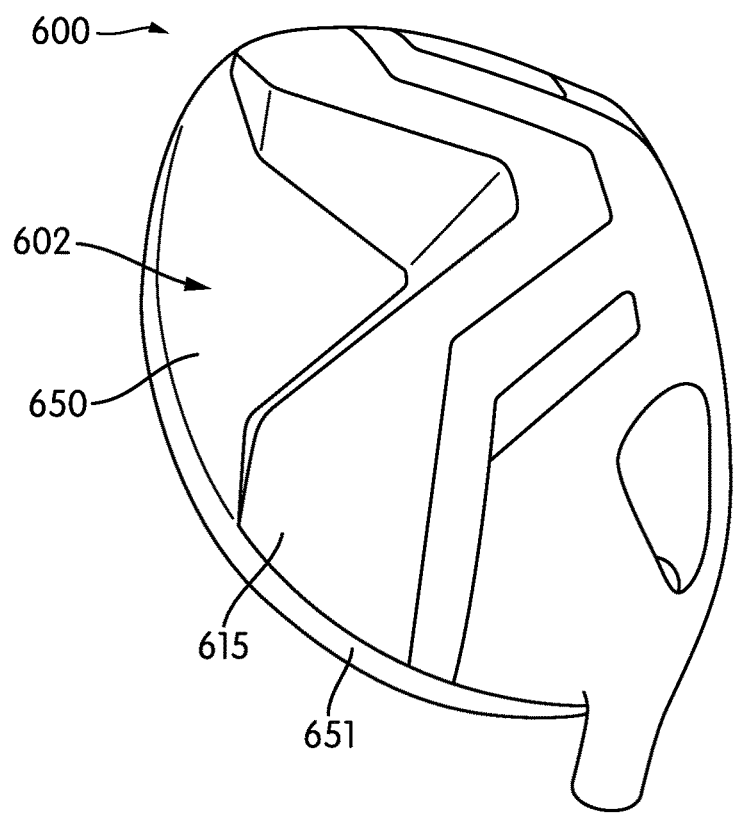
FIGS. 6A and 6B illustrate another golf club head body and cover arrangement according to one or more aspects described herein.
Figure 6B:
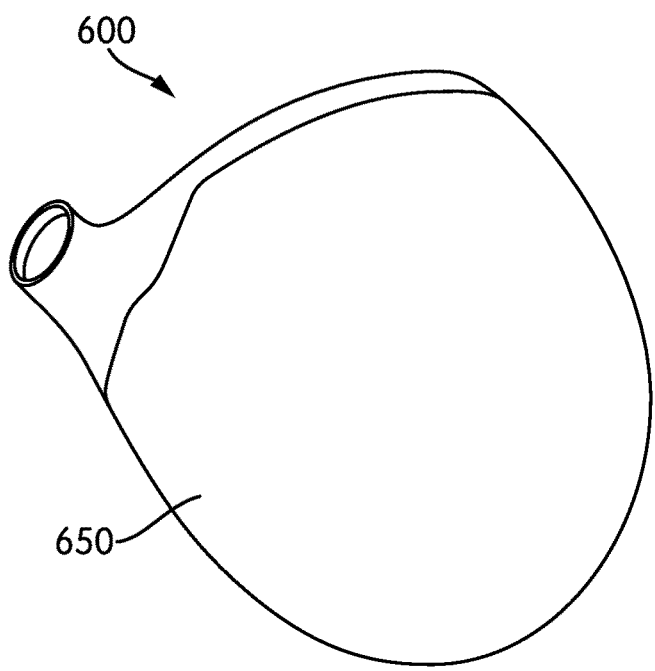

FIGS. 6A and 6B illustrate one arrangement in which a cover 650 extends over a top of a golf club head 600 such that a void 602 formed in the golf club head 600 is obscured when viewed from the top but visible when viewed from the bottom or sole of the golf club head. FIG. 6A illustrates the sole 615 of the golf club head 600. As shown, the golf club head 600 includes a substantially v-shaped void 602 formed in the rear of the golf club head 600 and extending generally from the rear edge of the golf club head inward, toward a center of the golf club head 600. The void 602 may be similar to other voids described herein. The void 602 is visible when the golf club head 600 is viewed from the bottom or sole. However, when viewed from the top, the golf club head has the appearance of a conventional golf club head, as shown in FIG. 6B.

The cover 650 of FIGS. 6A and 6B may generally cover the top of the golf club head 600 and may somewhat wrap around the top of the golf club head to cover a portion of the sides of the golf club head (similar to some arrangements discussed above). Accordingly, the cover 650 may also have a depending skirt 651.

Figure 7A:
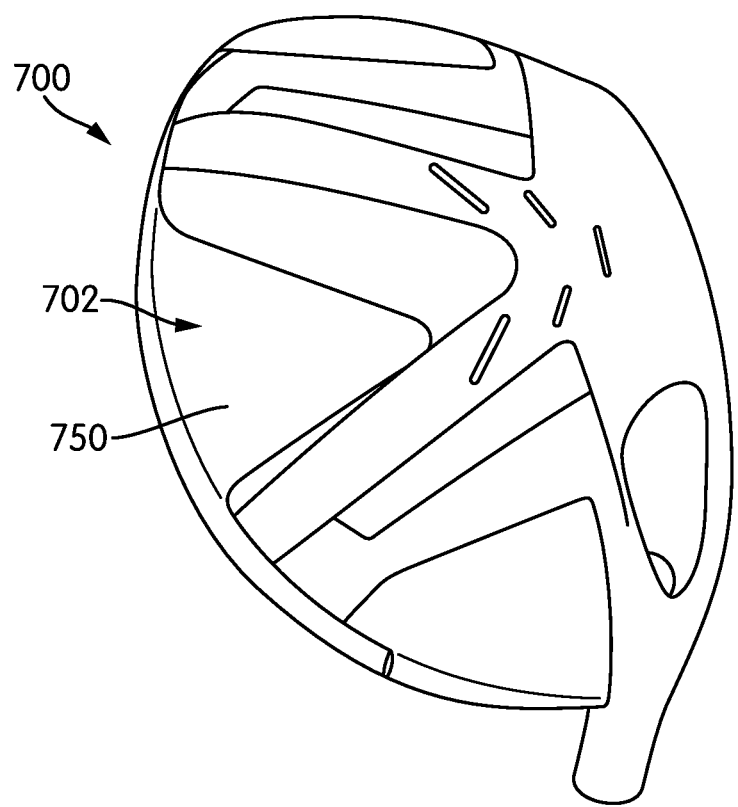
FIGS. 7A and 7B illustrate yet another golf club head body and cover arrangement according to one or more aspects described herein.
Figure 7B:
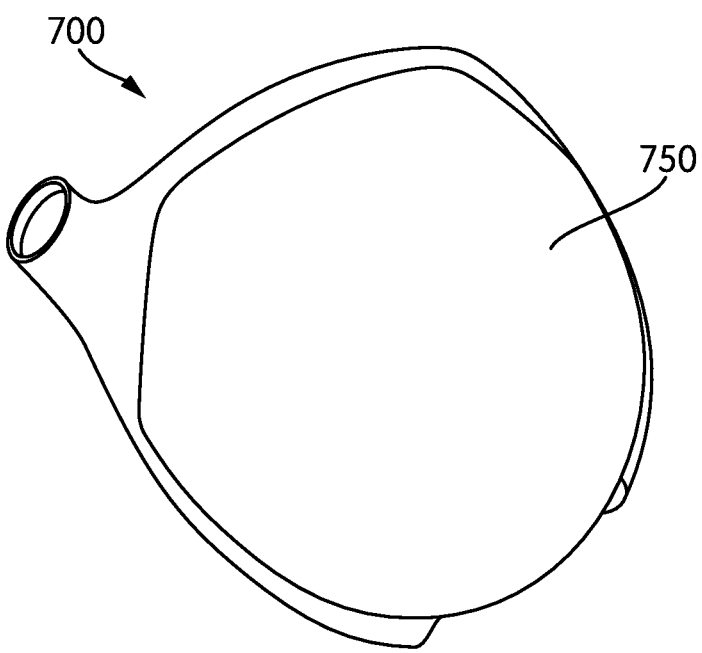

FIGS. 7A and 7B illustrate a golf club head 700 (similar to the golf club head 600 of FIG. 6A) having a cover 750 extending over the top surface of the golf club but not wrapping around to cover a portion of the sides of the golf club head. Thus, the void 702 formed in the golf club head is visible from the sole of the golf club head 700, but not from the top of the golf club head 700. In the arrangement of FIGS. 7A and 7B, an underside of the cover 750 is visible from the sole of the golf club head 700 (e.g., through the void 702).

In some examples, the cover 750 may be received in a recess (similar to recess 203 of FIG. 2) formed in the top of the golf club head. Further, the recess may have a depth and/or shape that corresponds to a thickness and/or shape of the cover 750 such that a top surface of the cover 750 will be flush with the top of the lip or ridge formed by the recess in the golf club head 700.

FIGS. 8A-8D illustrate another example golf club head according to one or more aspects described herein. The golf club head 800 may include a void 802 arranged in a rear of the golf club head and extending from the top to the sole of the golf club head (similar to the arrangements described above). The void 802 may extend from a rear edge 804 of the golf club head inward, toward a center or central region 806 of the golf club head and may be substantially v-shaped. In some examples, the void 802 may have other shapes, such as substantially square, rectangular, triangular, and the like. Similar to the arrangement discussed above, the void may have a greater width at the rear 804 of the golf club head 800 than near the central region 806. That is, the void 802 may narrow as it extends from the rear 804 to the central region 806 to form the v-shape. In some examples, the void 802 may have sides that are generally planar forming a smooth, substantially flat inner surface of the void 802 and may include a generally curved portion at a base of the v-shape, near the central region 806, which may be referred to as an interface area.

Figure 8A:
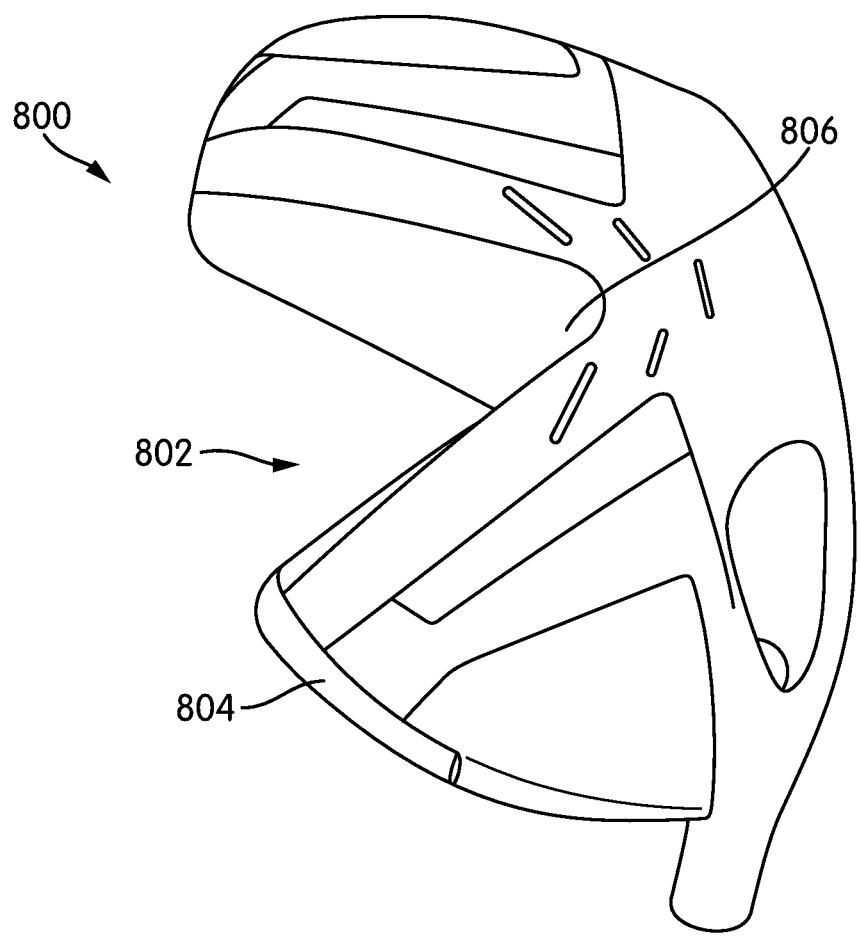
FIGS. 8A-8D illustrate yet another golf club head body and cover arrangement according to one or more aspects described herein.
Figure 8B:
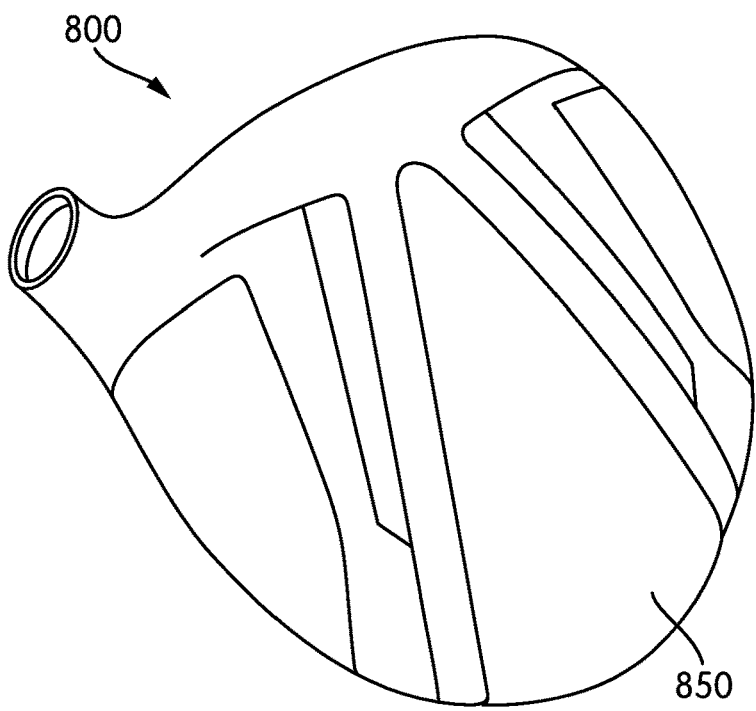
Figure 8C:
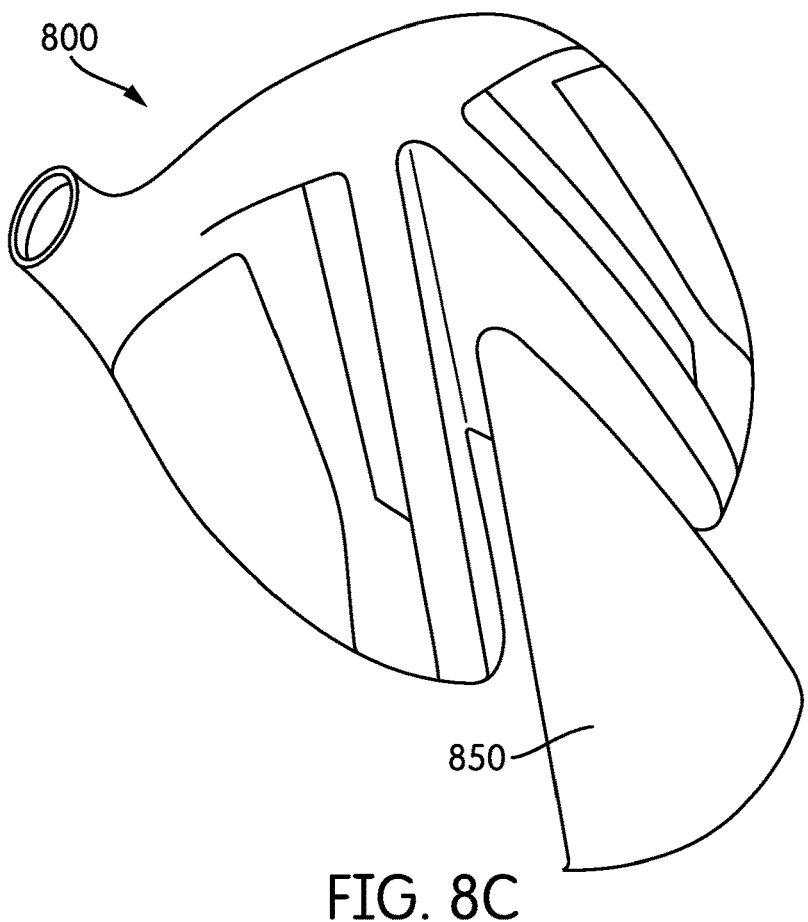

Similar to the arrangements discussed above, golf club head 800 may include a cover 850 configured to obscure the void, or portions of the void, when the golf club head 800 is viewed from the top (e.g., an at address position). FIG. 8B illustrates a top view of the golf club head 800 having a cover 850 arranged along the top of the golf club head 800 to cover the void 802. In the arrangement shown, the cover 850 may be shaped to correspond to the shape of the void 802 and, in some examples, may connect to the golf club head 800 to cover only the void 802. That is, the cover 850 may cover only the void 802 and may not cover any portion of the rear of the golf club head 800 (other covers discussed herein may also cover only the void or may cover other portions of the rear, sides, etc. of the golf club head). FIG. 8C illustrates the cover 850 partially removed from the golf club head 800. The cover 850 is shaped to correspond to the shape of the void 802 in order to fit into the top of the golf club head 800 and cover the void 802 along the top of the golf club head. The cover may be connected to the golf club head 800 using known methods of attachment, such as adhesives, mechanical fasteners, snap fits, friction fits, etc. In some examples, the cover may slide into slots arranged along a top portion of the generally planar sidewalls of the void 802. The slots may provide a friction fit and/or may include additional fasteners to secure the cover 850 to the golf club head 800.

Figure 8D:
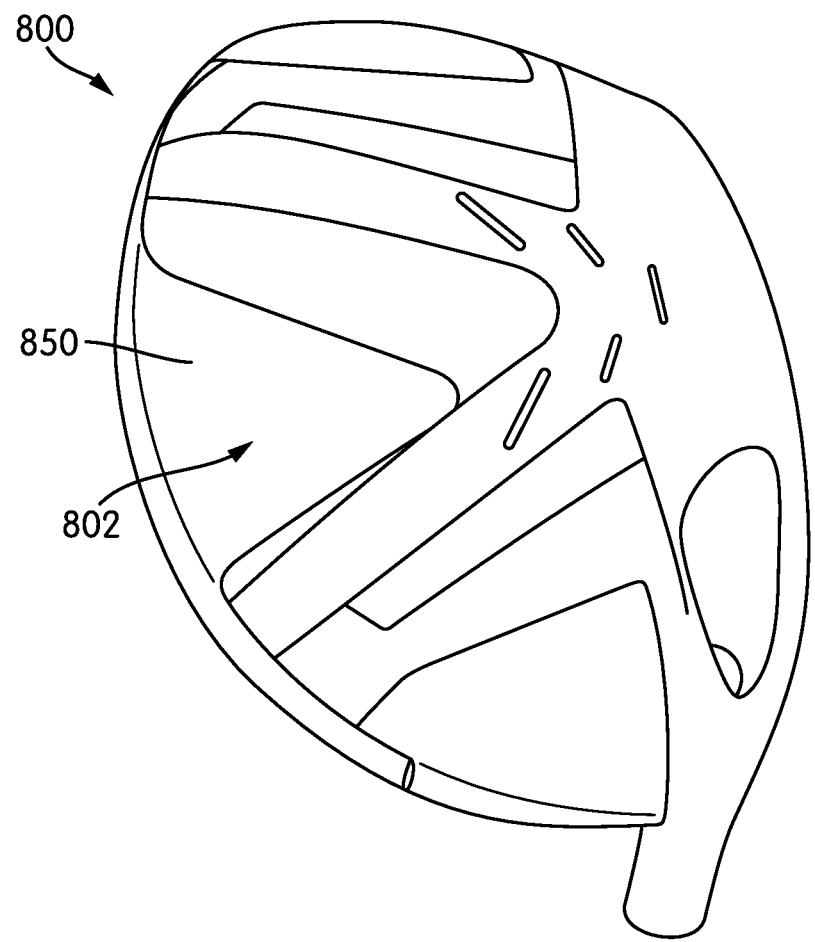

FIG. 8D illustrates the golf club head 800 from the bottom or sole. The void 802 is visible when the golf club head 800 is viewed from this side, and a bottom surface of the cover 850 is also visible. In some examples, the cover 850 may be removable and/or replaceable with other covers having differing performance characteristics. It is understood that in further alternative embodiments, additional structures can be a part of or associated with the cover 850 to provide desired characteristics of the club head.

Figure 9A:
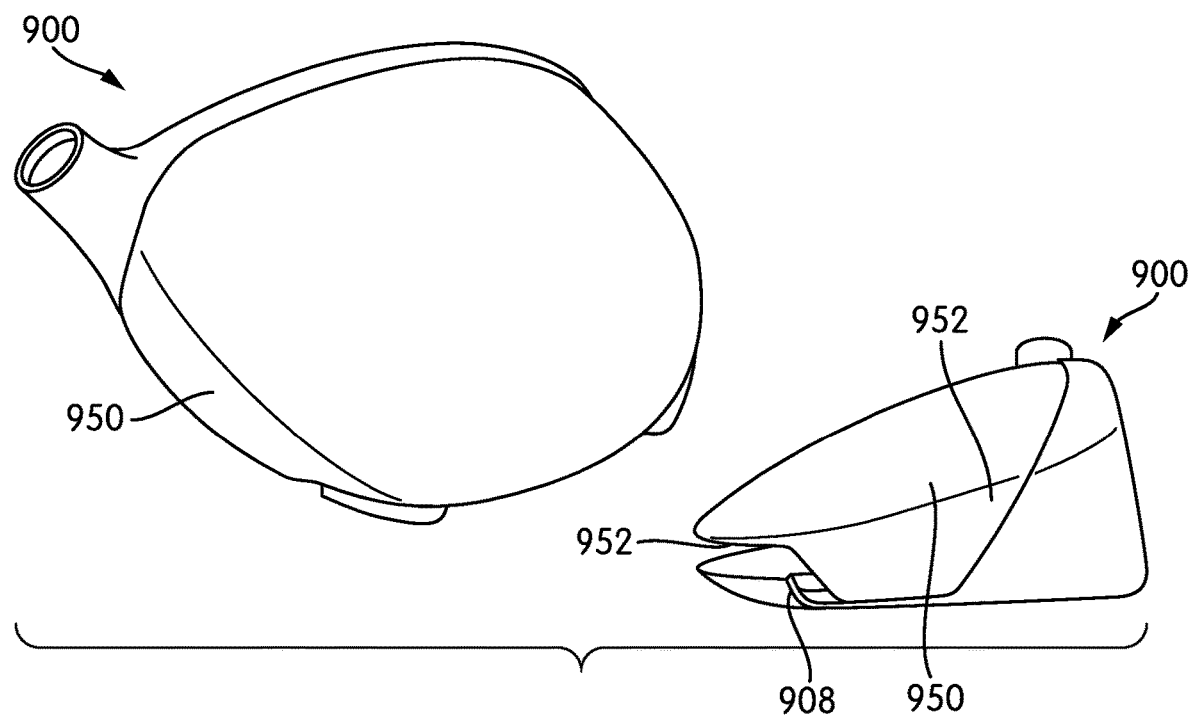
FIGS. 9A and 9B illustrate another golf club head body and cover arrangement according to one or more aspects described herein.
Figure 9B:
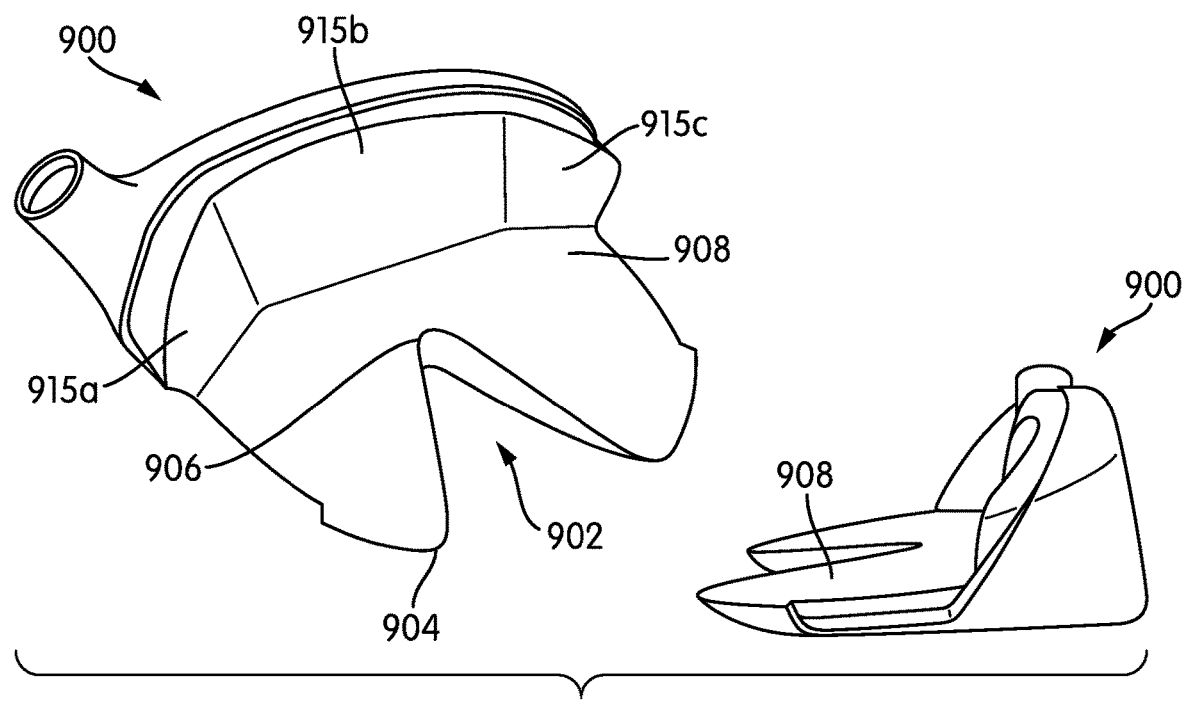

FIGS. 9A and 9B illustrate yet another golf club head arrangement according to one or more aspects described herein. FIG. 9A provides a perspective and toe side view of a golf club head 900 having a cover 950, while FIG. 9B provides a perspective and toe side view of the golf club head 900 of FIG. 9A with the cover 950 removed showing the club head body.

As shown in FIG. 9B, the golf club head 900 may include an open rear arrangement in which a portion of the top and sides of the rear of the golf club head 900 have been removed. That is, the rear of the golf club head 900 may include a substantially planar portion 908 located near a bottom or sole of the golf club head 900. In some arrangements, the substantially planar portion 908 may be the sole of the golf club head. The rear of the golf club head 900 may further include a plurality of sides 915a-915c extending from a top of a base of the body of the golf club head 900 to the substantially planar lower portion 908. The sides 915a-915c may, in some examples, be substantially vertical. Further, one or more sides 915a-915c may be angled with respect to another of sides 915a-915c (e.g., side 915a is angled with respect to 915b, side 915c is angled with respect to 915b).

This open rear arrangement may aid in reducing weight associated with the golf club head and may aid in lowering the center of gravity of the golf club head 900. In addition, weight may also be distributed more towards the rear of the heel and toe of the club head.

In some examples, the golf club head 900 may further include a void 902 formed in the substantially planar lower portion 908 of the golf club head 900. The void 902 may, in some examples, be substantially v-shaped and may extend from a rear edge 904 of the golf club head inward, toward a center or central region of the golf club head 906, similar to the arrangements discussed above. Such a geometric weighting feature assists in distributing weight towards the rear of the heel and toe of the club head.

As shown in FIG. 9A, the golf club head 900 may include a cover 950. The cover 950 may extend over the substantially open rear arrangement of the golf club head 900 to provide the appearance of a conventional golf club head when the golf club head 900 is viewed from the top. In some arrangements, a portion 952 of the cover 950 may extend over a portion of a side of the golf club head 900. This may aid in maintaining the aerodynamic characteristics of the golf club head 900 and may also aid in providing the appearance of a conventional golf club head. In some examples, a gap 954 may be formed between the cover 950 and the bottom or sole 908 of the golf club head. This gap 954 may further reduce the overall weight associated with the golf club head 900.

Figure 10A:
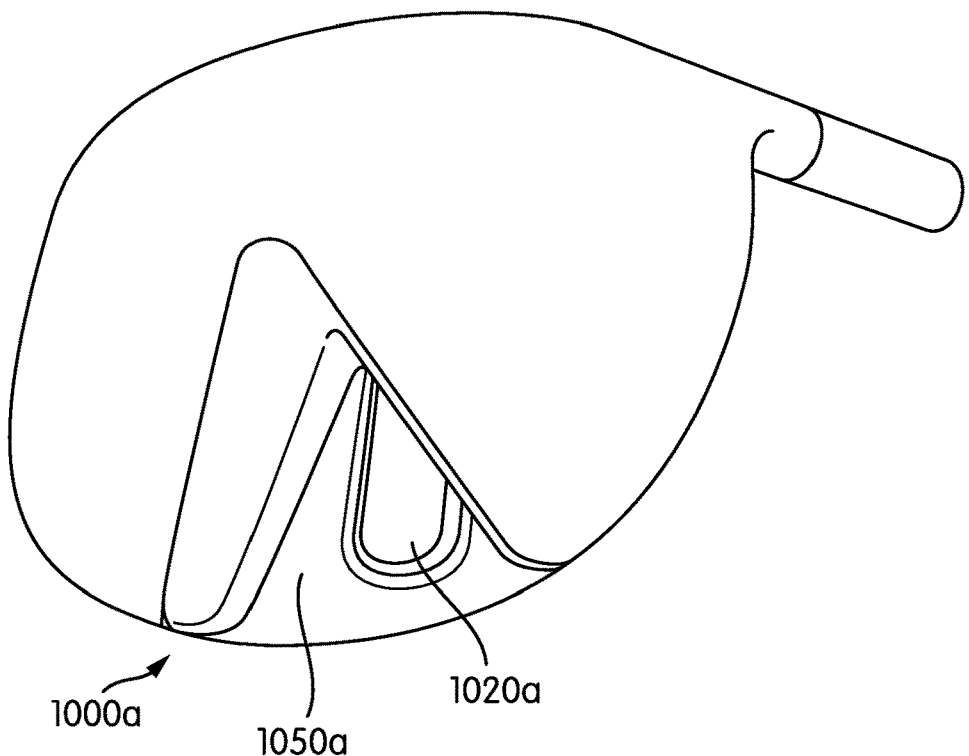
FIGS. 10A and 10B illustrate another golf club head body and cover arrangement having a sensor according to one or more aspects described herein.
Figure 10B:
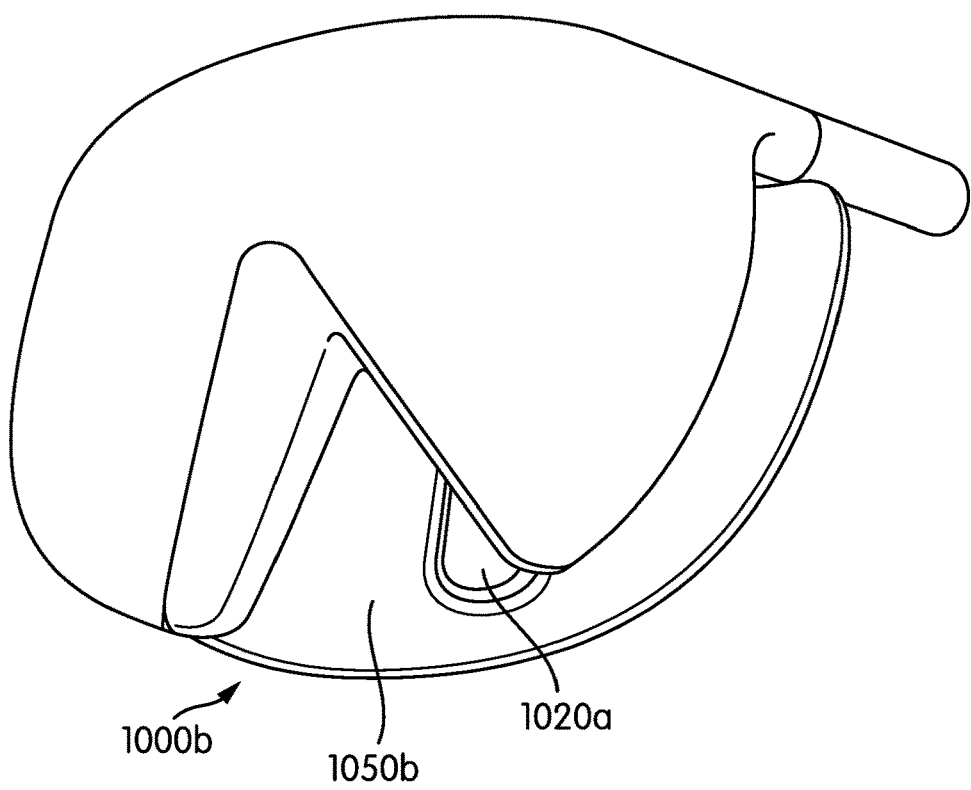

FIGS. 10A and 10B illustrate another golf club head arrangement according to one or more aspects described herein. The golf club head 1000 of FIG. 10A may include one or more sensors 1020a arranged within the golf club head. In some examples, the sensor 1020a may be arranged with the void formed in the rear of the golf club head and/or may be connected to a cover 1050a covering a portion of the void. In particular, an underside surface of the cover of the club head has an opening to receive the sensor. The opening is dimensioned to correspond in size to the sensor 1020a wherein the sensor is received in the opening. The sensor 1020a may be secured in the opening in an interference or friction fit or other mechanical fastening mechanisms can be utilized. The sensor 1020a may record and/or transmit performance data to a computing device (not shown). For instance, the sensor 1020a may detect performance data such as swing speed and transmit the data to a computing device that may be accessed by a user to track various performance characteristics. The data may be transmitted wirelessly using known methods of data transmission, or, in some examples, the sensor 1020a may be removed and connected to a computing device, such a via a USB port. As can be appreciated from FIG. 10A, the sensor 1020a is accessible from a sole of the club head through the void.

In some examples, the cover, or portion thereof, may be removable to access the sensor 1020a. For instance, FIG. 10B illustrates a golf club head 1000b which may also include a sensor 1020b connected thereto (e.g., to cover 1050b) to track and/or transmit performance data. The cover 1050b is shown partially removed from the golf club head 1000b to illustrate that the sensor 1020a may be accessed, removed, etc., as desired.

In some arrangements, the golf club heads described above, as well as those described below, may include one or more weights, weight assemblies, mechanisms or weighting features. The weighting features may be removable, adjustable, etc., as will be discussed more fully below. The weighting features described herein may be used, alone or in combination with other weighting features described herein, with any golf club head described herein and are not limited to the golf club head with which they are described.

Figure 11:
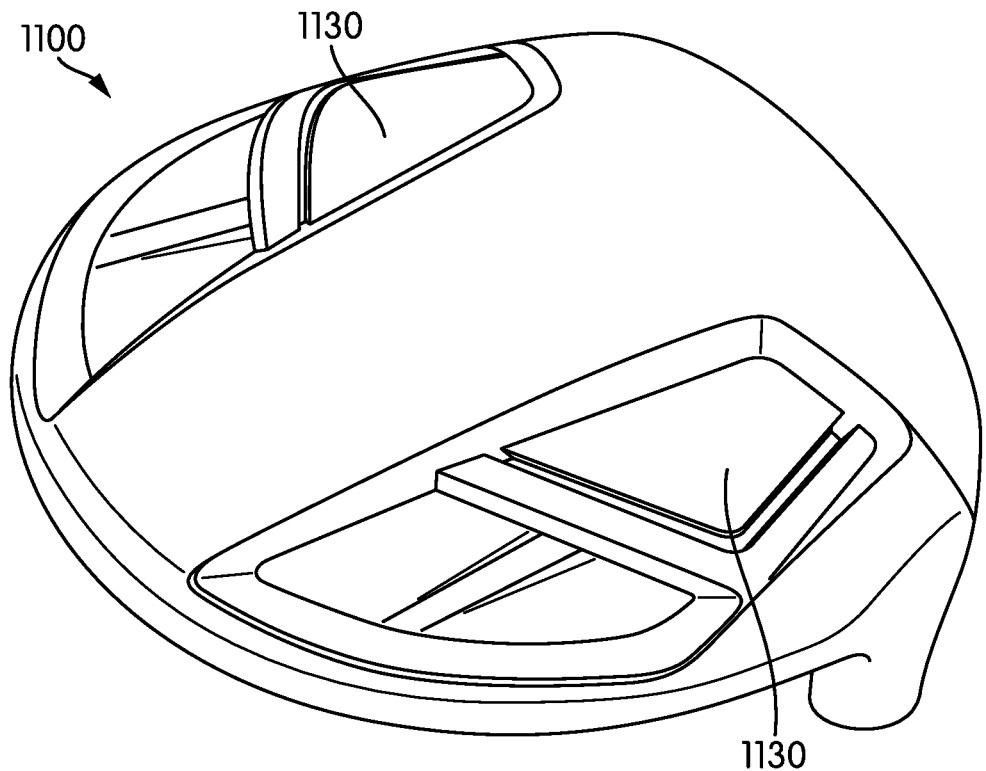
FIG. 11 illustrates a golf club head arrangement with removable inserts according to one or more aspects described herein.

FIG. 11 illustrates another example golf club head according to one or more aspects described herein. The golf club head 1100 may include one or more recesses formed in a sole of the golf club head 1100. One or more inserts 1130 may be inserted into the recesses. The inserts 1130 may be removable and/or interchangeable with other inserts to adjust one or more performance characteristics of the golf club head 1100. For instance, the inserts 1130 may have different properties to adjust the moment of inertia or center of gravity of the golf club head 1100. The inserts 1130 may be formed of any suitable material, such as lightweight metals, metal alloys, composite materials, plastic, etc. In some arrangements, the inserts 1130 may slide into the recess and be held in place by friction. Additionally or alternatively, the inserts 1130 may be connected to the golf club head 1100 by one or more screws or mechanical fasteners, snap fits, adhesives, and the like.

In some examples, the inserts 1130 may have different weighting characteristics to adjust performance of the golf club head 1100. The inserts 1130 may be the same weight as each other or different weights. In still other examples, the inserts 1130 may be removably connected to the golf club head in order to allow for replacement of the inserts with those having different weighting characteristics or other features.

Figure 12A:
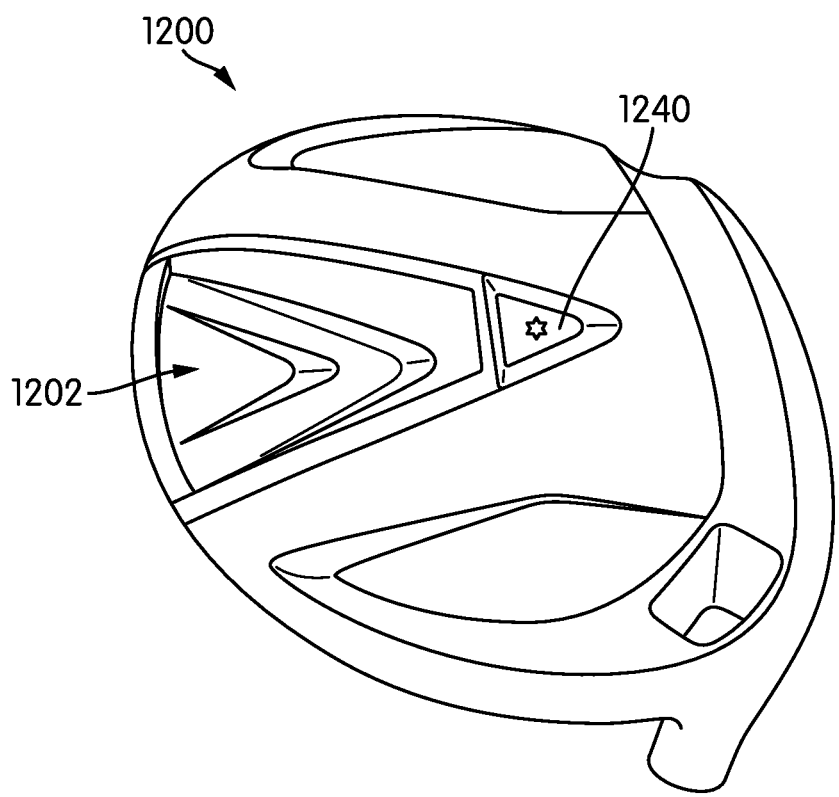
FIGS. 12A-12C illustrate a golf club head arrangement having a void formed in a rear of the club head body and including a weight arrangement according to one or more aspects described herein.
Figure 12B:
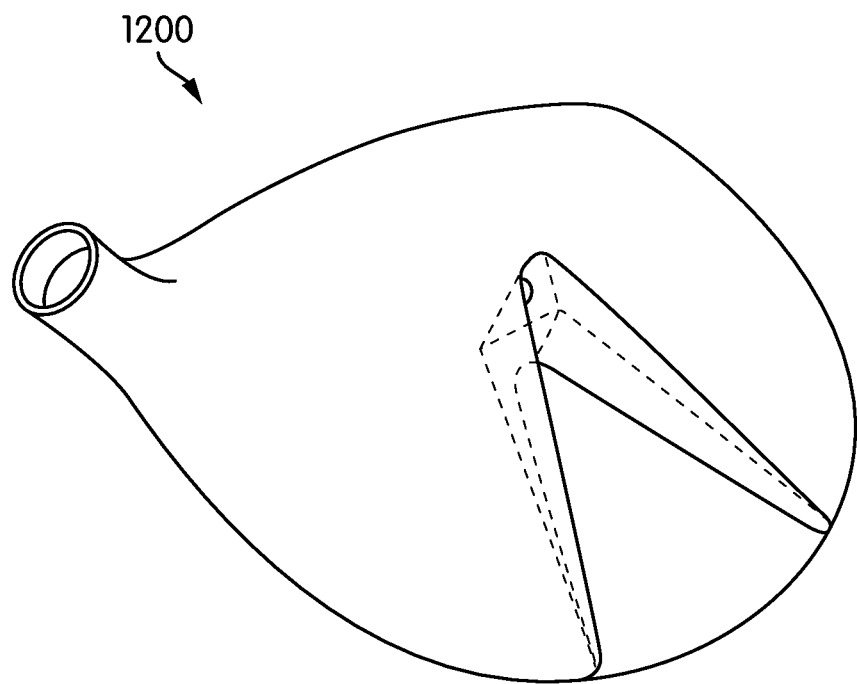
Figure 12C:
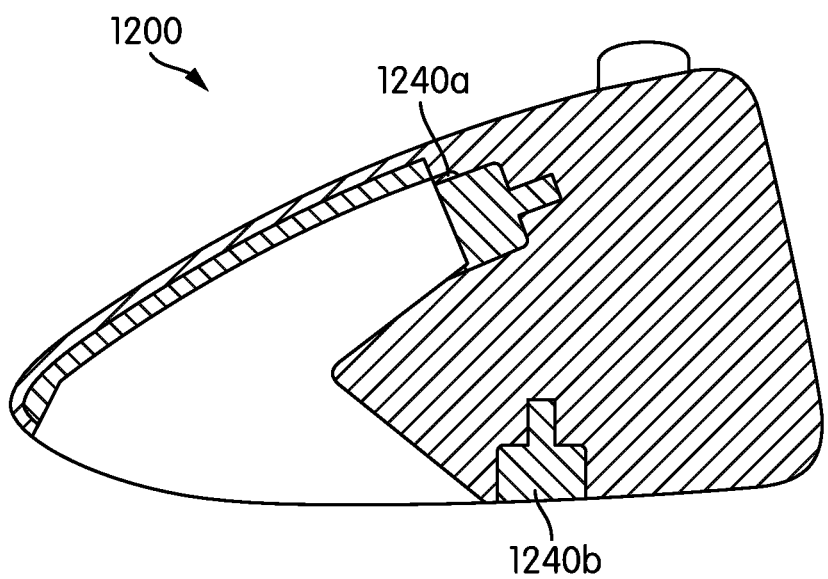

FIGS. 12A-12C illustrate another example golf club head according to one or more aspects described herein. The golf club head 1200 may include an arrangement similar to those described above in which a void 1202 is formed in the rear of the golf club head. In addition, the golf club head 1200 may include one or more weights 1240 arranged within the golf club head 1200. The weights may be provided to adjust the performance characteristics of the golf club head 1200.

For instance, the weights 1240 may adjust the center of gravity, moment of inertia, etc. of the golf club head 1200. The weights may, in some arrangements, be removable and/or interchangeable with other weights to adjust the performance characteristics of the golf club head 1200. That is, the open void 1202 provided in the rear of the golf club head 1200 may permit access to the weights 1240 (as shown in FIG. 12B). Thus, the weights 1240 may be removed from the golf club head 1200 and/or interchanged with other weight members.

In some examples, the weights 1240a and 1240b may have different weight characteristics. For instance, weight 1240a may be lighter than weight 1240b in order to adjust the center of gravity of the golf club head lower on the head 1200. The weights 1240a and 1240b may then be interchanged to adjust the performance characteristics of the golf club head 1200, or may be interchanged with other weight members (not shown in FIGS. 12A-12C) to further adjust the performance characteristics of the golf club head 1200. As can be appreciated from FIGS. 12B and 12C, the weight ports could be positioned in areas of the club head generally not possible with traditional club heads. Because of the structure defining the void in the club head, the weight ports are more readily accessible.

Figure 13A:
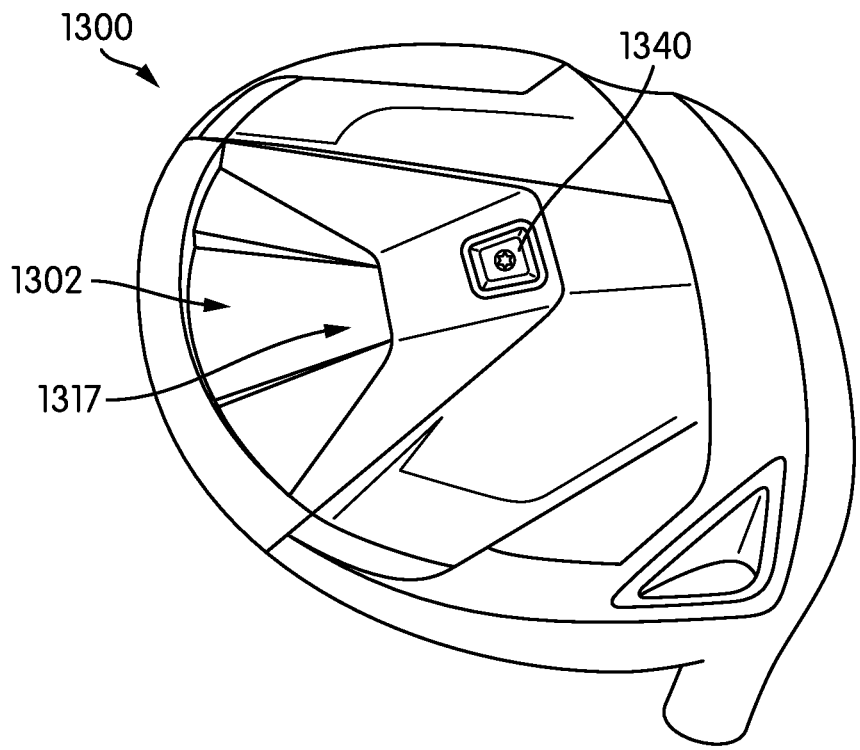
FIGS. 13A and 13B illustrate another golf club head arrangement having a void and having a weight arrangement according to one or more aspects described herein.
Figure 13B:
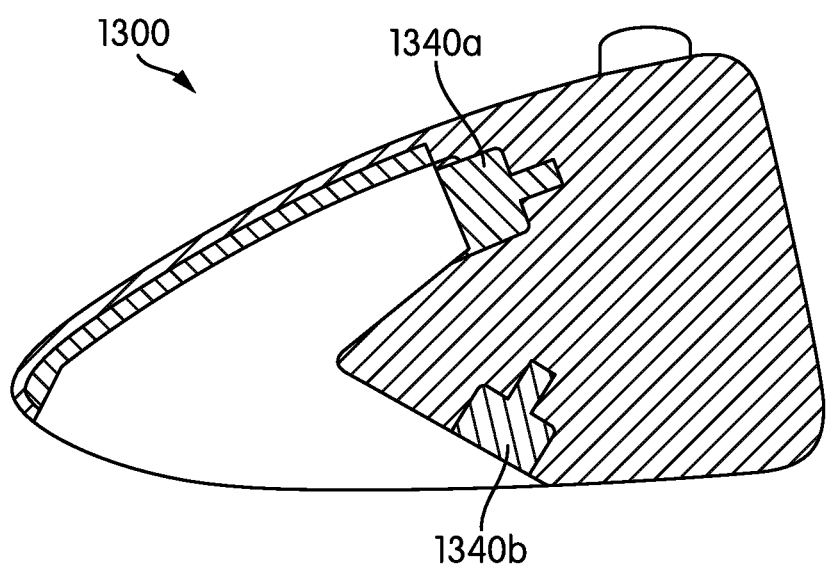

FIGS. 13A and 13B illustrate another golf club head arrangement having a void 1302 formed in the rear of the golf club head and one or more weights 1340. Similar to the arrangements discussed above, the void 1302 may be substantially v-shaped or may have other shapes, as discussed above. The weights 1340 may be adjustable, removable, interchangeable, replaceable, etc. and may be accessed, in some examples, via the void 1302 formed in the rear of the golf club head 1300. For instance, as shown in FIGS. 13A and 13B, weight 1340b may be accessed from an interface area or from a base of the void (e.g., the bottom of the v-shape). The weights 1340a, 1340b may be connected to the golf club head using mechanical fasteners, adhesives, snap fits, etc. In some examples, the weights 1340 may be connected to the golf club head 1300 with screws. Accordingly, the screw may be accessed and removed via the void 1302 to remove weight 1340b.

Further, the void 1302 may provide a gap 1317 through which the weight 1340a may be accessed. Accordingly, a screw or other fastener connecting weight 1340a may be removed via the gap 1317 and the weight may be adjusted, removed, replaced, etc.

Similar to the arrangement described above with respect to FIGS. 12A and 12B, the weights 1340a and 1340b may have different weights or weight characteristics in order to adjust performance of the golf club head 1300. The weights may be formed of any suitable material.

Figure 14A:
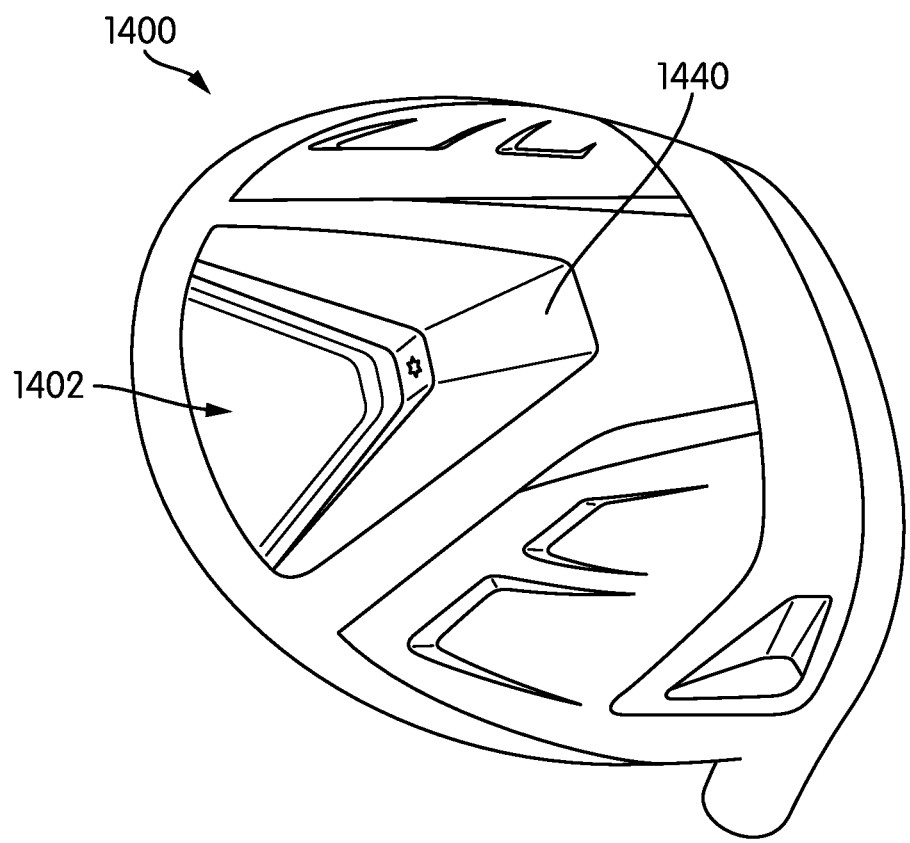
FIGS. 14A-14C illustrate another golf club head arrangement having a void in the rear of the golf club head body and an adjustable weight arrangement according to one or more aspects described herein.
Figure 14B:
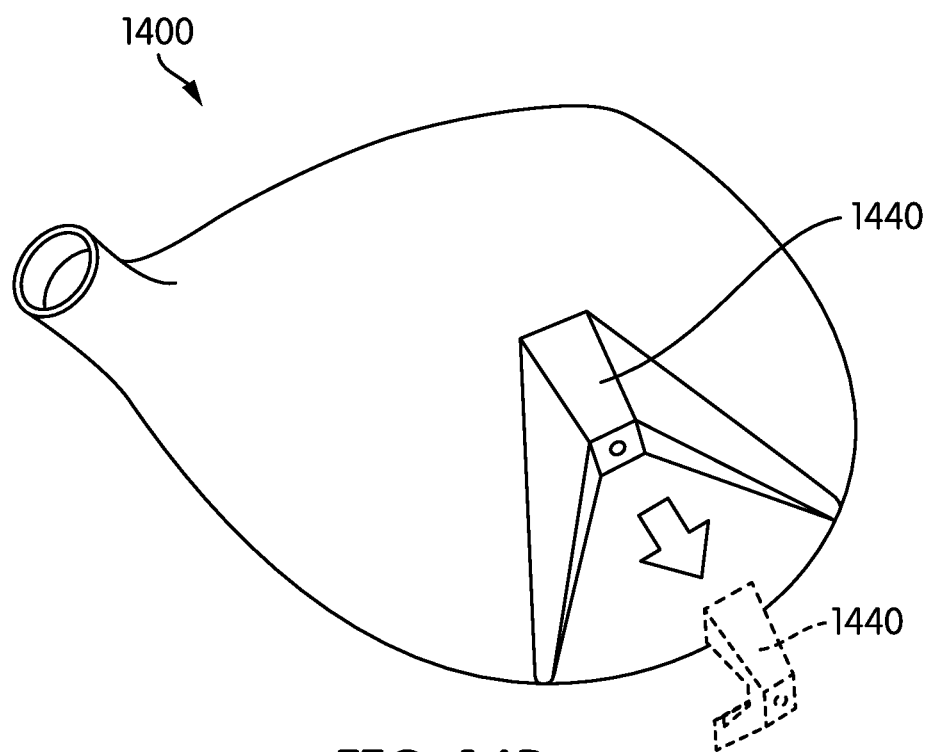
Figure 14C:
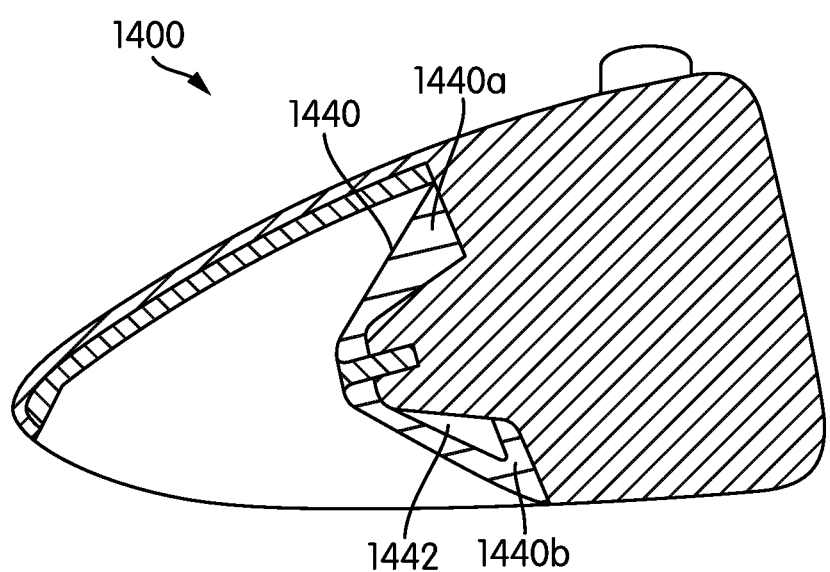

FIGS. 14A-14C illustrate another golf club head arrangement according to one or more aspects described herein. The golf club head 1400 may include a void 1402 formed in the rear of the golf club head 1400. In addition, the golf club head 1400 may include a weight 1440 arranged in the rear of the golf club head 1400. In some examples, the weight 1440 may have two sides 1440a, 1440b, each having different properties. For instance, one side 1440a of weight 1440 may be heavier than a second side 1440b of the weight 1440. This difference in weight characteristics may be due to different materials used, density of materials used, etc. in forming the weight 1440. The moveable weight 1440 is capable of altering the performance characteristics of the golf club head.

Additionally or alternatively, the structure of each side may be different. For instance, as shown in FIG. 14C, one side 1440b of the weight may be hollow to reduce weight associated with that side, while the other side 1440a may be solid to make it heavier.

The weight may be removably connected to the golf club head via screws or other mechanical fasteners, and the like. That is, the user may access the fastener of the weight 1440 via the void 1402 in the rear of the golf club head 1400 in order to remove, adjust, etc. the weight 1440. The weight 1440 may be removed from the golf club head 1400 and a user may rotate or flip the weight 1440 and connect it in different configurations in order to adjust the performance characteristics of the golf club head. That is, adjustment of the weight 1440 may adjust the weight characteristics (and thus the performance characteristics) in a high to low or top to sole manner (e.g., adjusting the center of gravity of the golf club head 1400 higher or lower on the golf club head 1400).

Figure 15A:
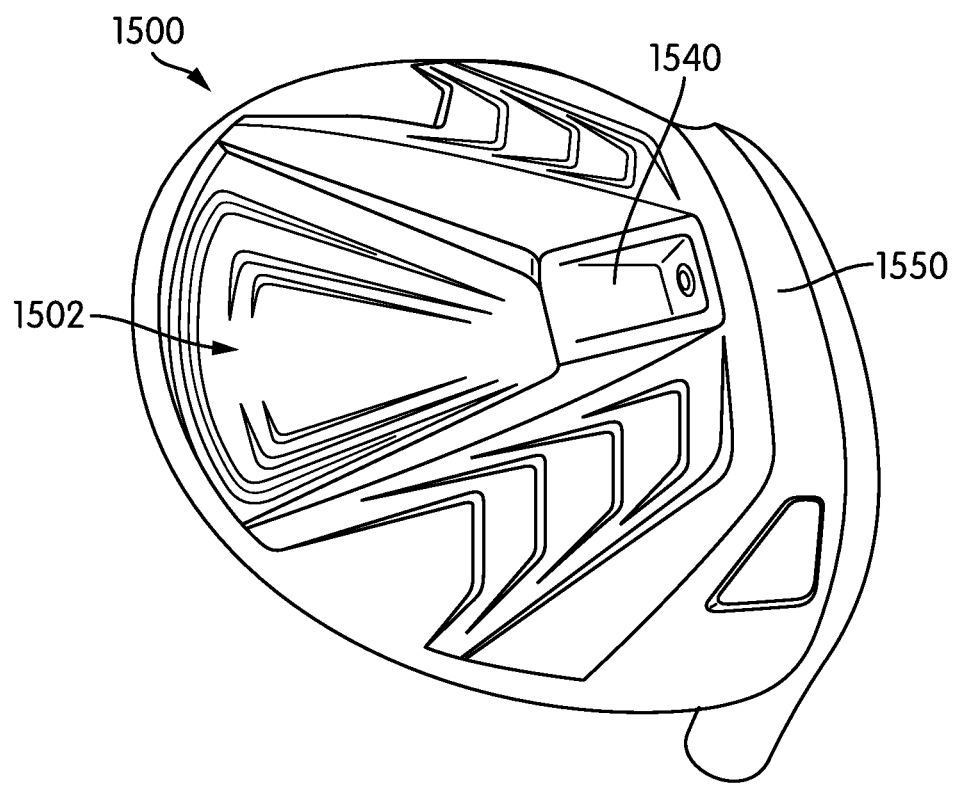
FIGS. 15A and 15B illustrate another golf club head having a void and adjustable weight arrangement according to one or more aspects described herein.
Figure 15B:
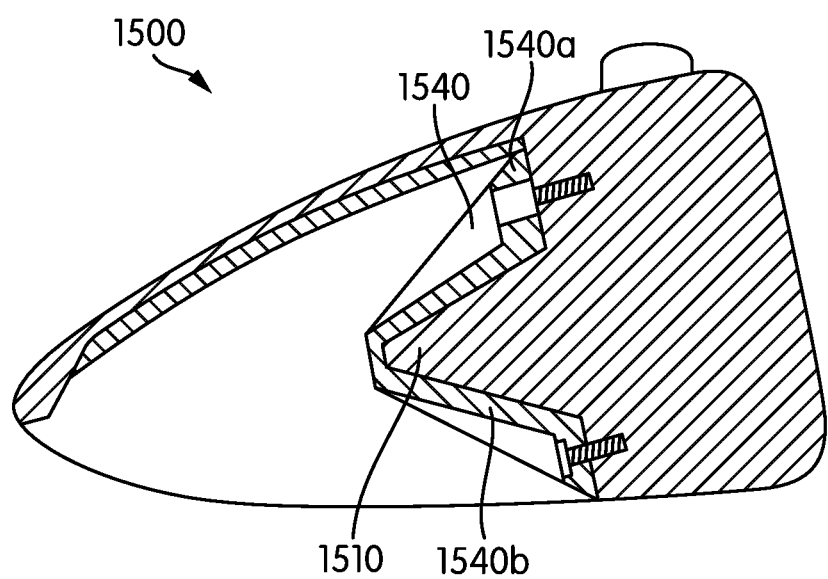

FIGS. 15A and 15B illustrate another example of an adjustable weight arrangement in which a golf club head 1500 may have an adjustable, removable, etc. weight 1540. In the arrangement shown, the weight 1540 may again have two sides or ends, each having different weighting characteristics to allow for adjustment of the performance characteristics of the golf club head 1500 with adjustment of the weight 1540. As shown in FIG. 15B, the weight may be connected at two points in this arrangement, rather than one point as shown in FIGS. 14A-14C. However, the single point of connection may be used with this arrangement without departing from the invention.

Similar to the arrangement described above, the weight 1540 may be substantially v-shaped (as shown in FIG. 15B) and may extend over a base of the void 1502. At the interface area at the void 1502, the club head body may have a projection 1510 that extends away from the ball striking face and towards or into the void 1502. As shown in FIG. 15B, the weight 1540 defines a cavity dimensioned to receive the projection 1510. Once secured, the weight 1540 fits and conforms about the projection 1510. The weight 1540 may include multiple ends having different characteristics, such as weight characteristics. For example, one end 1540a may be heavier than the other end 1540b. This may be due to a difference in materials used to construct the weight or, in some examples, the structure of the ends 1540a, 1540b. For instance, one end, such as end 1540a, may be thicker than the other end 1540b. The added thickness of material may result in additional weight that may be used to adjust the performance characteristics of the golf club head 1500. The ends 1540a, 1540b may also support additional weight elements thereon. As can be appreciated from FIG. 15B, the weight 1540 can be rotated or adjusted such that a heavier end of the weight 1540 is positioned either closer to the crown or closer to the sole of the club head 1500.

Similar to the arrangement in FIGS. 14A-14C, the weight may be accessed via the void 1502 and may be removed and replaced in an alternate configuration (second side down vs. second side up, etc.) in order to adjust the performance characteristics of the golf club head. In some examples, the weight 1540 may be a single piece member, while in other examples, the weight 1540 may be formed of multiple pieces joined together or separately connected to the golf club head 1500. As further shown in FIG. 15B, a pair of threaded fasteners are used to secure the weight 1540 to the club head 1500. Because the structure of the club head 1500, the void 1502 provides ready access to the fasteners for removal or adjustment of the weight 1540. As further shown in FIG. 15A (while not shown in FIG. 15B), the club head 1500 may have a channel 1550 extending across the sole of the club head 1500 from a heel to a toe and generally adjacent the ball striking face. The channel allows a certain amount of compression of the club head upon ball impact. This feature may cooperate with the other club head structures and weighting characteristics to further enhance performance of the club.

Figure 16:
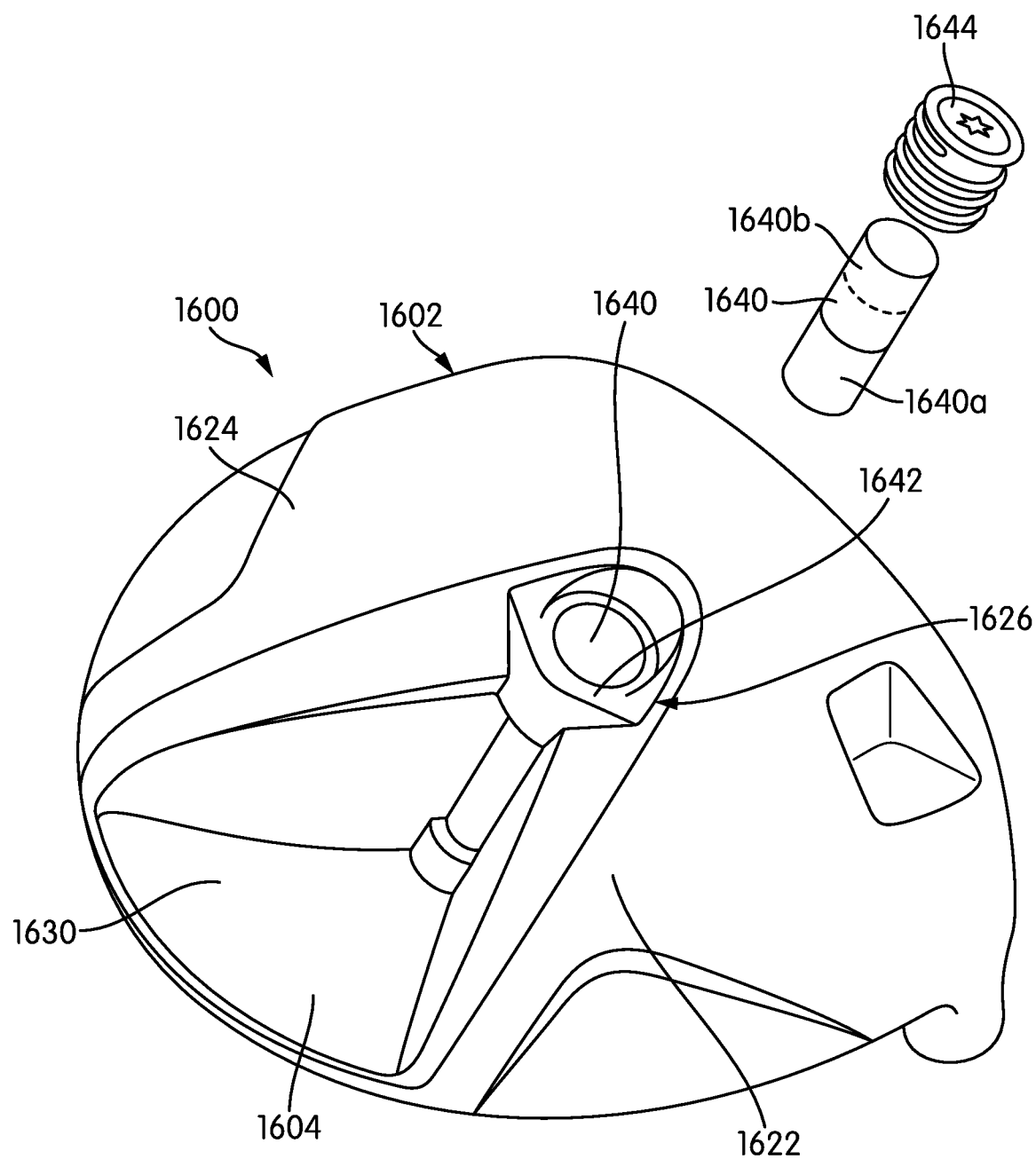
FIG. 16 illustrates another golf club head having a void in the club head body and an adjustable weight arrangement according to one or more aspects described herein.

FIG. 16 illustrates yet another golf club head 1600 according to the present invention.

As discussed with other embodiments, the golf club head 1600 has the body 1602 having a first leg 1622 and second leg 1624 that are spaced by a void 1630. The void 1630 is generally v-shaped similar to other embodiments. The golf club head 1600 further defines an interface area 1626. A cover 1604 is integral with or otherwise connected to the body 1602. The first leg 1622 and second leg 1624 converge toward one another to the interface area 1626.

The golf club head 1600 utilizes a weight assembly to further enhance performance of the club head 1600. The weight assembly or weight is operably associated with the interface area 1626. In an exemplary embodiment, the interface area 1626 of the head 1600 supports a receptacle or receiver 1642 in the form of a receiving tube 1642 in an exemplary embodiment. A weight 1640 of the weight assembly is configured to be received by the receiving tube 1642. FIG. 16 shows the weight 1640 both in the tube 1642 and further in an exploded configuration. The weight 1640 may, in some examples, be received in the receiving tube 1642 incorporated into the golf club head 1600 and, in some arrangements, arranged at the base of the v-shaped void 1602 formed in the golf club head 1600. Thus, as shown in FIG. 16, the interface area 1626 supports the receiving tube 1642 generally at the junction of the first leg 1622 and the second leg 1624. The first leg 1622 and the second leg 1624 converge to the receiving tube 1642. The receiving tube 1642 generally has a height that extends from an underside of the cover 1604 to proximate the sole surface of the club head body 1602. The receiving tube 1642 may have varying heights as desired and be mounted have one or both ends spaced away from the underside of the crown or sole. It is understood that the weight 1640 may have one end 1640a that is heavier than an opposite end 1640b wherein the weight 1640 can be flipped as desired. Thus, differing weighting characteristics and arrangements are possible to alter the performance characteristics of the club head 1600. A threaded fastener 1644 can also be provided to mate with internal threads in the receiving tube 1642 to secure the weight 1640 in the receiving tube 1642.

The receiving tube 1642 and weight 1640 may have corresponding shapes such that the weight 1640 may slide into the receiving tube 1642. In some examples, the weight 1640 and receiving tube 1642 may be cylindrical, square, rectangular, etc. The receiving tube 1642 may have a longitudinal axis and the weight may have a longitudinal axis. The longitudinal axes may generally correspond when the weight 1640 is received in the tube 1642. In the embodiment shown in FIG. 16, the longitudinal axis of the tube 1642 is generally vertical and generally parallel to the ball striking face with the understanding that the ball striking face may have a certain amount of loft. The received tube 1642 may be integrally formed with one or more portions of the golf club head 1600 or may be formed as a separate portion and connected to the golf club head 1600 using known methods of connection, such as adhesives, mechanical fasteners, snap fits, and the like.

In the example shown in FIG. 16, the receiving tube 1642 is generally vertical in arrangement (e.g., in a vertical position when the golf club head is in an at address position). However, various other tube arrangements, positions, etc. may be used without departing from the invention. Some other arrangements, positions, etc. will be described more fully below.

The receiving tube 1642 may receive the weight 1640 which may be a single weighted member or may have ends with different weighting characteristics or weight values. For instance, the weight 1640 may have one end 1640a heavier than an opposite end 1640b. In some arrangements, the heavier end may be positioned towards the top of the golf club head to provide a first weight arrangement or alternatively, towards the bottom of the golf club head to provide a second weight arrangement. The different weight arrangements can affect performance of the club head 1600. The v-shaped void 1630 may permit easier access to the body of the golf club head 1600, weights 1640, etc. to more easily adjust weight from a high position to a low position. Other structures can be operably associated with the interface area at the void 1630 to removably support weight members thereon.

Additionally or alternatively, the weight member 1640 may include multiple weights or portions of the weight 1640 that can be releasably fastened to one another; e.g. three pieces with one piece being heaviest (e.g., shown in phantom lines in FIG. 16). The different weights may also have different weight values. In some examples, the heavy member can be at either end or at a middle of the member. Various other combinations of weight members may be used without departing from the invention. The overall height of the weight member 1640 along with the length of the threaded fastener 1644 may generally correspond to the height of the receiver tube 1642 so that the weight 1640 fits snugly in the tube 1642 and does not slide within the tube during use. It is understood that the tube 1642 and/or the weight 1640 may have shock absorbing features if desired.

In some arrangements, the base of the v-shaped void may be angled and the receiving tube 1642 may conform to the angle. Thus, the weight member may be adjusted in a hybrid fashion, e.g., high/low, fore/aft, by adjusting the weight 1640 within the receiving tube 1642. Multiple receiving tubes 1642 can also be utilized in vertical, horizontal or angular configurations. The receiving tube(s) may also be positioned at locations spaced away from the interface area 1626 including along surfaces of the first leg 1622 and the second leg 1624.

The position of the weight 1640 and receiving tube 1642 at the base of the v-shaped void may aid in adjusting the center of gravity near a central region of the golf club head 1600. Weight in the tube 1642 can be focused in the tube 1642 to provide a low center of gravity or a high center of gravity. The weight 1640 can also be configured to provide a more neutral center of gravity. The insertion or removal of weight 1640 may add or remove additional weight from the overall weight of the golf club head 1600 and may add or remove weight from the central region, thereby adjusting the performance characteristics of the golf club head 1600. Such weighting characteristics provided by the weight 1640 in the tube 1642 can further impact golf ball trajectory by providing a change in ball spin. It has been determined that this weighting feature can provide a change of approximately 500-600 rpm in ball spin. Utilizing the adjustable weight 1640 in the tube 1642 to affect ball spin as well as considering launch angle and ball speed, a golfer can customize the golf club to achieve desired ball trajectory, distance and other characteristics. The adjustable weighting feature can further be used to customize the club head 1600 to produce a desired ball spin for a particular golf ball being used.

The weight assembly utilized in FIG. 16 can also take certain alternative forms. For example, the club head body can be formed such that the first leg and the second leg define the v-shaped void therebetween. In this embodiment, the void extends completely from a crown of the club head to a sole of the club head. The sides of the legs facing into the void may be closed with material defining side surfaces or the sides of the legs could have an open configuration. A cover member can be provided that is also v-shaped to correspond to the v-shaped void. The cover member has a top portion and depending legs as well as structure defining the receiving tube therein. The receiving tube is configured to receive the weights as described above. The cover member is positioned in the v-shaped void wherein the top portion of the cover member is attached to the crown of the club head body. The depending legs of the cover member confront the legs of the club head body and may also be connected to the legs of the club head body. As such, a club head body is formed similar to the club head shown in FIG. 16. In one exemplary embodiment, the club head body is a cast metal body such as titanium. The cover member is formed in a plastic injection molding operation. The plastic cover member reduces the overall weight of the club head as opposed to such corresponding structures also being made from metal such as titanium. Coating operations could be utilized on the plastic cover member to provide a metallic appearance and to further strengthen the member. It is further understood that in the various embodiments described herein utilizing additional weight members, the weight members may be of a material heavier than the remainder of the golf club head or portions of the head. In other exemplary embodiments, the weight member(s) may be made of the same material as the remainder of the golf club head or portions thereof. In certain exemplary embodiments, the weight member may be formed from steel, aluminum, titanium, magnesium, tungsten, graphite, or composite materials, as well as alloys and/or combinations thereof.

Figure 17A:
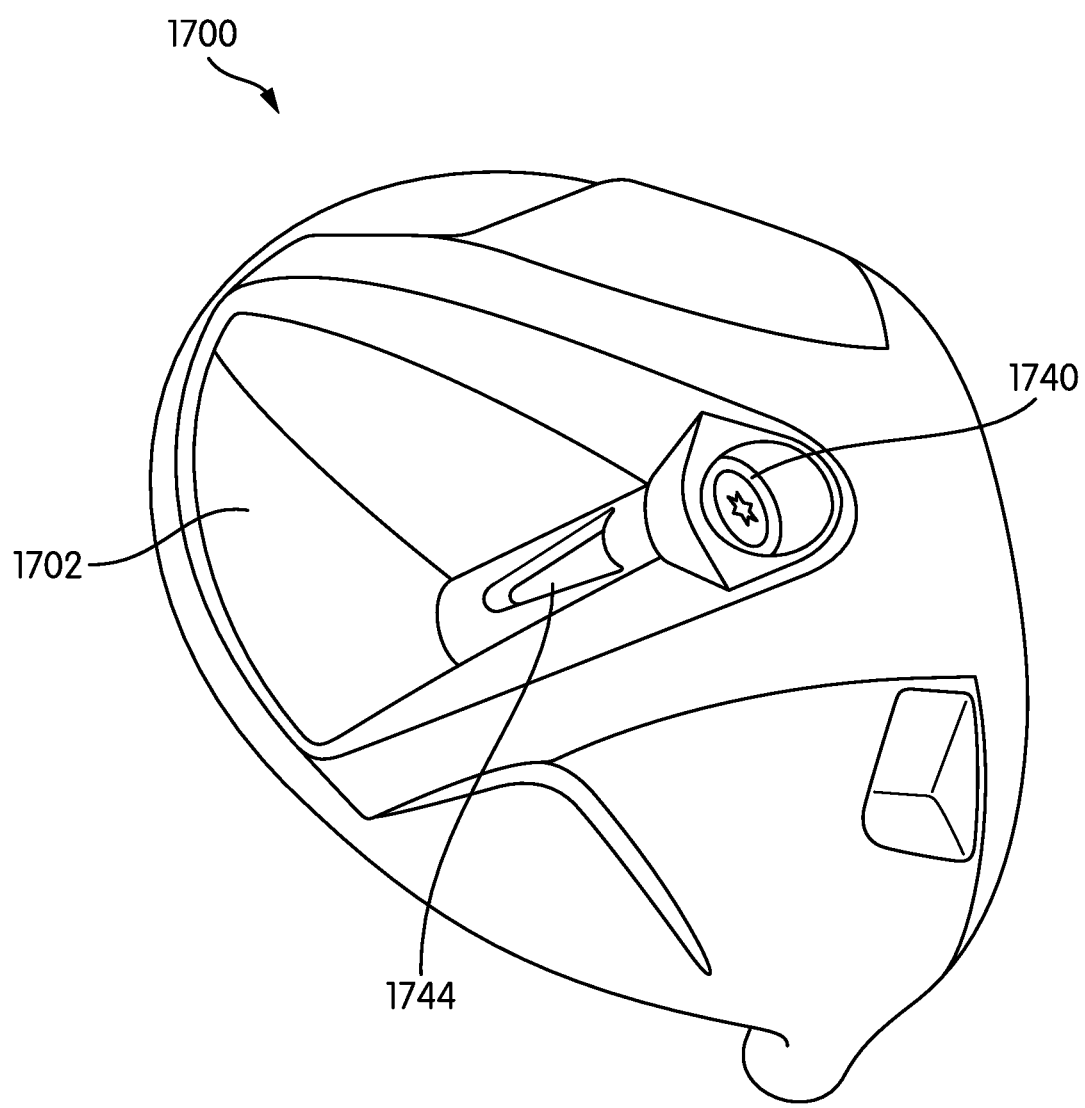
FIGS. 17A and 17B illustrate yet another golf club head arrangement having a void in the club head body and an adjustable weight arrangement according to one or more aspects described herein.
Figure 17B:
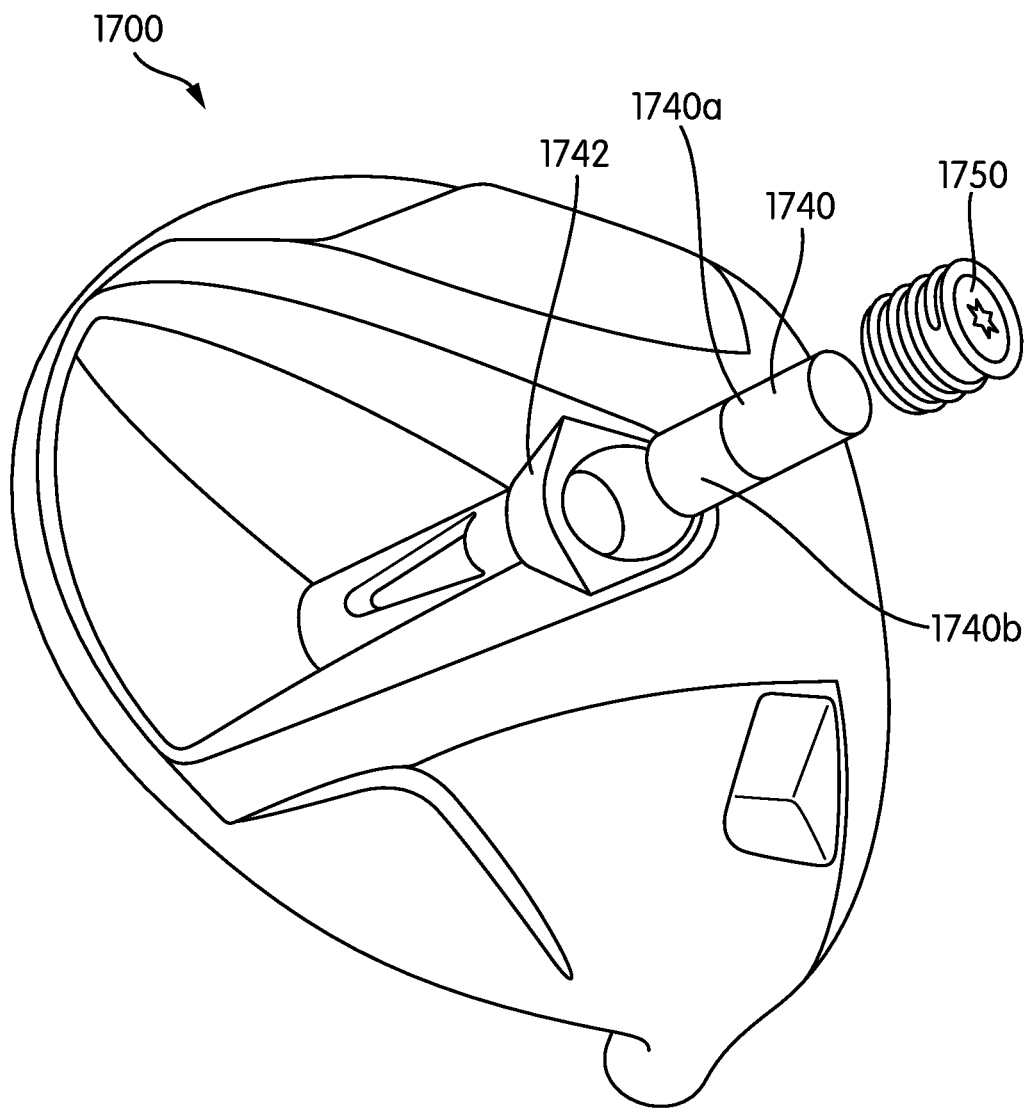

FIGS. 17A and 17B illustrate another weight arrangement similar to FIG. 16. The golf club head 1700 may include club head body defining a v-shaped void 1702 in the rear of the golf club head 1700. The club head body has the pair of spaced legs defining the void 1702 wherein the legs converge and an interface area is defined in the club head body. Further, the golf club head 1700 may include a weight 1740 arranged in the interface area or generally at or proximate a central region of the golf club head (e.g., at the base of the v-shaped void 1702). The weight assembly or weight is operably associated with the interface area. Similar to the arrangement of FIG. 16, the weight may be cylindrical and may be received in a receiver such as a receiving tube 1742 in an exemplary embodiment.

Similar to the arrangement discussed above, the weight may have ends having different weighting characteristics or weight values. For instance, one end 1740*a* may be heavier than the other end 1740*b*. The additional weight may be due to end 1740*a* being a larger portion of the weight 1740 (as shown in FIG. 17B) or the material used to form the weight may differ for each end. The weight 1740 may be removed from the receiving tube 1742 and rotated or flipped to adjust the weight distribution associated with the weight 1740. That is, the heavier end may be proximal an upper portion of the receiving tube 1742 (e.g., proximal the sole of the golf club head) or the weight 1740 may be reversed so that the heavier end is proximal the top or crown of the golf club head 1740.

Additionally or alternatively, the weight may be comprised of multiple weight portions having varying weight characteristics, as described above. For instance, portions 1740*a* and 1740*b* may be separate portions of the weight 1740 that may be connected together in multiple configurations to adjust the weight distribution and thereby adjust the performance characteristics of the golf club head 1700. Although two weight portions are shown in FIG. 17B, three or more portions may be used to form the weight 1740 as desired.

In some examples, the receiving tube 1742 may include a fastener 1750 to secure the weight 1740 within the receiving tube 1742. For instance, a screw or other threaded fastener 1750 may be inserted into the receiving tube 1742 after the weight 1740 has been inserted to maintain the position of the weight 1740. The receiving tube 1742 has mating threads to receive the threaded fastener 1750. In order to remove or adjust the weight, the fastener 1750 may be removed and the weight 1740 may then be removed. Similar to the arrangements discussed above, access to the weight 1740 and fastener 1750 may be via the void 1702 formed in the rear of the golf club head 1700. It is understood that the weight 1740 could be secured in the tube 1740 in several other alternative embodiments.

Additionally or alternatively, the weight 1740 may be threaded or connected to a threaded fastener 1750 such that adjustment of the thread moves the weight 1740 within the receiving tube 1742. For instance, turning of the threaded fastener 1750 may move the fastener 1750 up or down within the receiving tube 1742. A weight 1740 connected to the fastener 1750 may then also move up and down with the threaded fastener 1750. As further shown in FIGS. 17A and 17B, the receiving tube 1742 may have a window 1744 to allow one to see the weight 1740 in the tube 1742. The weight(s) 1740 may be provided with indicia to the allow for easy determination of the particular weighting arrangement provided.

Although the above-described arrangements including a receiving tube generally illustrate an exterior of the receiving tube being exposed, the receiving tube may be enclosed within a rear portion of the golf club head without departing from the invention. For example, the interface area of the golf club head may completely enclose the receiving tube or some other structure to receive a weight member.

Figure 18:
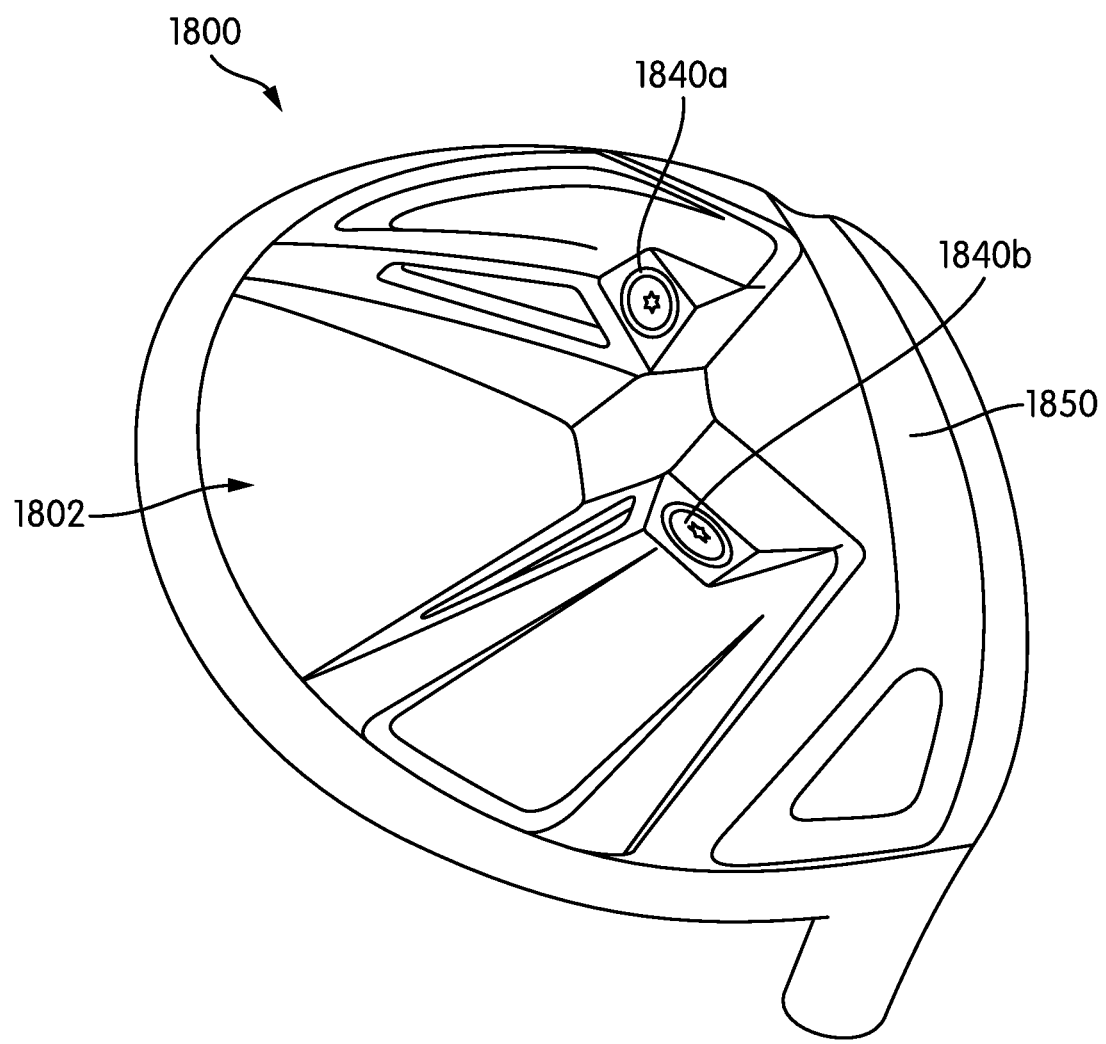
FIG. 18 illustrates another golf club head arrangement having adjustable weights according to one or more aspects described herein.

FIG. 18 illustrates yet another golf club head having a void 1802 formed in the rear and having adjustable weight members. The club head 1800 has the pair of spaced legs defining the void 1802 underneath the cover or crown portion of the club head. The golf club head 1800 includes two weight members 1840*a* and 1840*b*. The two weight members 1840*a*, 1840*b* may be arranged similar to the weights of FIGS. 16 and 17 such that one end may be heavier than another end. Further, the weight members 1840*a*, 1840*b* may be received in a receiving tube (not shown in FIG. 18) similar to the arrangements above, or may be connected to an outer surface of the golf club head, as also described above.

The weight may be removed and flipped, rotated, etc. in order to adjust the overall weight arrangement of the golf club head 1800 and adjust the performance characteristics. In the arrangement of FIG. 18, one weight 1840*a* is arranged to adjust weight in a fore/aft matter (e.g., toward the face/front, toward the rear) while the other weight 1840*b* is configured to adjust weight in a high/low matter (e.g., toward the top, toward the sole). Each weight may be adjusted independently of the other in order to customize the performance characteristics of the golf club head 1800.

Additional arrangements including weights that may be adjusted in a fore/aft and high/low manner will be discussed below. It is understood that the weights 1840*a*, 1850*a* may be switched such that the high/low weight member 1850 may be positioned towards the toe and the front/rear weight member 1840*a* may be positioned towards the heel. As further shown in FIG. 18, the club head 1800 may have a channel 1850 extending across the sole of the club head 1850 from a heel to a toe and generally adjacent the ball striking face. The channel allows a certain amount of compression of the club head upon ball impact. This feature may cooperate with the other club head structures and weighting characteristics to further enhance performance of the club.

Figure 19A:
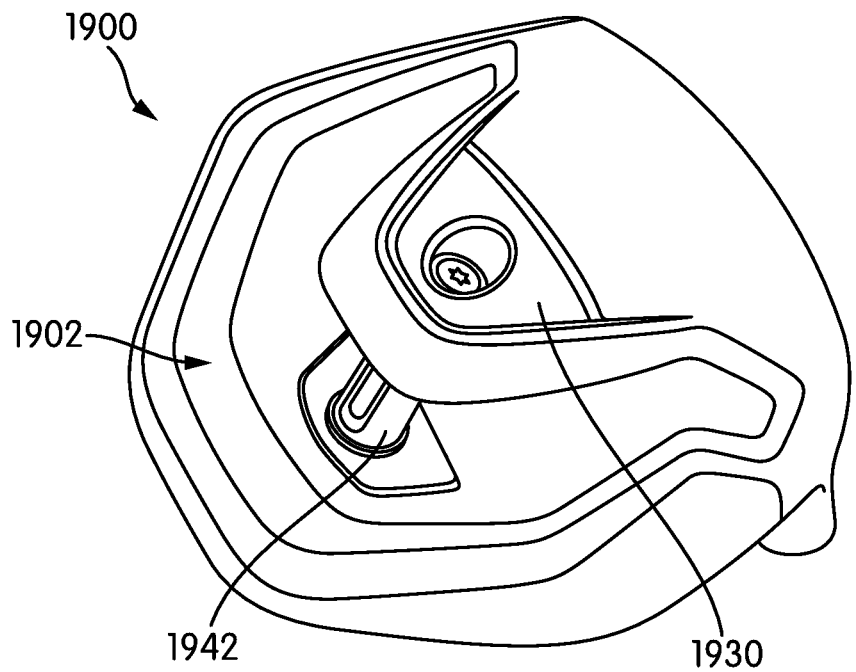
FIGS. 19A and 19B illustrate an example golf club head with adjustable weight arrangement according to one or more aspects described herein.
Figure 19B:
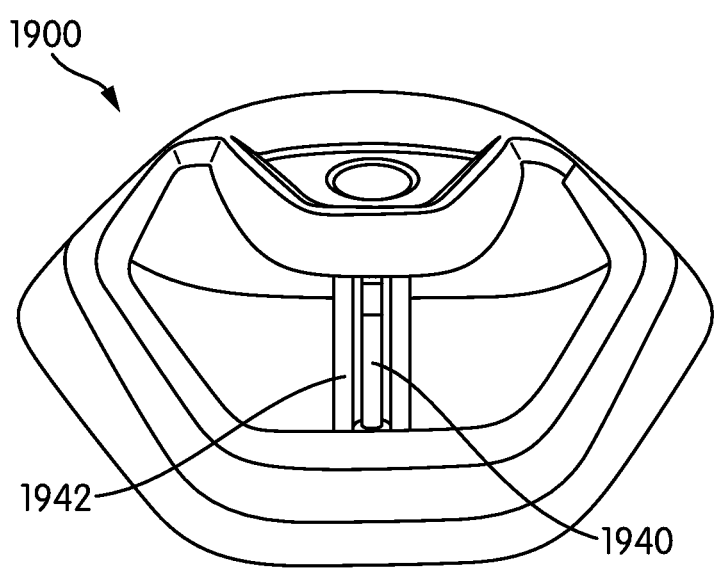

FIGS. 19A and 19B illustrate another alternative golf club head arrangement having a void 1902 formed in the rear of the golf club head 1900 and having an adjustable weight arranged within the void 1902. Similar to the arrangements discussed above, the void 1902 provides ease of access to the adjustable weight arranged in the golf club head 1900. The golf club head 1900 includes an open rear portion with a receiving tube 1942 extending from a sole of the golf club head 1900 toward a top of the golf club head 1900. The club head 1900 has a sole surface 1930 extending from a base of the body proximate the ball striking face towards a rear of the club head body. The sole surface 1930 supports the end of the receiving tube 1942 at the sole. The cover or crown portion of the club head body extends past the sole surface 1930 wherein the sole surface 1930 would not be visible at an address position. Similar to the arrangements discussed above, the receiving tube 1942 may be configured to receive a weight 1940 that may have various weighting characteristics and may be adjustable, removable, rotatable, etc. to adjust the performance characteristics of the golf club head 1900.

Due to the arrangement and location of the void 1902, the weight 1940 may be visible through an open portion of the receiving tube 1942, as shown in FIG. 19B. This may permit a user to identify a position of the weight 1940 within the receiving tube 1942 and determine whether an adjustment of the weight is desirable. As with some arrangements discussed above, the weight 1940 may be held within the receiving tube 1942 via a fastener, such as a threaded fastener. The void 1902 may permit access to the fastener to adjust the weight 1940.

Similar to the arrangements discussed above, the weight 1940 may have ends having different weight characteristics or may be formed of multiple portions that may permit adjustment of the weight distribution associated with the weight 1940.

Figure 20A:
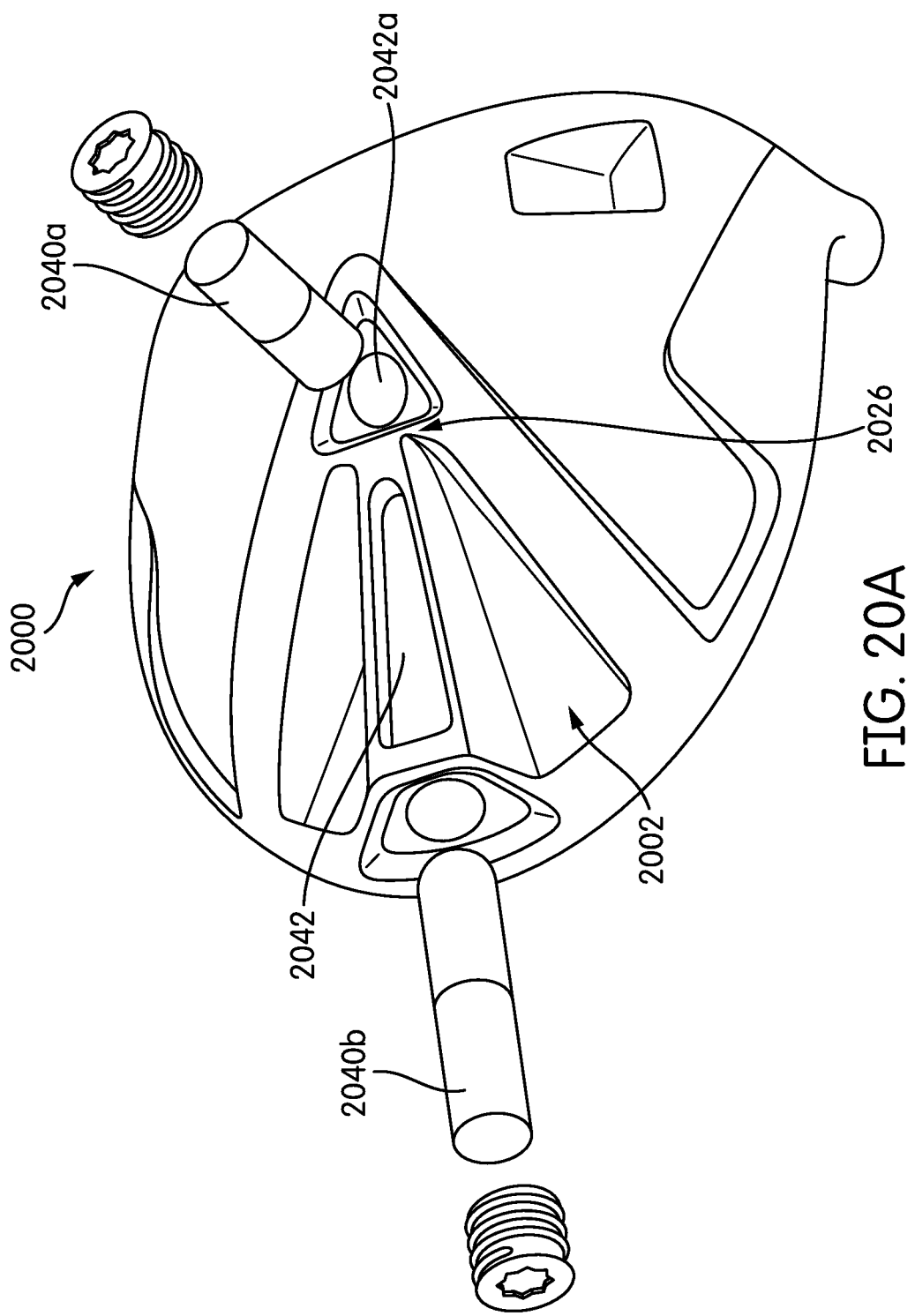
FIGS. 20A and 20B illustrate yet another golf club head and adjustable weight arrangement according to one or more aspects described herein.
Figure 20B:
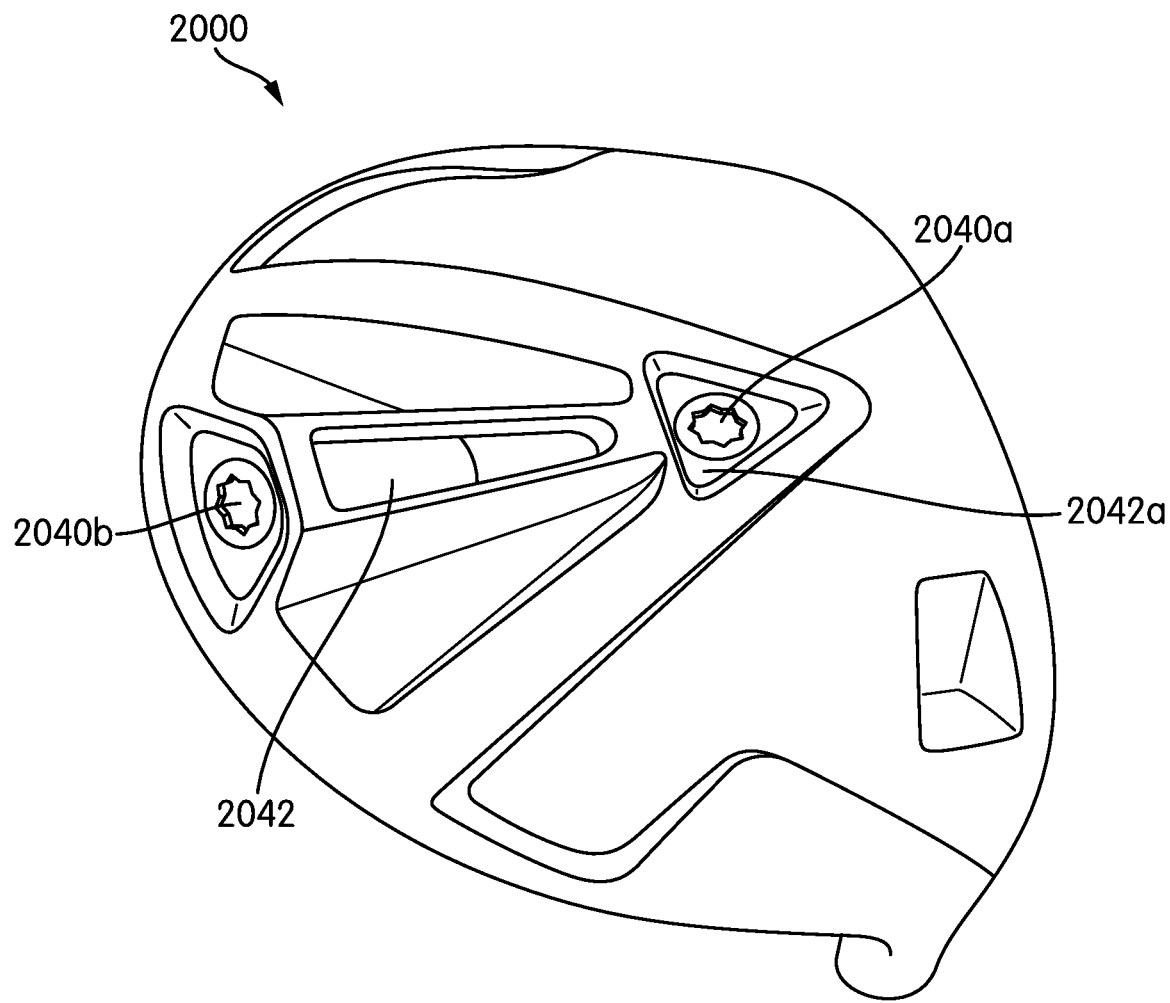

FIGS. 20A and 20B illustrate yet another golf club head arrangement having adjustable weights. The club head 2000 has the pair of spaced legs defining the void 2002 underneath the cover or crown portion of the club head 2000. The weight arrangement shown includes two adjustable weights 2040*a*, 2040*b*, that are received in a first receiver and a second receiver or receptacles respectively. The adjustable weights 2040*a*, 2040*b* may have ends that are weighted differently and also be made from multiple weight members releasably connected together and having various weight values. In an exemplary embodiment, the first receiver is a first receiver tube 2042*a*, and the second receiver is a second receiver tube 2042*b*. The first receiver tube 2042*a* has a vertical configuration positioned proximate an interface area 2026. The second receiver tube 2042*b* has a general horizontal configuration and extends from proximate the first receiver tube 2042*a* towards a rear of the club head 2000. An end of the second receiver tube 2042*b* is connected at the rear periphery of the club head 2000. While two weights are being shown, it is understood that more or fewer weights may be used as desired. Similar to the arrangements discussed above, the weights 2040*a*, 2040*b* may have one end heavier than another end or may be formed of multiple weight portions having different weight characteristics. It is understood that the first receiver tube 2042*a* may be completely encased at the interface area 2026. As can be appreciated from FIGS. 20A and 20B, the second receiver tube 2042*b* extends along the void and has a space or gap defined between the tube 2042*a* and an underside surface of the cover or crown. An opening or open end into the second receiver tube 2042*b* is positioned proximate the rear of the club head 2000. The second receiver tube 2042*b* has a closed end proximate the open end of the first receiver tube 2042*a*.

Similar to certain arrangements discussed above, the weights 2040*a*, 2040*b* are contained within the receiving tubes 2042*a*, 2042*b* in the golf club head 2000. In some examples, the position of the weight 2040*a*, 2040*b* within the receiving tube may be maintained by a fastener, such as a screw or other threaded fastener. The receiving tube may be visible, such as receiving tube 2042*b* or may be contained within a portion of the golf club head 2000 such that it is not visible from an exterior of the club, such as the receiving tube 2042*a* associated with weight 2040*a*.

The weights 2040*a*, 2040*b* may be rotated, removed, adjusted, etc. to adjust the performance characteristics of the golf club head. For example, adjustment of weight 2040*b* may adjust the weight distribution of the golf club head in a front to rear direction. That is, positioning a heavier end of the weight 2040*b* near a front will adjust the overall weight of the club head 2000 toward a front or front face of the golf club. Alternatively, positioning a heavier end of the weight 2040*b* toward a rear of the golf club head 2000 may shift the overall weight of the club head 2000 toward the back or rear of the golf club head 2000.

Weight 2040*a* may also be adjustable, removable, rotatable, etc. to adjust the overall weight characteristics of the golf club head 2000. For instance, the weight 2040*a* may have a heavier end and a lighter end, as described above. As desired, the heavier end or lighter end may be inserted into the first receiving tube 2042*a* first to adjust the weight of the golf club in a high to low direction. That is, inserting the heavier end in first (e.g., toward the crown since the receiving tube is accessed from the sole of the golf club head) may move weight toward a crown of top of the golf club, while inserting the lighter end in first (e.g., toward the crown) will add more weight near the bottom or sole of the golf club.

The weights 2040*a*, 2040*b* may be adjusted independently of each other. Adjustment, rotation, etc. of the weights 2040*a*, 2040*b* may move or adjust the center of gravity of the golf club 2000 as desired. The hybrid arrangement of adjusting weight in both a fore/aft direction and high/low or sole/crown direction may provide for further customization of the weight and/or performance characteristics of the golf club head 2000. It is also understood that the receivers could be supported by pivotable supports providing further adjustment capabilities. It is further understood that the receivers or receptacles have generally longitudinal axes. The weights are received along the longitudinal axes. In certain structures, the longitudinal axis is generally transverse to the ball striking face. In other structures, the longitudinal axis is generally parallel to the ball striking face. In still other structures, the longitudinal axis can be positioned at an angle with respect to the ball striking face.

Figure 21:
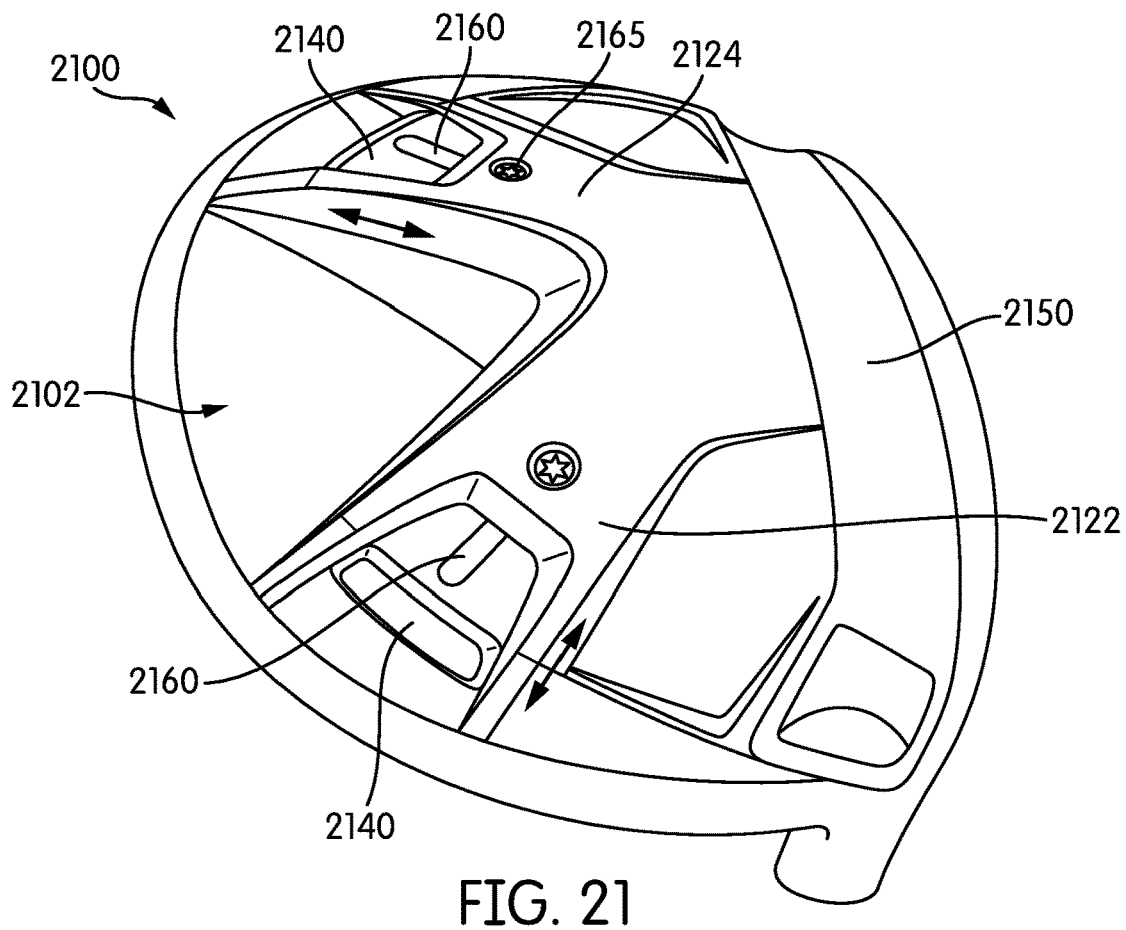
FIG. 21 illustrates yet another golf club head having an adjustable weight arrangement according to one or more aspects described herein.

FIG. 21 illustrates yet another golf club head arrangement. The club head 2100 has the pair of spaced legs defining a void 2102 underneath the cover or crown portion of the club head 2000. The golf club head 2100 includes the void 2102 proximate the rear of the golf club head 2100 and extending towards the central region of the club head 2100. In this embodiment, the void 2102 is formed by the first leg 2122 and the second leg 2124 that are spaced apart to help define the v-shaped void 2102. In some examples, the legs 2122, 2124 may include one or more sliding weights 2140 operably associated with the legs 2122, 2124. To this end, the weights 2140 may be supported by the legs 2122, 2124 in different configurations. In one exemplary embodiment, the first leg 2122 may define a first passageway that receives a moveable weight 2140, and the second leg 2124 may define a second passageway that receives a moveable weight 2140. The passageways may be considered a track defined by the legs 2122, 2124. The sliding weights 2140 may be connected to the golf club head 2100 using screws 2165 or other fasteners that may permit adjustment of the position of the weights 2140. For instance, a fastener 2165 positioned through the legs 2122, 2124 may be received in a slot 2160 on the weight 2140 or other receiving recess positioned along a top of the weight 2140. This cooperative configuration may allow for self-tightening upon rotation of the fastener 2165. The fastener 2165 may maintain the position of the sliding weight 2140 within the leg. To adjust a position of the weight 2140, the fastener 2165 may be loosened and the weights 2140 may be moved into (e.g., toward the front) or out of (e.g., toward the rear) the golf club head 2100 (as indicated by arrows) and the fastener 2165 may be retightened to secure the weight 2140 in the new or adjusted position. The void structure assists in providing the necessary access for adjustment of the weights 2140 along the legs. In an additional alternative arrangement, the legs could also define an internal floor wherein the weights 2140 could be supported by and slide along the floor. A fastener could be provided as a setting mechanism to secure the weight at a desired location along the leg. Additional track mechanisms may also be employed between the weights and the leg structures.

The slot 2160 arrangement may permit the weight 2140 to be secured in infinitely many positions along a length of the legs 2122, 2124. Additionally or alternatively, the slot 2160 may include one or more stops (not shown) which may define positions in which the weight 2140 may be secured and may aid in maintaining a position of the weight 2140. The stops may take various forms and cooperate with the weight 2140 to maintain a position. In one exemplary embodiment, the stop may be a resiliently deflectable material, such rubber, polymer or other elastomeric material in order to maintain the position of the weight in the slot, while permitting movement of the weight along the slot, e.g., by moving the weight over the stop causing the stop to deflect. In other exemplary embodiments, the moveable weight may cooperate with a biasing member to assist in maintaining a position of the weight. The weight may also be able to be changed out with other weights that are heavier or lighter.

In some examples, weights 2140 may have the same or substantially similar weight characteristics. In other examples, the weights 2140 may be different. Further, in some arrangements, the weights 2140 may be removable from the golf club head 2100 and, in some examples, replaced with other weights having different weight characteristics.

Adjustment of the weights 2140 will adjust the performance characteristics of the golf club head 2100. For instance, as the weight is moved inward, toward a front face of the golf club head, the overall weight distribution of the golf club head 2100 will move forward, thereby adjusting the center of gravity of the golf club head 2100. Alternatively, as the weights are adjusted outward, toward a rear of the golf club head 2100, the center of gravity may be shifted toward the rear of the golf club head 2100.

The weights may be adjusted independently of each other. For instance, one weight may be adjusted more forward than the other weight to further adjust the weight distribution, center of gravity, moment of inertia etc. of the golf club head 2100. Further, the v-shaped configuration of the weights 2140 may provide a shift in weight in the fore/aft direction, as described above, but also in a toe/heel direction. In some examples, the weights 2140 may be arranged on an incline which may also result in a high/low weight adjustment when the weights 2140 are moved. The incline of the legs could also be structured to provide an increased combination of high/low and fore/aft weight movement. As further shown in FIG. 21, the club head 2100 may have a channel 2150 extending across the sole of the club head 2100 from a heel to a toe and generally adjacent the ball striking face. The channel allows a certain amount of compression of the club head upon ball impact. This feature may cooperate with the other club head structures and weighting characteristics to further enhance performance of the club.

Figure 22:
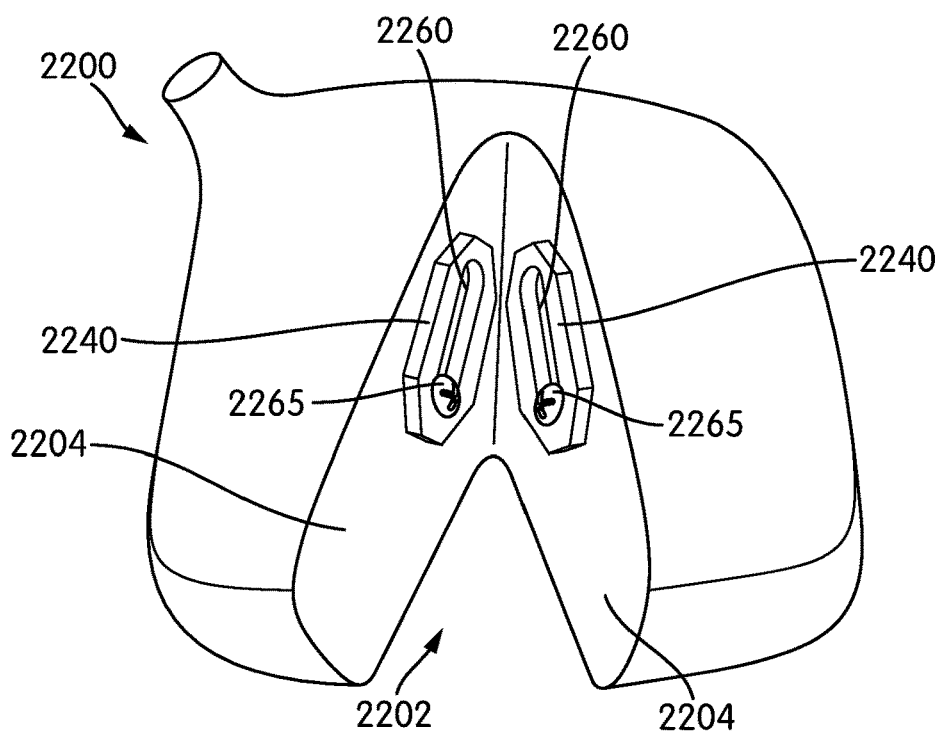
FIG. 22 illustrates still another golf club head and adjustable weight arrangement according to one or more aspects described herein.

FIG. 22 illustrates another golf club head arrangement having a void 2202 formed in a rear of the golf club head 2200. In some examples, the void 2202 may be substantially v-shaped and may include one or more adjustable weight assemblies 2240 positioned within the golf club head 2200 and along sidewalls 2204 of the v-shaped void 2202. Although the arrangement of FIG. 22 includes two adjustable weight assemblies, more or fewer weight assemblies may be used without departing from the invention.

In some examples, the weights 2240 are supported by the legs and may be slidable along the sides 2204 of the void 2202. For instance, a screw or other fastener 2265 may aid in maintaining a position of a weight within a slot 2260 arranged on the sidewalls 2204 of the void 2202. As desired, the fastener 2265 may be loosened and adjusted along the slot 2260, moving the weight fore (toward a face of the golf club head 2200) or aft (toward a rear of the golf club head 2200). Once a desired position is determined, the fasteners 2265 may be tightened to maintain the position of the weight along the slot 2260.

In the arrangement shown, the weight may be positioned anywhere along slot 2260. In an alternate arrangement, one or more stops may be arranged along the slot 2260 to aid in maintaining a position of the weight and to provide finite positions for the weight.

Similar to the arrangement discussed with respect to FIG. 21, the weights may be adjusted along the slots and may move the weight distribution fore and/or aft, and may also adjust weight in a toe/heel direction due to the v-shaped void 2202 and sides 2204 of the void 2202 in which the weights are positioned. This may provide for customization of the weight distribution in multiple directions. Further, the weights may be adjusted independently of each other to further aid in customizing the overall weight distribution of the golf club head in order to adjust the performance characteristics of the golf club head 2200. The weights may also be slidably mounted at various locations on the inner surfaces of the sidewalls 2204 including more towards an interface area at the convergence of the legs, or more towards the rear of the legs and also at various angles along the side walls 2204. In other alternatives, the weights 2240 can be contained within an internal cavity of the club head but configured to be selectively slidable along internal surfaces of the legs. It is understood that the club head 2200 in FIG. 22 can be provided with a cover to extend over the void 2202 and/or the legs.

Figure 23A:
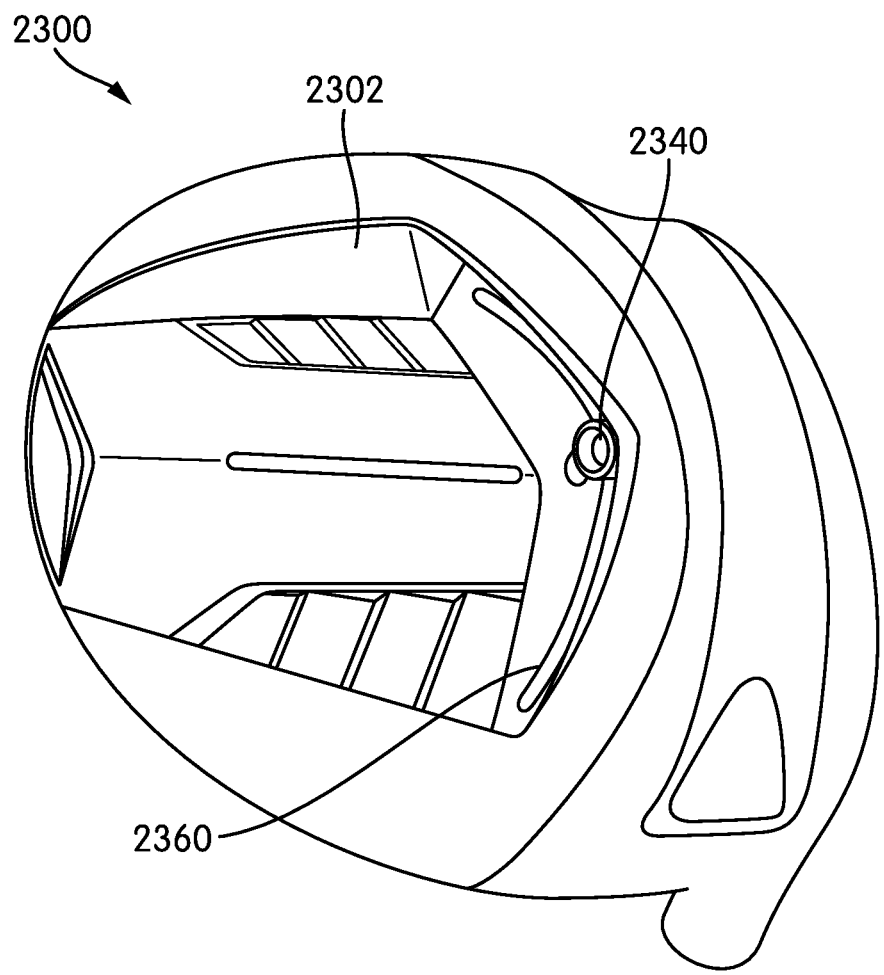
FIGS. 23A-23C illustrate another golf club head and adjustable weight arrangement according to one or more aspects described herein.
Figure 23B:
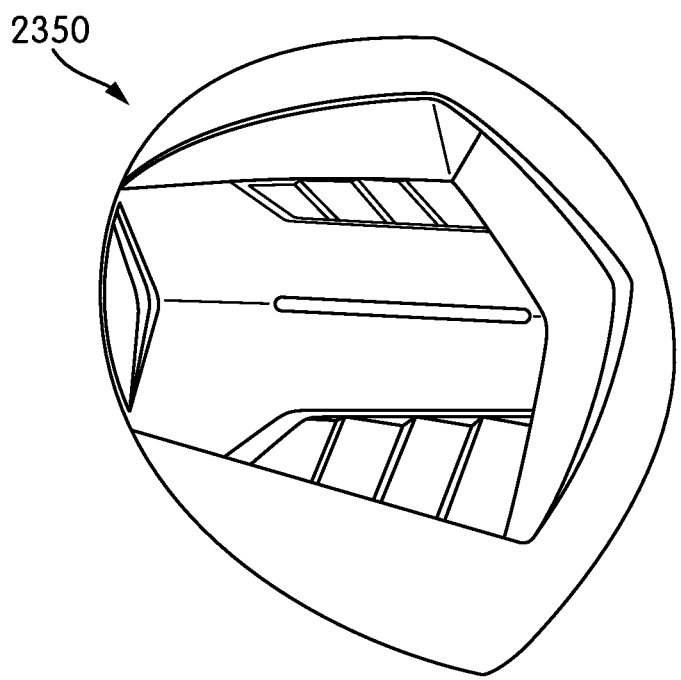
Figure 23C:
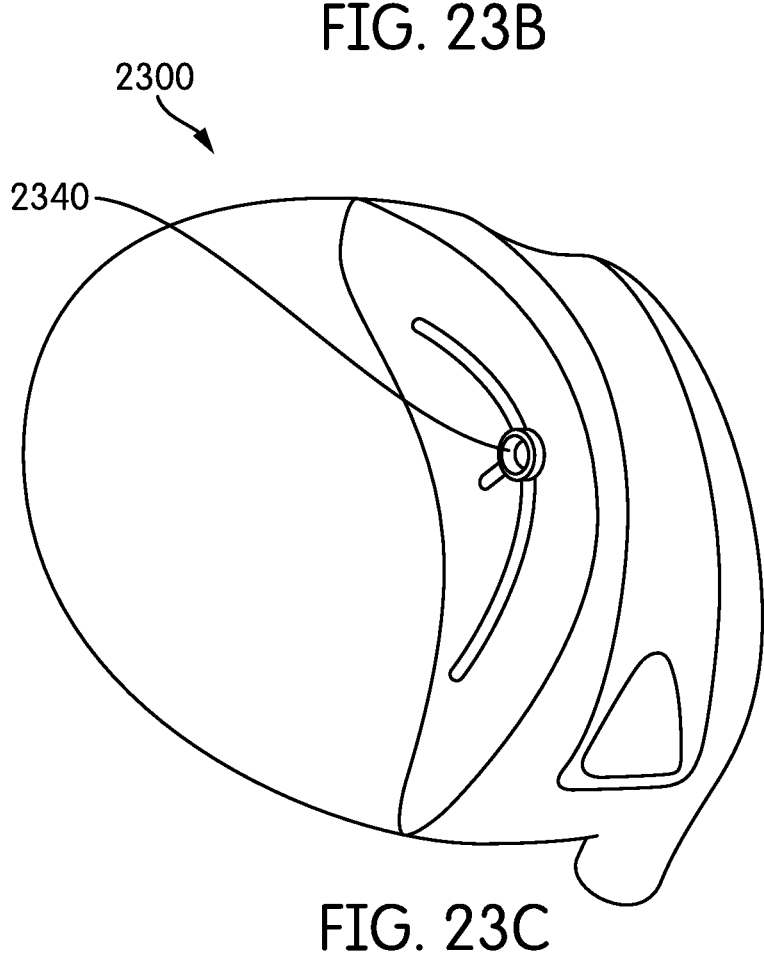

FIGS. 23A-23C illustrate another golf club head arrangement 2300 having a void formed in the rear of the golf club head 2300 and having an adjustable weight arrangement configured therein. The golf club head 2300 includes an adjustable weight 2340 positioned within the void 2302 and accessible via the void 2302. The weight 2340 may slide along a track extending from proximate a toe to proximate a heel. In some arrangements, some or all of the weight 2340 may be arranged within the golf club head 2300 and may not be visible from an exterior of the golf club head. Alternatively, the weight may be arranged on an outer surface of the golf club head 2300, as desired.

In the arrangement of FIGS. 23A-23C, a portion of the weight may be arranged on an interior of the golf club head 2300. However, the weight may be adjusted from an exterior of the golf club head 2300. For instance, the weight 2340 may be adjusted along a track or slot 2360 in order to shift the weight associated with the golf club head from proximate the toe to proximate the heel or vice versa. Although the slot is shown as being curved or arced, various slot arrangements may be used without departing from the invention. For instance, the slot may be generally linear, v-shaped, etc.

Similar to the arrangement described above, the weight 2340 may be threaded or may be adjustable via a threaded fastener and may be maintained in positioned via the threads. In some arrangements, the weight 2340 may have varying shapes and may be held in place via a threaded fastener extending through the slot.

FIG. 23B illustrates a cover 2350 that may extend over a portion of the rear of the golf club head to cover the weight 2340 and slot 2360. The cover may provide a more conventional appearance for the golf club head 2300 and may prevent dirt, debris, etc. from entering the golf club head 2300 via the slot 2360.

FIG. 23C illustrates the golf club head 2300 with the cover removed. As shown, the rear of the golf club head 2300 is generally open and has a substantially planar structure. This open rear structure may aid in reducing overall weight associated with the golf club head 2300. The addition of the cover 2350 may provide the advantage of a golf club head having reduced weight while maintaining the appearance of a conventional golf club head.

Figure 24A:
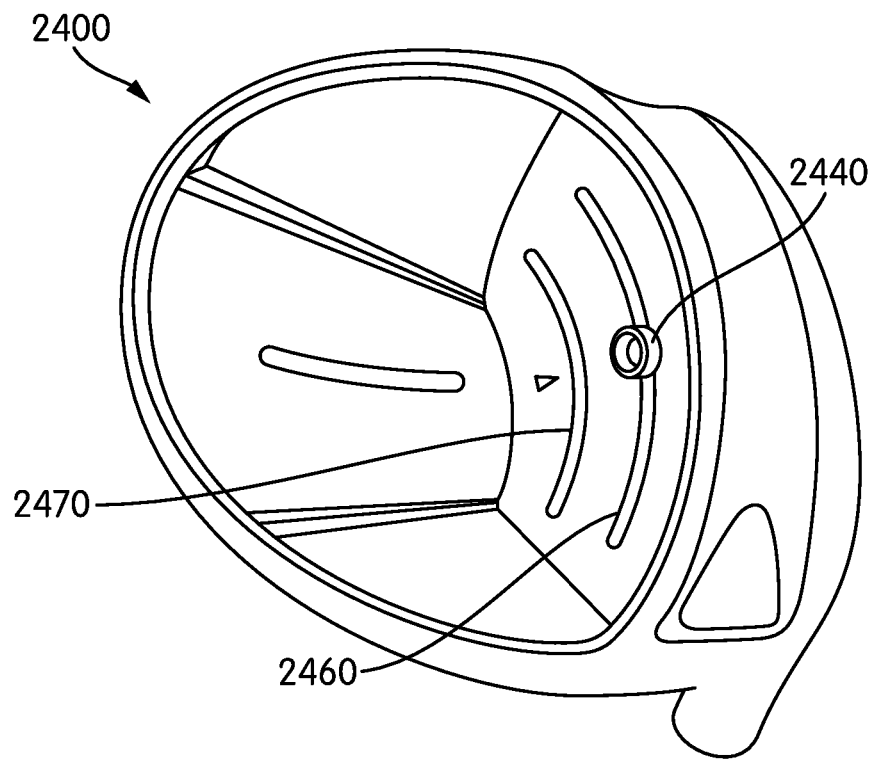
FIGS. 24A and 24B illustrate yet another golf club head and adjustable weight arrangement according to one or more aspects described herein.
Figure 24B:
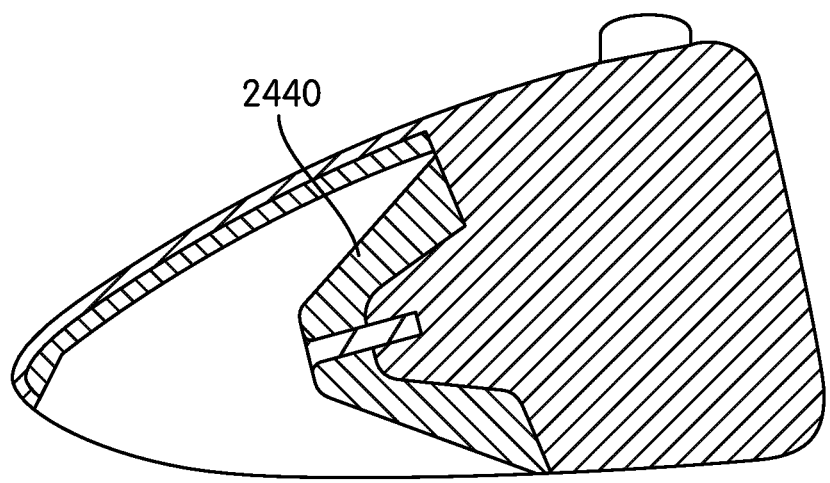

FIGS. 24A and 24B illustrate an arrangement similar to FIGS. 23A-23C including an adjustable weight 2440 that is adjustable along a slot or track 2460. As shown in FIG. 24B, the weight 2440 may have two ends having different weight characteristics. Thus, as the weight 2440 is adjusted along a length of the slot 2460, the weight distribution in a toe/heel direction may be altered, as well as in a high/low direction. The golf club head 2400 may further include a second slot 2470 that may allow for adjustment of another weight (not shown). The club head structure having the void provides for easy access to the weight 2440.

Figure 25A:
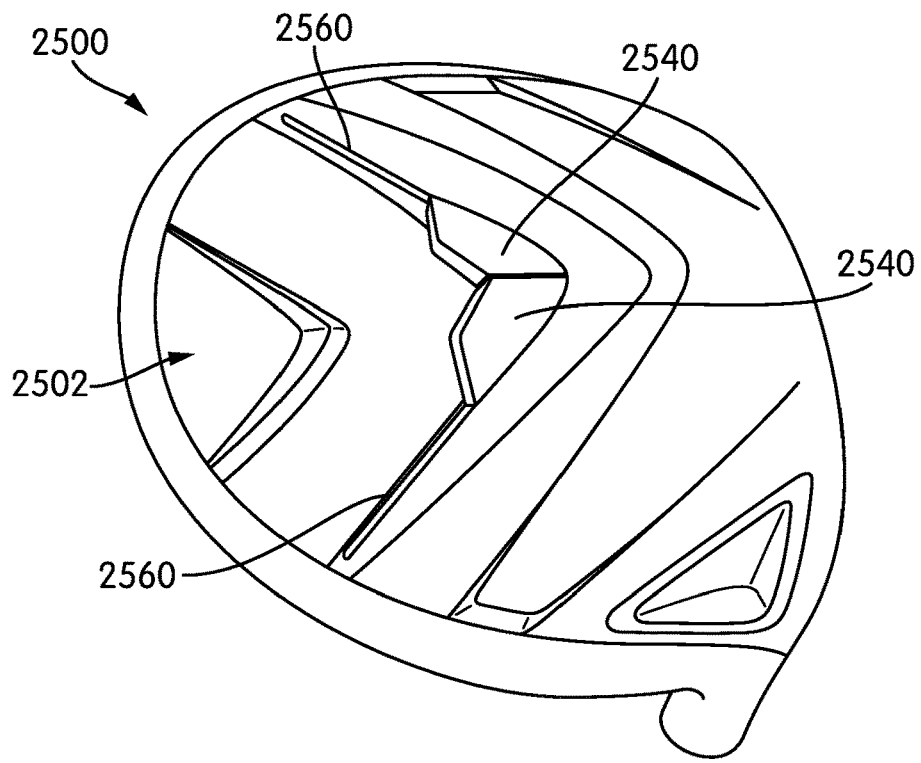
FIGS. 25A and 25B illustrate still another golf club head and adjustable weight arrangement according to one or more aspects described herein.
Figure 25B:
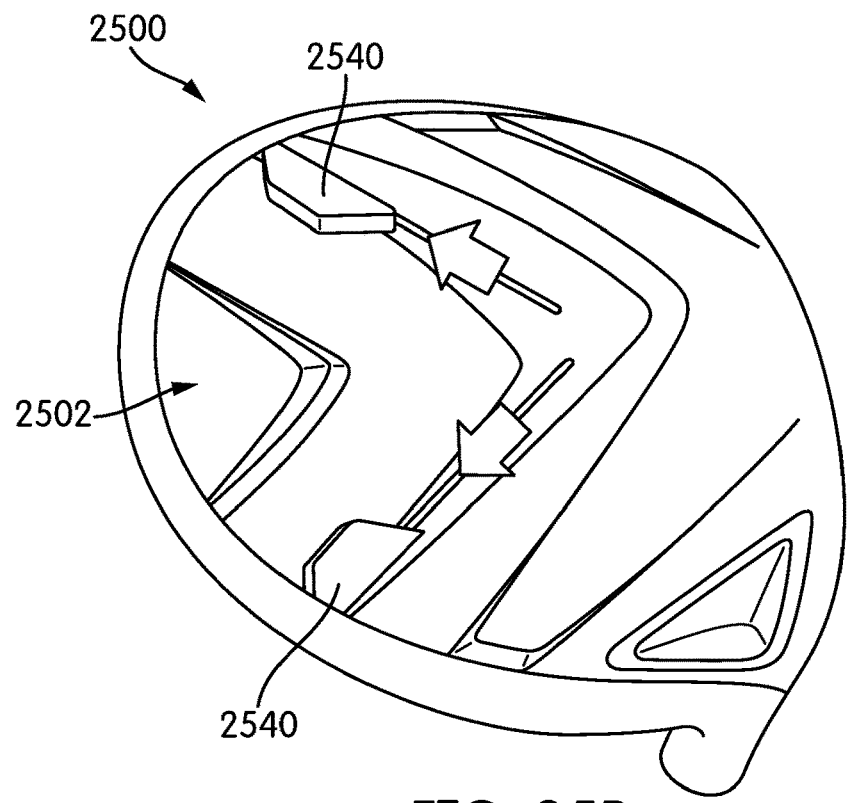

FIGS. 25A and 25B illustrate another golf club head 2500 having a void 2502 formed in the rear of the golf club head and having adjustable weights arranged therein (e.g., along the walls of the void 2502). The golf club head 2500 includes two adjustable weights 2540 arranged along a sidewall of the v-shaped void 2502. More or fewer weights may be used without departing from the invention. In some examples, a portion of the weight 2540 may be arranged within an interior of the golf club head 2500, while a portion may be accessible from the exterior of the golf club head 2500. That may aid in ease of adjustment of the weights 2540.

In some arrangements, the weights 2540 may be slidable, e.g., along a track or slot 2560. For instance, the weights 2540 may have a first position near a base of the v-shaped void 2502 and proximal a front of the golf club head 2500. The weights 2540 may slide outward, from the first position, toward the rear corners of the golf club head 2500 to adjust the overall weight distribution of the golf club head 2500. In some examples, the weights 2540 may be held in place via friction fits, etc. In other examples, one or more stops may be arranged along the slots 2560 and may maintain the position of the weights 2540 until a force exceeding a certain threshold is applied to the weight 2540 and it may be moved beyond the stop. Although the slot 2560 shown is generally linear, the slot may be curved, arced, etc. without departing from the invention.

In some arrangements, the weights may have the same or substantially similar weights or weight characteristics. Alternatively, the weights 2540 may have different weight characteristics. Further, the weights may, in some examples, be adjusted together. For instance, the movement of one weight 2540 along the slot 2560 may also cause a corresponding movement of the other weight 2540 along the slot 2560. Alternatively, the weights 2540 may move independently of each other. The weights 2560 may be secured via friction fits or other mechanical configurations.

Figure 26:
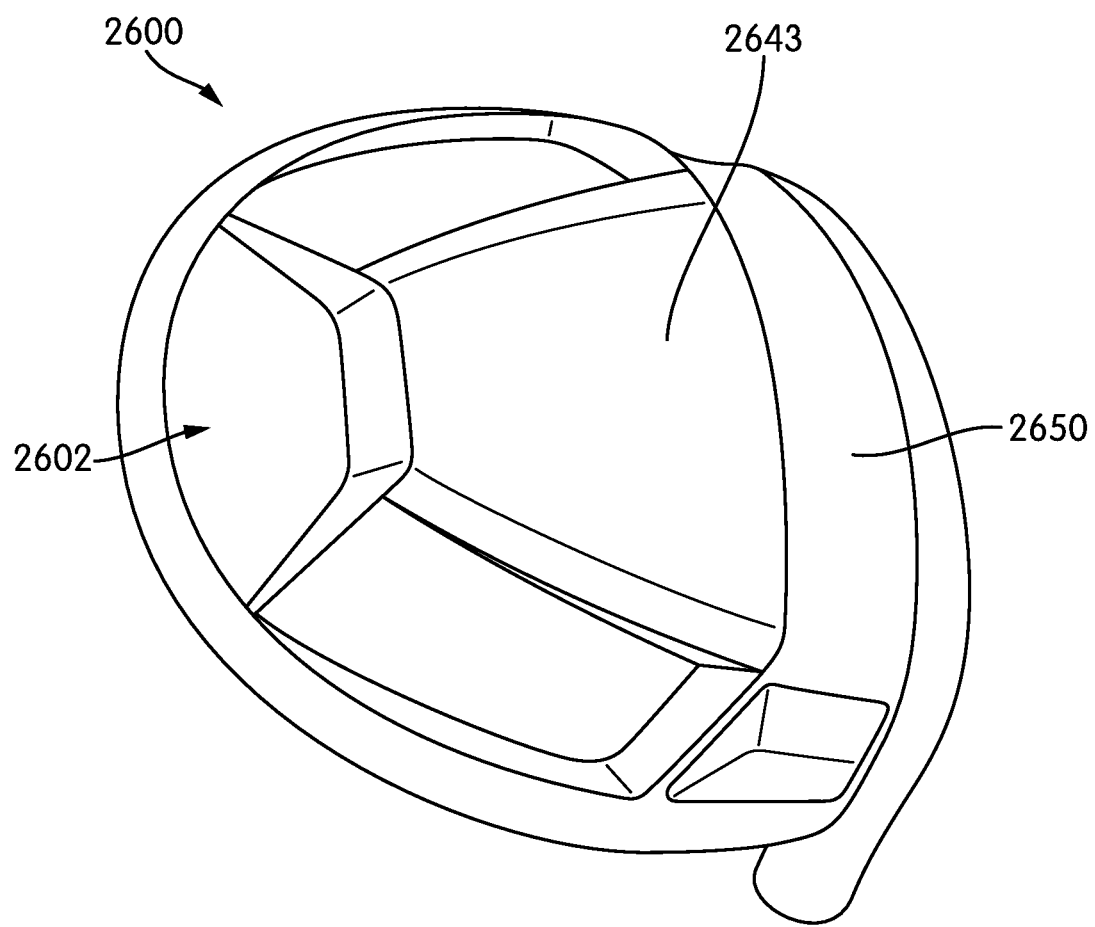
FIG. 26 illustrates yet another golf club head and adjustable weight arrangement according to one or more aspects described herein.

FIG. 26 illustrate another example golf club head 2600 having a void 2602 formed in the rear of the golf club head 2600. A bottom cover 2643 may be used to cover one or more of the adjustable weight arrangements discussed herein. In addition, the golf club head 2600 may include a channel 2650 that further provides performance enhancements to the golf club head 2600 as described above.

Figure 27A:
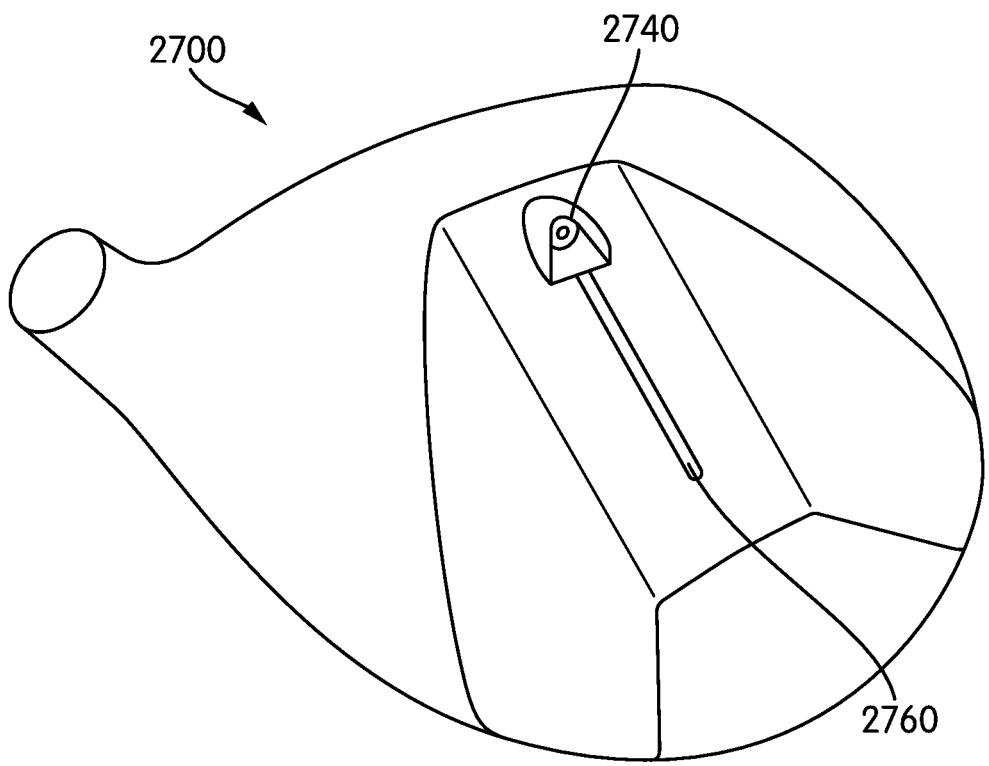
FIGS. 27A and 27B illustrates yet another golf club head and adjustable weight arrangement according to one or more aspects described herein.
Figure 27B:
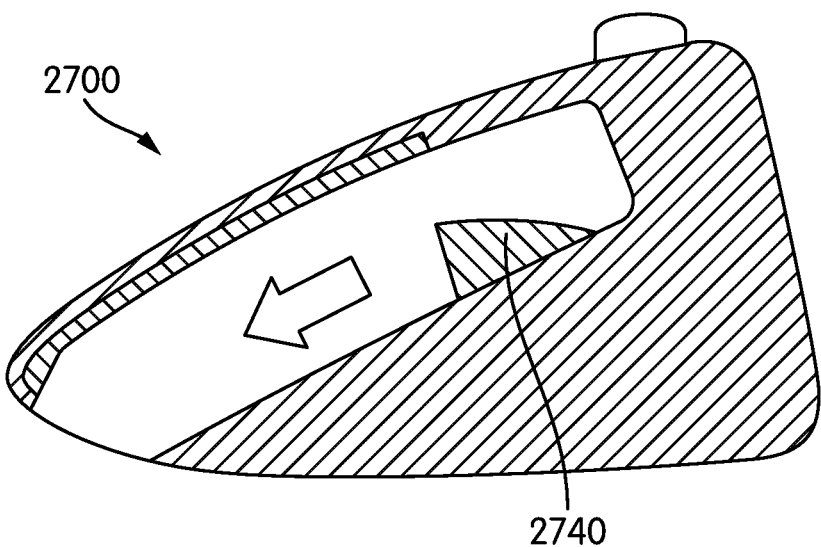

FIGS. 27A and 27B illustrate another example golf club head 2700 having a void and including an adjustable weight 2740. It is understood that a cover to be positioned over the void is not shown in FIG. 27A. Similar to the arrangements discussed above, a portion of the weight may be internal to the golf club head 2700, while a portion of the weight 2740 may be accessible from an exterior of the golf club head. The weight 2740 may be adjustable along a slot or track 2760. In some examples, the weight 2740 may be maintained in position along the slot or track 2760 using a fastener, such as a threaded fastener, that may be loosened to allow for adjustment of the weight 2740. In other examples, the weight 2740 may be held in position using friction fits. In still other examples, one or more stops may be arranged along the slot or track to maintain a position of the weight 2740 until a threshold force is applied to move the weight past the stop.

The weight 2740 may be adjusted up toward the top or crown of the golf club head, or down toward the sole of the golf club head 2700. In some examples, the slot or track 2760 may be inclined (e.g., slanting upward as it extends from the rear toward the front of the golf club head). This inclined slot arrangement may permit adjustment of the weight in both a high/low direction, as well as in a fore/aft direction. FIG. 27B illustrates an interior of the golf club head 2700 as seen from the toe end. The weight 2740 is movable as indicated by the arrow. Thus, in one aspect, the weight is moveable along the track between a position proximate the sole and a position proximate the cover or crown. Movement of the weight will adjust the weight of the club both in the high/low direction (e.g, from crown to sole and vice versa) and the fore/aft direction (e.g., from front to rear and vice versa). Movement of the weight may adjust the overall weight distribution of the golf club head 2700, as well as affect the center of gravity and moment of inertia characteristics of the golf club head.

As can be appreciated from FIG. 27B, a cover member may be used to cover the adjustable weight 2740. The cover may aid in preventing dirt and debris from entering the slot or track 2760. However, the void 2702 formed in the rear of the golf club head 2700 may still provide ease of access to the adjustable weight 2740 when the cover is removed.

Figure 28:
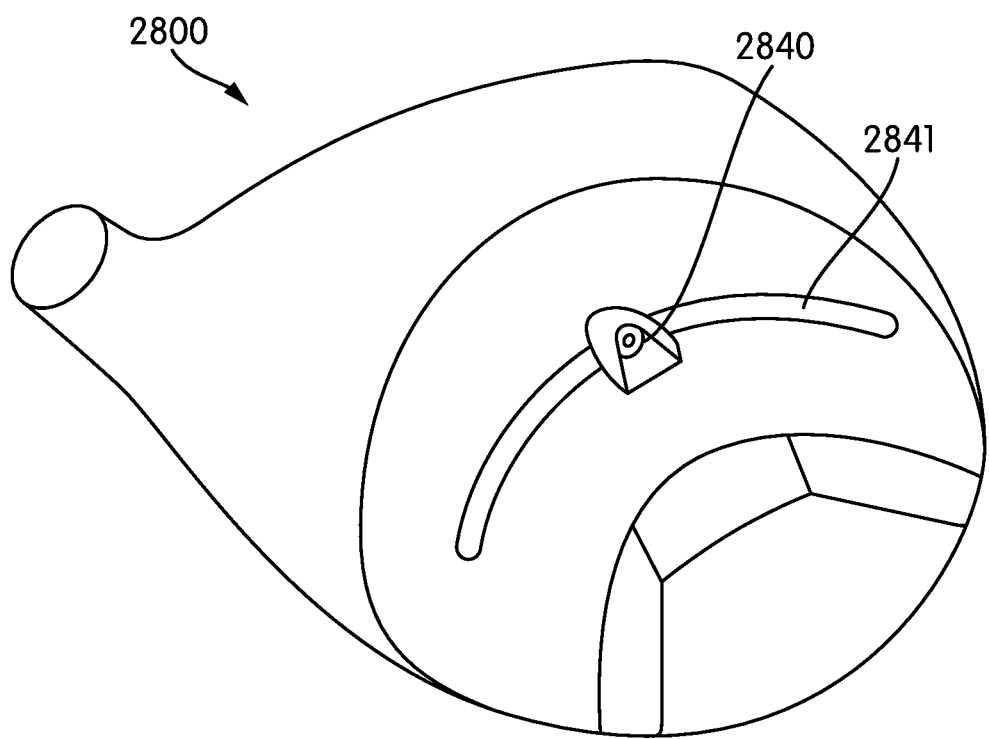
FIG. 28 illustrates yet another golf club head and adjustable weight arrangement according to one or more aspects described herein.
Figure 29:
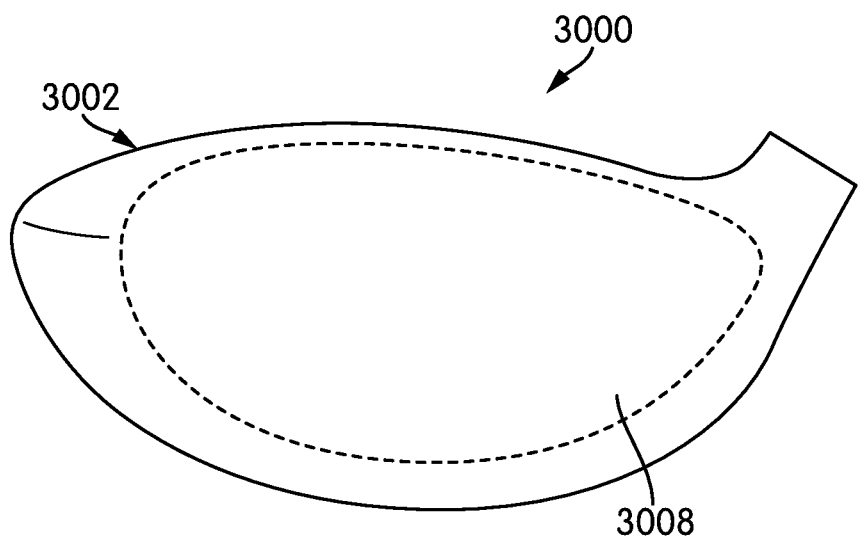
FIG. 29 illustrates another golf club head according to one or more aspects described herein.
Figure 30:
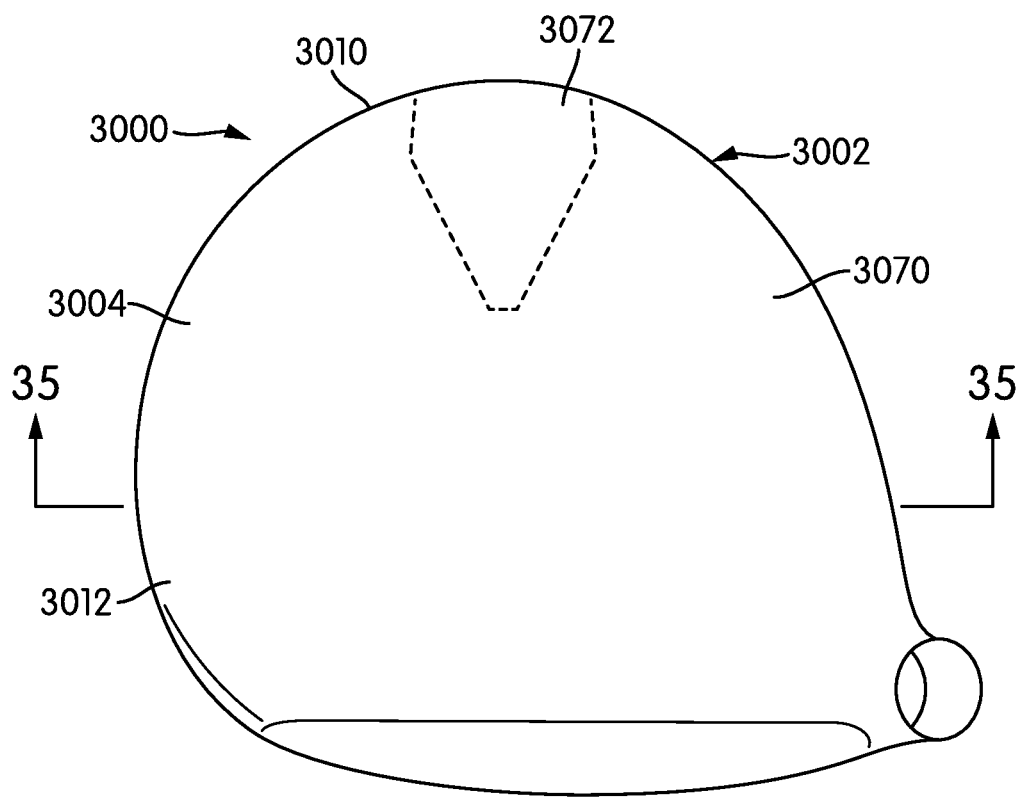
FIG. 30 is a plan view of the golf club head shown in FIG. 29.
Figure 31:
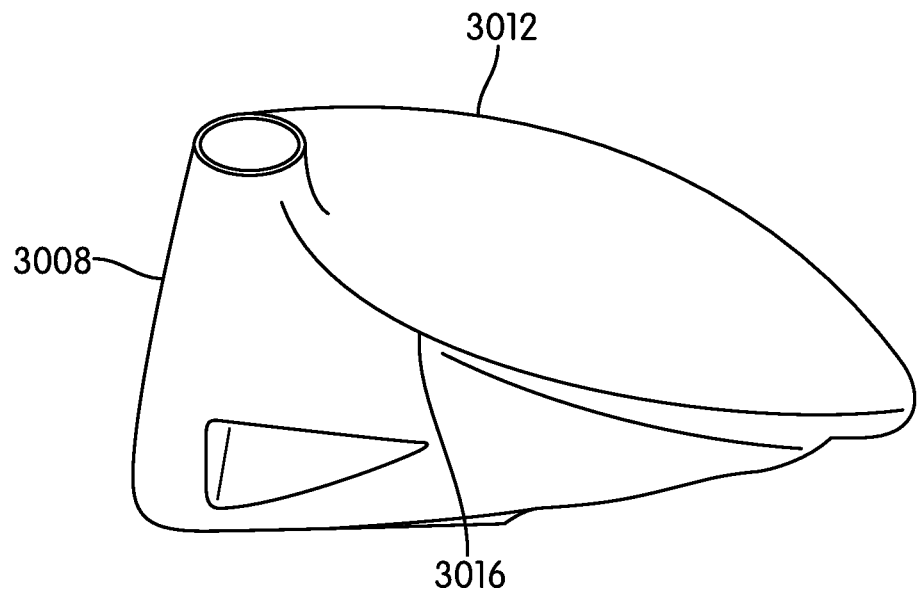
FIG. 31 is a side view of the golf club head of FIG. 29.
Figure 32:
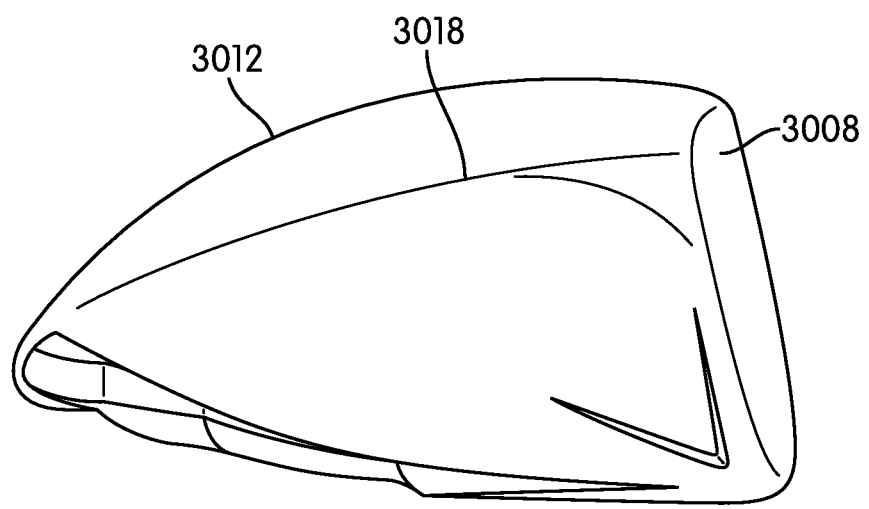
FIG. 32 is an opposite side view of the golf club head of FIG. 29.

FIG. 28 illustrates another adjustable weight arrangement. Similar to some arrangements discussed above, the weight 2840 may be adjustable along track 2841 to move the weight toward the toe or the heel of the golf club head in order to adjust the performance characteristics of the golf club head 2800. The club head 2800 has a void formed therein and it is understood that a cover could be provided to be positioned over the void and weight.

FIGS. 29-44 disclose additional embodiments of the club head according to aspects of the present invention. In particular, FIGS. 29-35 disclose an embodiment of the golf club head according to at least some aspects of the invention, generally designated with the reference numeral 3000. The golf club head 3000 generally includes a golf club head body 3002 and a cover 3004. In this particular embodiment, the cover 3004 is formed as an integral portion of the club head body 3002, such as from a casting manufacturing process. Similar to previous embodiments, the golf club head 3000 has a geometric weighting feature associated therewith. The golf club head 3000 generally has a front or ball striking face 3008, a rear 3010, a top 3012 or crown 3012, a sole 3014, a heel 3016, and a toe 3018. It is further understood that the golf club head body 3002 defines an internal cavity 3019.

Figure 33:
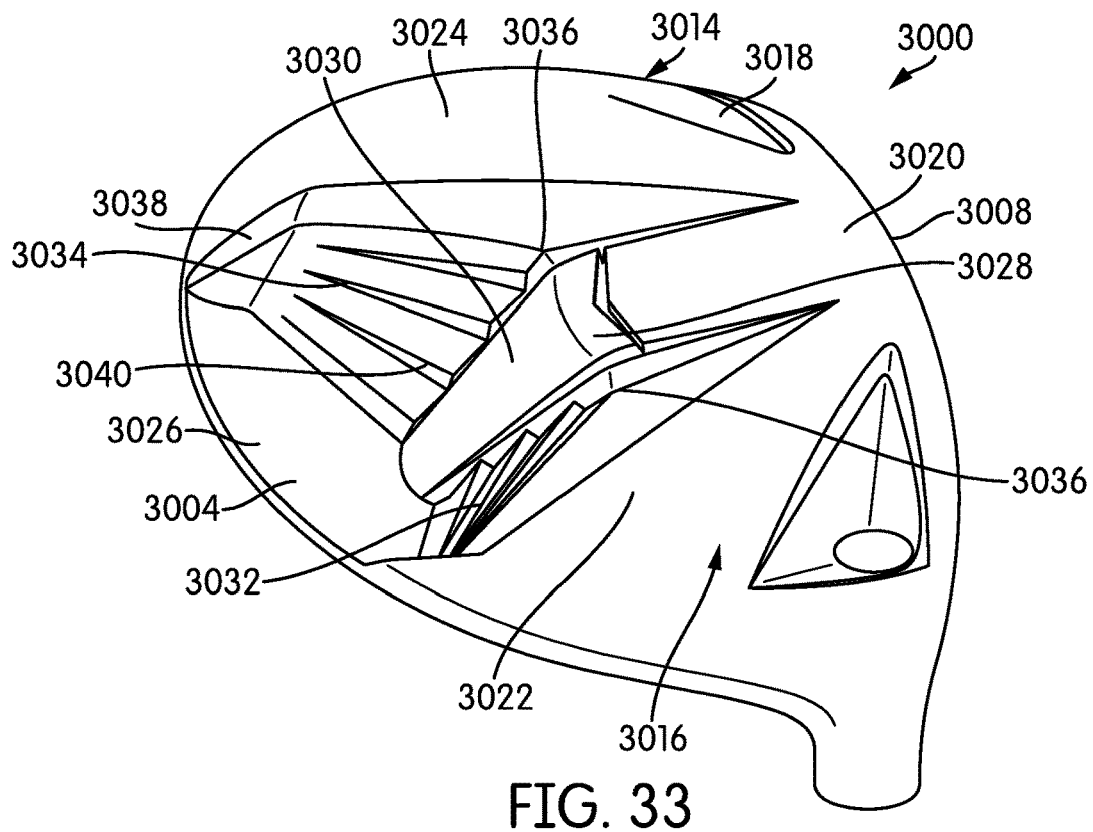
FIG. 33 is a bottom perspective view of the golf club head of FIG. 29.
Figure 34:
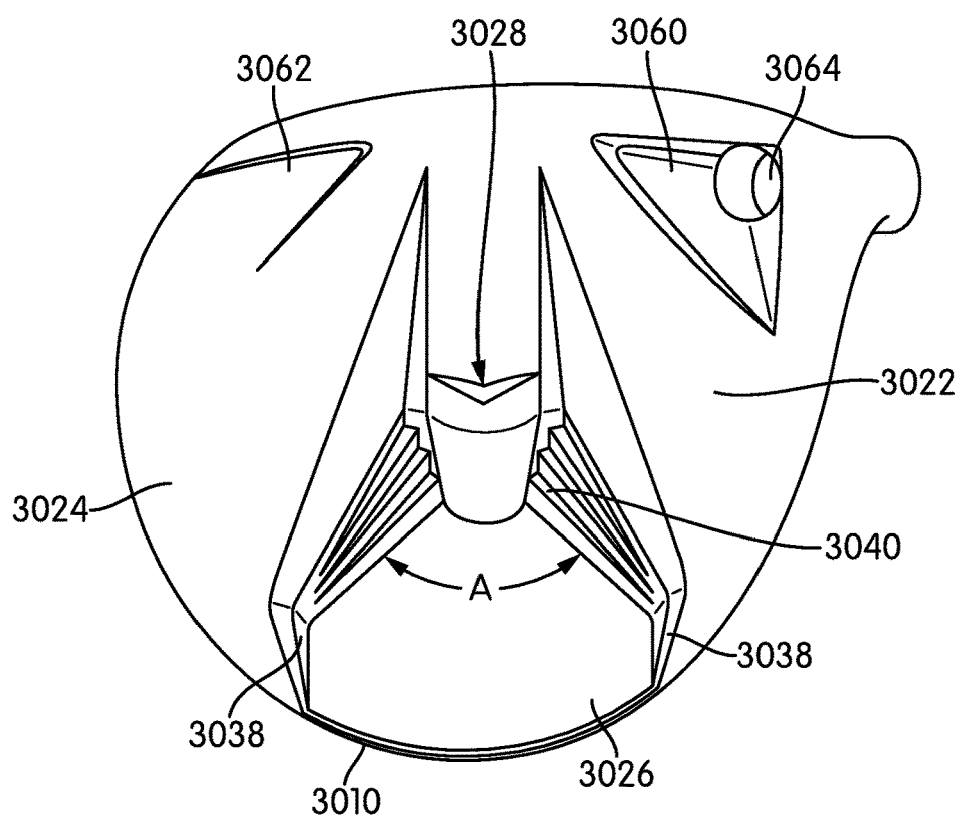
FIG. 34 is a bottom view of the golf club head of FIG. 29.

As shown in FIGS. 29-35, the golf club head body 3002 has a base member 3020 and a first leg 3022 and a second leg 3024. As the club head body 3002 is generally an integral structure in this embodiment, the base member 3020 and legs 3022, 3024 may be considered to depend from the cover 3004. The base member 3020 generally extends from the heel 3016 to the toe 3018 and defines the ball striking face 3008 on one side. The base member 3020 assists in defining a portion of the internal cavity 3019 and in an exemplary embodiment, the internal cavity 3019 extends from an inner surface of the ball striking face 3008 and into the end of the internal areas defined by the legs 3022, 3024 and cover 3064. As can be appreciated from the drawings, the inner surface of the ball striking face 3008 faces into the internal cavity 3019 and is further in communication with portions of the internal cavity 3019 defined by the first leg 3022 and the second leg 3024. The ball striking face 3008 may utilize a variable face construction as described above and be separately connected to the club head body 3002. As shown in FIGS. 33-34, the first leg 3022 extends away from the ball striking face 3008, and the second leg 3024 extends away from the ball striking face 3008. The first leg 3022 and the second leg 3024 extend respectively towards the rear of the club at the heel 3016 and toe 3018 of the club head 3000. In an exemplary embodiment, the legs 3022, 3024 extend consistently from the interface area 3028 towards the rear at the heel 3016 and the toe 3018. Thus, the legs 3022, 3024 extend continuously from the interface area 3028 outwardly towards the heel 3016 and toe 3018 of the club head 3000, and generally in a linear configuration. The legs 3022, 3024 could extend in a non-linear configuration. The legs 3022, 3024 could also extend at different lengths if to achieve further weight distribution and performance characteristics.

The club head 3000 utilizes the geometric weighting feature and in an exemplary embodiment, a void 3026, or space or gap, is defined between the first leg 3022 and the second leg 3024. Thus, it may be considered that this portion of the golf club head is removed to form or define the void 3026. In a further exemplary embodiment the void 3026 is generally v-shaped. Thus, the first leg 3022 and second leg 3024 converge towards one another and generally meet at an interface area 3028. The void 3026 has a wider dimension at the rear 3010 of the club head 3000 and a more narrow dimension proximate a central region of the club head generally at the interface area 3028. The void 3026 opens to the rear 3010 of the club head 3000. In one exemplary embodiment, the interface area 3028 has a height and is positioned proximate a central portion or region of the body 3002 and defines a base support wall 3030. The base support wall 3030 may have a rounded surface that faces into the void 3026. A proximal end of the first wall 3022 connects to one end of the base support wall 3030, and a proximal end of the second wall 3024 connects to another end of the base support wall 3030. It is understood from the figures that the base support wall 3030 can extend between the sole surface and the underside of the cover 3004 in a general vertical configuration. In an exemplary embodiment, the base support wall 3030 extends from the sole surface at an angle from a vertical axis. Thus, the base support wall 3030 could extend along its length towards the rear of the club head or towards the ball striking face. The base support wall 3030 may meet a sole surface of the golf club head 3000 to define a ridge location. An angle A is defined between the legs 3022, 3024 which angle can vary in degree, including a right angle, acute angles or obtuse angles. In one exemplary embodiment, the angle A can be in the general range of 30 degrees to 110 degrees, and more specifically 45 degrees to 90 degrees. It is further understood that the angle A can change from a location proximate the sole to a location proximate an underside of the cover or crown. The angle A could also change along the length of the legs 3022, 3024. The legs 3022, 3024 could also extend from the interface area 3028 at different angles in a non-symmetrical fashion to provide desired performance characteristics. It is further understood that the void 3026 and also the legs 3022, 3024 could be positioned in a rotated configuration about the central region such as rotated more towards the rear heel of the club head or rotated more towards the rear toe of the club head. It is also understood that the interface area 3028 could be positioned at various locations between the heel and toe and the golf club head. While a v-shaped void 3026 is formed, the void 3026 could take other forms including a more u-shaped defined void wherein the interface area 3028 defines a more extended base support wall 3030 that separates the legs 3022, 3024, even if the legs 3022, 3024 extend at an angle or are generally transverse to the ball striking face 3008. It is understood that the base support wall 3030 can vary in width.

With such structures, it is understood that the internal cavity 3019 does not extend completely from an inner surface of the ball striking face to a rear of the golf club head. Thus, the internal cavity is interrupted proximate the central region of the club head 3000. It is further understood that the geometric weighting feature described herein is generally v-shaped wherein a width of the geometric weighting feature proximate the rear is greater than a width of the geometric weighting feature towards the ball striking face.

As further shown in FIGS. 33-34, the first leg 3022 defines a first external side surface 3032 and the second leg 3024 defines a second external side surface 3034. Each side surface 3032, 3034 has a proximal end 3036 positioned at the interface area 3028 and further has a distal end 3038 at the rear 3010 of the club 3000. In an exemplary embodiment, the distal ends 3038 extend inwards from the majority portion of the side surfaces 3032, 3034. As can be appreciated from FIG. 33, inwardly extending the distal ends 3038 of the side surfaces 3032, 3034 shortens the arc of the rear of the club head between the distal ends 3038. This can have a desired effect on the sound characteristics of the golf club head 3000. In still other exemplary embodiments, such desired effects may prompt the distal ends 3039 to extend outward therefore lengthening the arc of the rear between the distal ends 3038. The respective heights of the distal ends 3038 further decrease towards the rear 3010 of the club head 3000. As further shown in FIG. 33, the side surfaces 3032, 3034 have a greater height at the proximal ends 3036 wherein the surfaces extend to a lesser height towards the distal ends 3038. For example, in one exemplary embodiment for a driver type golf club head, the height of the side surfaces 3032, 3034 at the proximal ends 3036 from an underside of the cover 3004 to the sole of the club head proximate the base support wall 3030 is approximately 48-62 millimeters. This height can be considered the depth of the void 3026 proximate the interface area 3028. In one particular driver type golf club head, this height is approximately 52 millimeters while the ball striking face height at a face center of the golf club head is approximately 58 millimeters. In another particular driver type golf club head, this height is approximately 60 millimeters and the ball striking face height at a face center is approximately 62 millimeters. In a fairway type golf club head, this height is approximately 33 millimeters and the ball striking face height at a face center is approximately 35 millimeters. In a hybrid type golf club head, this height is approximately 33 millimeters and the ball striking face height at a face center is approximately 38 millimeters. Generally, this height may be approximately 85%-100% of the ball striking face height at a face center of the golf club head. Such configurations allow the cover or crown geometry to be dimensioned such that the desired performance characteristics of the club head are achieved. The height of the side surfaces 3032, 3034 proximate the distal ends from an underside of the cover 3004 to the sole is generally less at the distal ends 3028.

In one exemplary embodiment, the side surfaces 3032, 3034 each have a plurality of ribs 3040 or ridges extending from the proximal ends 3036 towards the distal ends 3038. Thus, the side surfaces 3032, 3034 have a stepped configuration or undulations. Such structures assist in adding a certain amount of rigidity to the body 3002. It is understood that a single rib 3040 could be used and only a single leg 3022, 3024 could have a rib 3040. Other rigidity-enforcing structures could also be employed on the legs 3022, 3024 or other portions of the golf club head 3000. It is further understood that in exemplary embodiments, the first leg 3022 is generally defined by the first side surface 3032 and the club head body forming the heel of the club head 3000, and the second leg 3024 is generally defined by the second side surface 3024 and the club head body forming the toe of the club head 3000. As can be appreciated from the figures, the sole 3014 of the club head body 3002 may be defined as adjacent the ball striking face 3008, towards the central region of the club head at the interface area 3028 and to the distal ends of the first leg 3022 and the second leg 3024.

Figure 35:
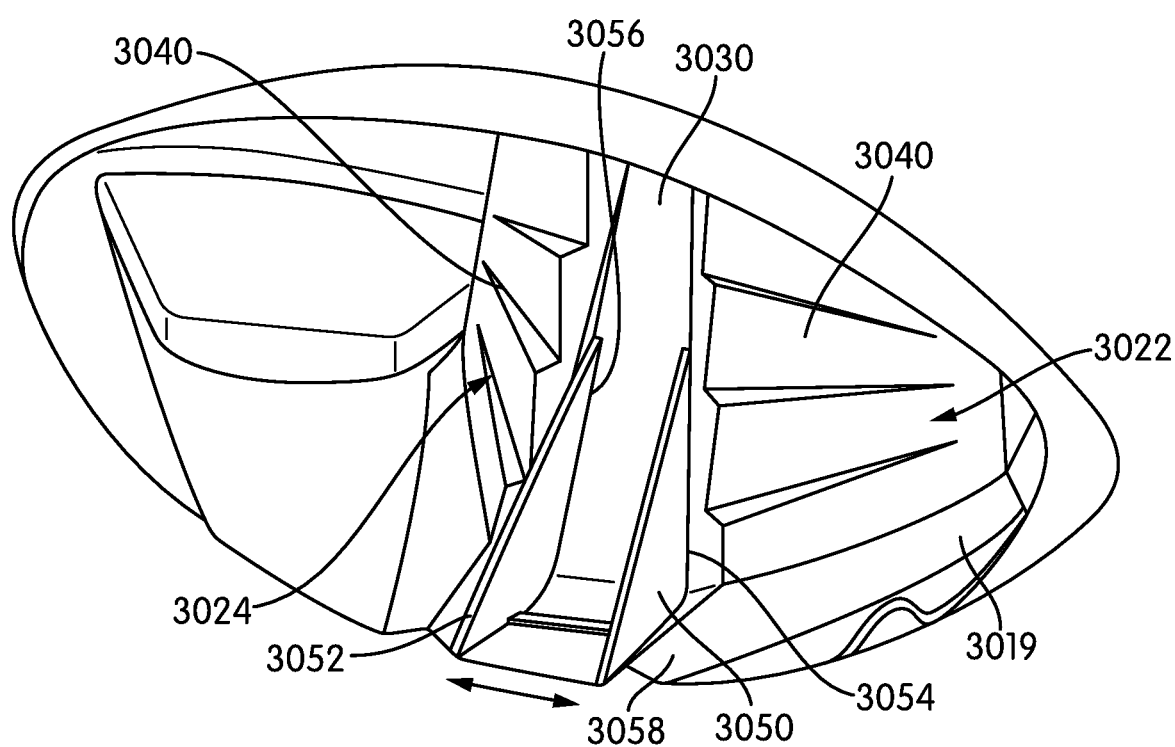
FIG. 35 is a cross-sectional view of the golf club head of FIG. 29, generally taken along line 35-35 in FIG. 30.
Figure 35A:
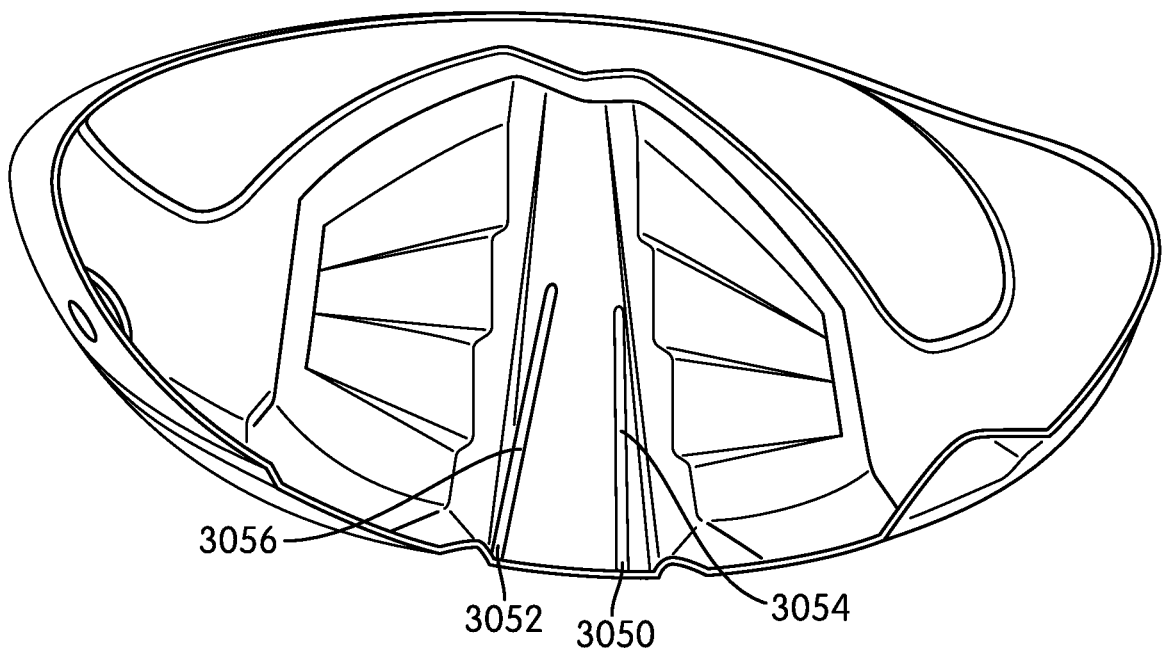
FIGS. 35A and 35B are additional cross-sectional views of the golf club head of FIG. 29.
Figure 35B:
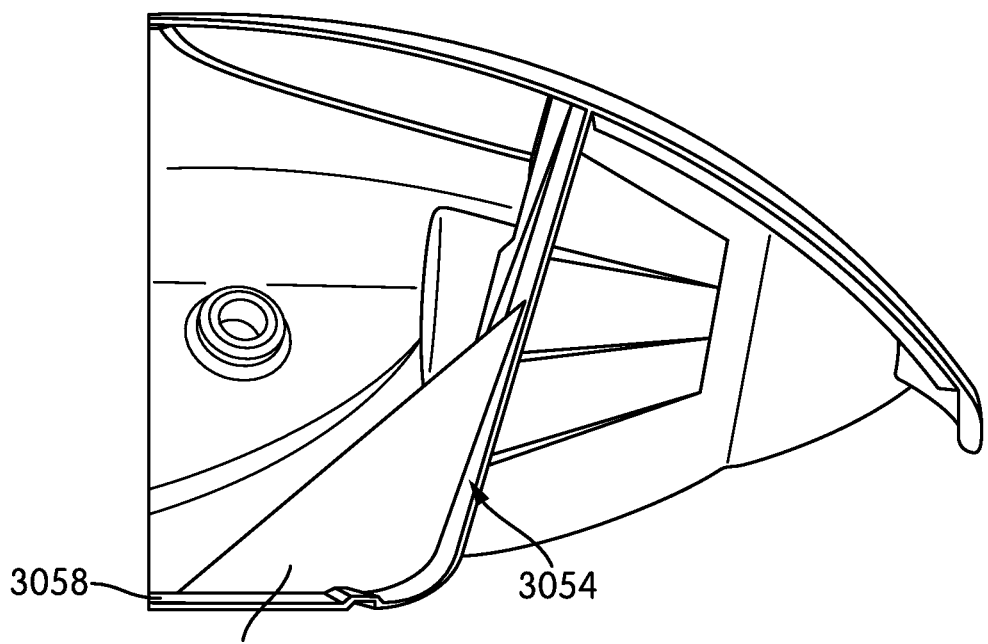

The club head body 3002 defines additional internal support structures in the internal cavity 3019 to enhance features of the club head 3000. The structures may be internal support members, gussets, or fins, positioned in the internal cavity 3019 to provide additional support to components of the club head 3000. Accordingly, as shown in FIG. 35, the club head 3000 includes a first gusset member 3050 and a second gusset member 3052. In an exemplary embodiment, the first gusset member 3050 and the second gusset member 3052 are triangle-shaped members, and generally right triangle members in particular, although it is understood that the gussets 3050, 3052 can have certain contoured outer sides. The gussets 3050, 3052 may have a constant or variable thickness. The first gusset member 3050 is positioned proximate an internal surface of the first leg 3022 and an internal surface of the interface area 3028. The second gusset member 3052 is positioned proximate an internal surface of the second leg 3024 and an internal surface of the interface area 3028. The first gusset member 3050 is in spaced relation to the second gusset member 3052. In particular, the first gusset member 3050 has one side, or first side, connected proximate a first interface junction 3054 of the base support wall 3030 and the first leg 3022, and has a bottom side, or second side, connected to an internal sole surface 3058. Similarly, the second gusset member 3052 has one side, or first side, connected proximate a second interface junction 3056 of the base support wall 3030 and the second leg 3024, and has a bottom side, or second side, connected to the internal sole surface 3058. The gusset members 3050, 3052 generally extend from the base support wall 3030 towards the ball striking face 3008. It is understood that the gusset members 3050, 3052 can be moved inwards and connected on the inner surface of the base support wall 3030. As further shown in FIG. 35, the gusset members 3050, 3052 extend upwards on a portion of the base support wall 3030 at the interface area 3028. This distance can vary and may or may not extend fully to an underside surface of the cover of the club head 3000. Similarly, the gusset members 3050, 3052 are dimensioned to extend along a portion of the internal sole surface 3058, which distance can also vary. FIGS. 35a and 35b show additional views of the gusset members 3050, 3052. In an exemplary embodiment, the gusset members 3050, 3052 diverge on the internal sole surface 3058 as shown by the arrows in FIG. 35 as the members extend towards the ball striking face 3008. As shown in FIG. 35a, it is understood that the gusset members 3050, 3052 may extend vertically up the surface of the base support wall 3030 at an angle. It is further understood that additional support members could be connected between the gusset members 3050, 3052 as desired. It has been determined that based on the particular construction of the club head 3000, upon ball impact, portions of the club head 3000 can flex, such as at the interface area 3028. Sound upon ball impact is also affected with the particular construction of the golf club head 3000.

The first gusset member 3050 and the second gusset member 3052 assist in adding stiffness, rigidity and load strength at the interface area 3028 and limits flexing as desired to provide the desired performance characteristics including acoustic properties. Increased durability is also achieved. The gusset members 3050, 3052 do not add significant additional weight to the golf club head 3000. With such constructions, weight distribution can be further maximized to be moved towards the rear at the heel 3016 and the toe 3018. The configuration of the void 3026 can then also be maximized. These constructions further adjust sound characteristics of the golf club head 3000 upon ball impact to desired frequency levels. It is noted that the sole surface is generally solid at locations where the gusset members engage and extend along the inner surface of the sole. Thus, no other weight port structures are positioned at the gusset members in an exemplary embodiment.

It is understood that additional gusset members could be utilized if desired or gusset members having different configurations than shown could also be utilized. For example, multiple gusset support members could span around different locations at the interface area or inner surfaces of the first leg and second leg. The gusset members 3050, 3052 could also be connected at the internal surfaces of the legs rather than at the interface junctions 3054, 3056. The gusset members could also extend to and be connected to other internal surfaces of the club head. In addition, the gusset members 3050, 3052 could be dimensioned to extend across the interface face area 3028 and against the internal surfaces of the legs 3022, 3024 towards the rear of the golf club head 3000. The gusset members 3050, 3052 are metallic members in one exemplary embodiment but other materials are possible including composite materials. It is further understood that the gusset support members could be cast or otherwise integrally formed with the club head body in the same forming process. The gusset support members can also be formed separately and later connected as described above such as by welding, adhesives or other connection techniques. While the gusset members are shown as triangular members in one exemplary embodiment, the gusset members could take many different shapes and sizes. The gusset members could further have certain cut-out portions or contours as desired.

Figure 36:
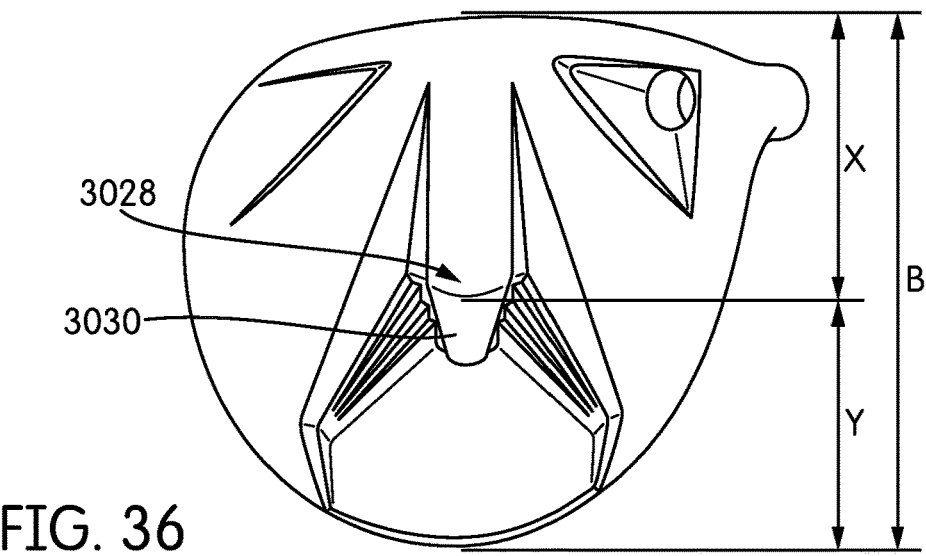
FIGS. 36-38 illustrate further alternative embodiments of the golf club head, similar to the golf club head of FIG. 29, according to one or more aspects described herein.
Figure 37:
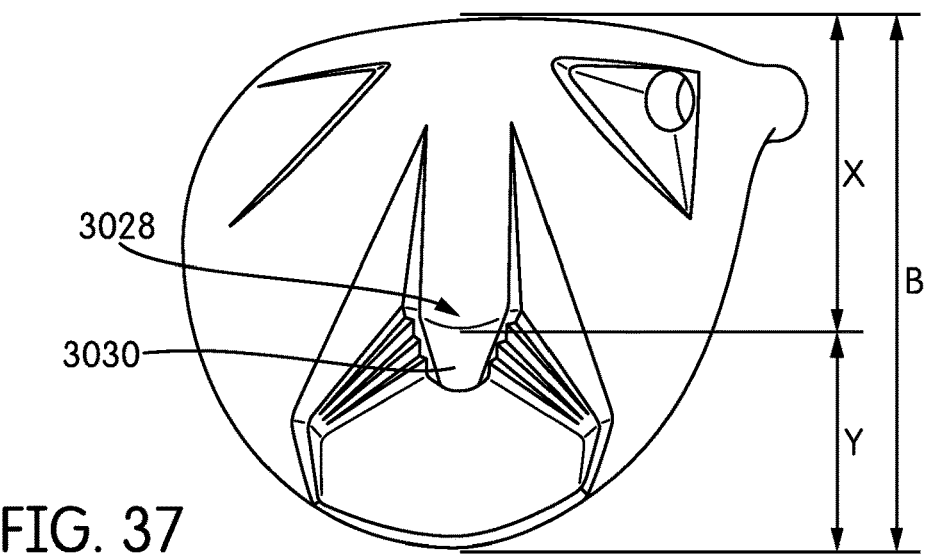
Figure 38:
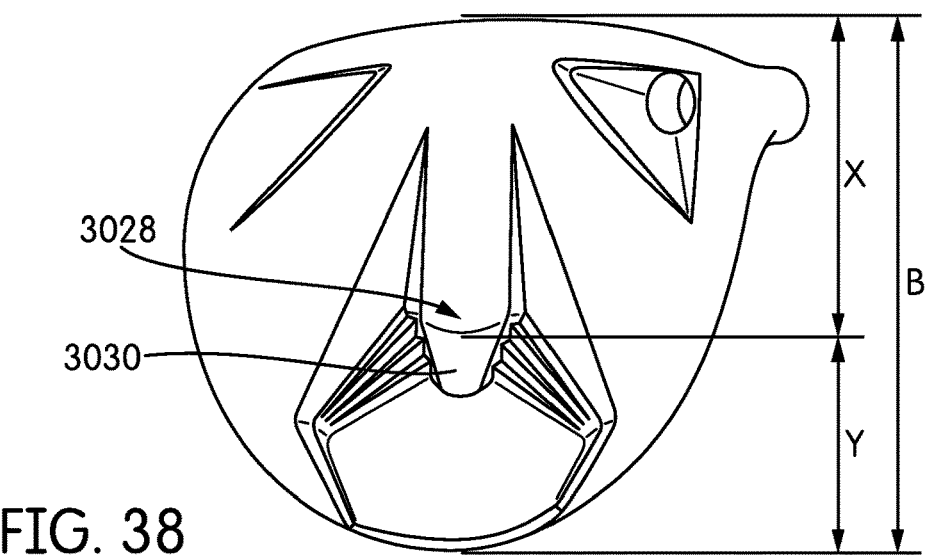
Figure 39:
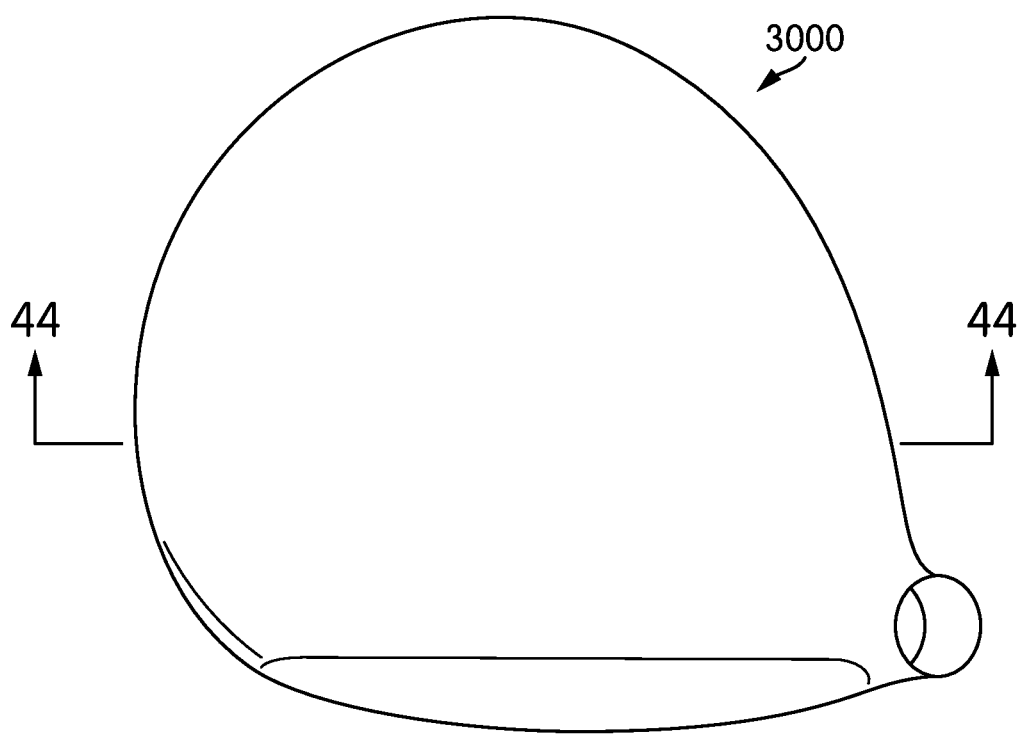
FIG. 39 illustrates another golf club head according to one or more aspects described herein, similar to the golf club head illustrated in FIG. 29.
Figure 40:
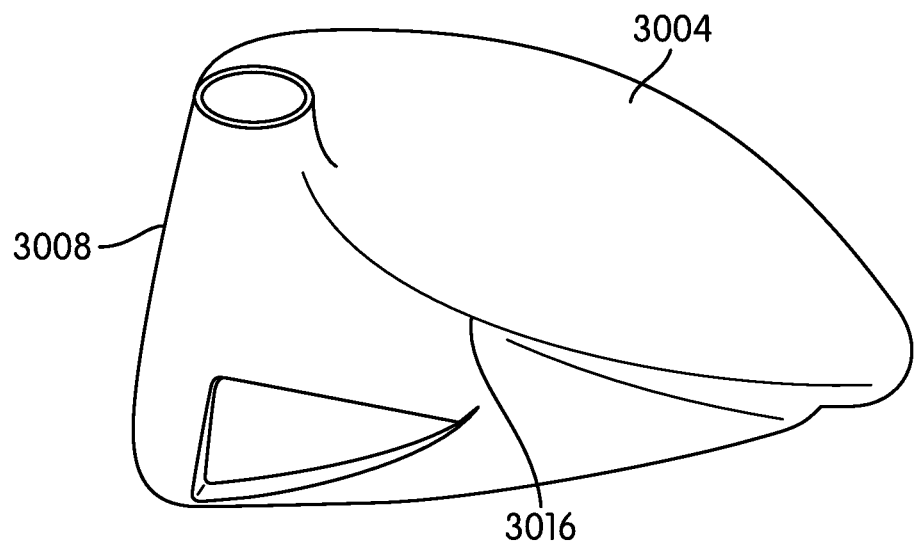
FIG. 40 is a side view of the golf club head of FIG. 39.
Figure 41:
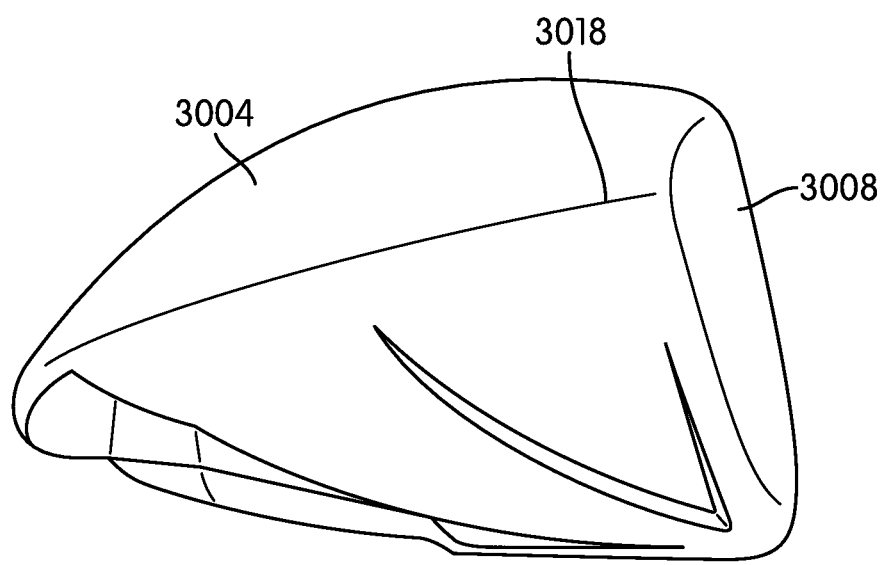
FIG. 41 is an opposite side view of the golf club head of FIG. 39.
Figure 42:
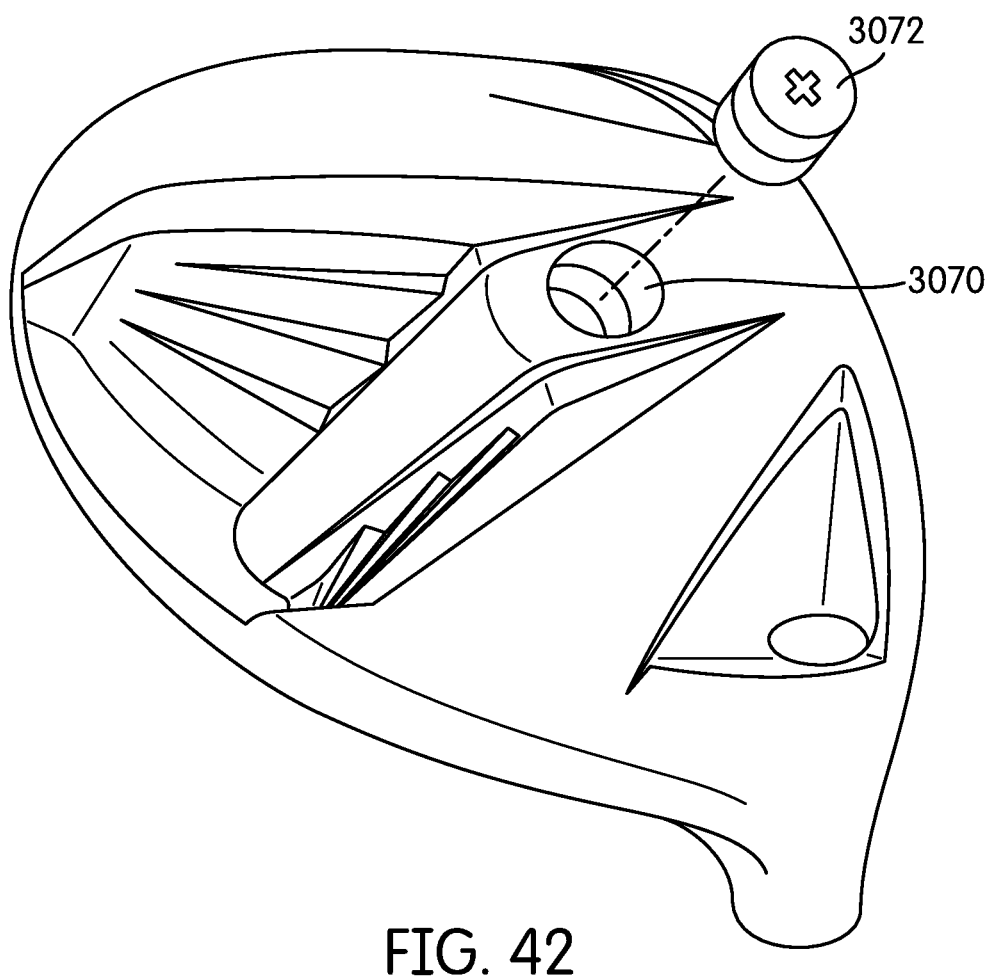
FIG. 42 is a bottom perspective view of the golf club head of FIG. 39.
Figure 43:
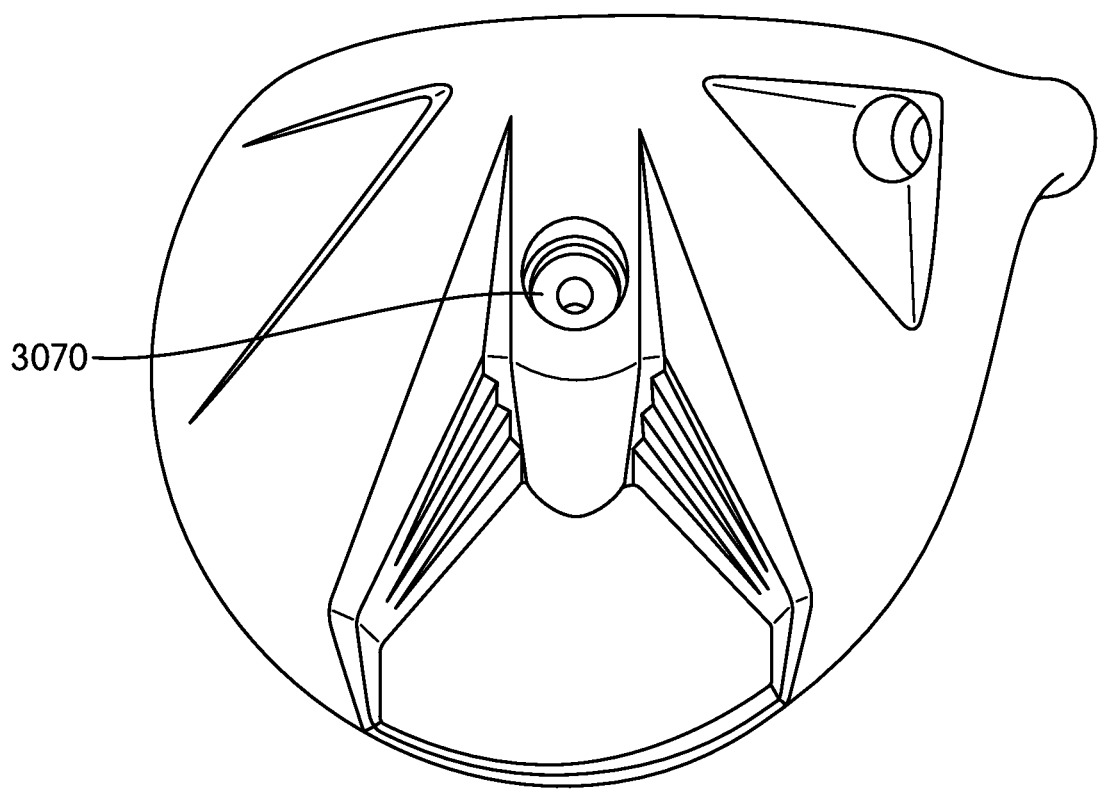
FIG. 43 is a bottom view of the golf club head of FIG. 29.
Figure 44:
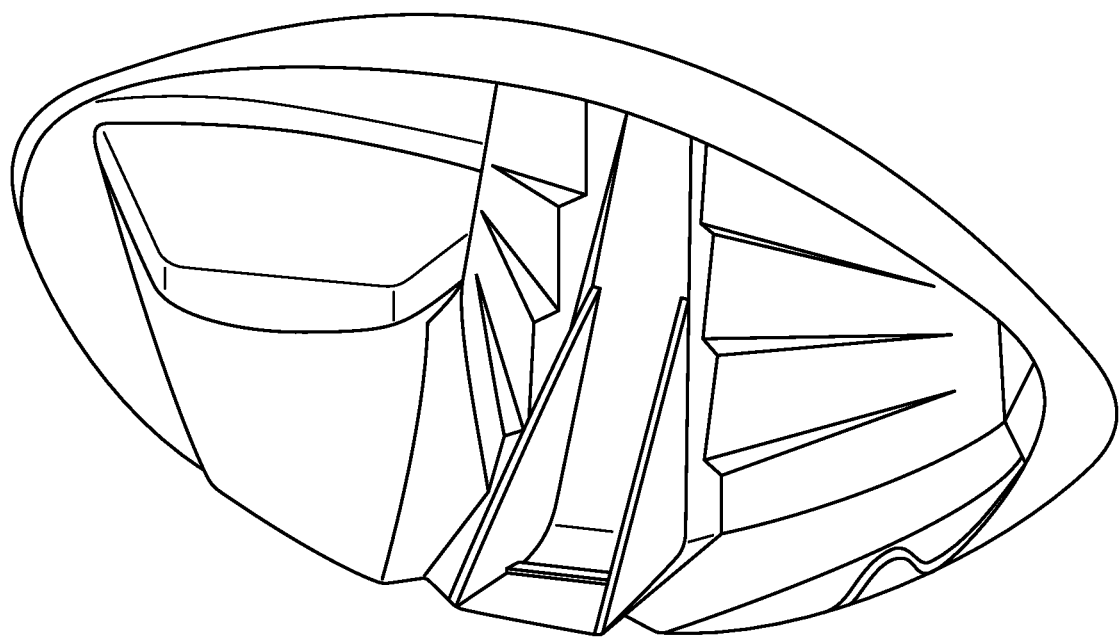
FIG. 44 is a cross-sectional view of the golf club head of FIG. 39, generally taken along line 44-44 in FIG. 39.

As further shown in FIG. 34, the interface area 3028 is positioned at generally a central portion or central region of the club head 3000 between the ball striking face and rear of the golf club head 3000. The club head 3000 has a breadth dimension B generally defined as a distance from the ball striking face 3008 to the rear 3010 of the club 3000. (See, e.g. FIG. 1B). As further shown in FIGS. 36-38, the base support wall 3030 of the interface area 3028, proximate the sole surface, is positioned at approximately "x" distance from the ball striking face 3008. Alternatively, the base support wall 3030 of the interface area 3028, proximate the sole surface, is positioned at approximately "y" distance from the rear 3010 of the golf club head 3000. Considered in an alternative fashion, the interface area 3028 may be positioned at a range of approximately 30%-60% of the breadth B of the club 3000, measured from the ball striking face 3008, or 40%-70% of the breadth B of the club 3000, measured from the ball striking face 3008. In a further exemplary embodiment, this range can be approximately 40%-50% of the breadth B of the club 3000, measured from the ball striking face 3008, or 40%-60% of the breadth B of the club 3000, measured from the ball striking face 3008. In one exemplary embodiment for a driver type club, the overall breadth is approximately 4.365 inches and the distance from the ball striking face to the support wall is approximately 1.875 inches. In another exemplary embodiment for a driver type club, the overall breadth is approximately 4.45 inches and the distance from the ball striking face to the support wall is approximately 2.6 inches. In one exemplary embodiment for a fairway wood type golf club, the overall breadth is approximately 3.375 inches and the distance from the ball striking face to the support wall is approximately 1.5 inches. In another exemplary embodiment for a fairway wood type golf club, the overall breadth is approximately 3.375 inches and the distance from the ball striking face to the support wall is approximately 1.7 inches. In one exemplary embodiment for a hybrid type golf club, the overall breadth is approximately 2.375 inches and the distance from the ball striking face to the support wall is approximately 1.125 inches. In another exemplary embodiment for a hybrid type golf club, the overall breadth is approximately 2.375 inches and the distance from the ball striking face to the support wall is approximately 1.25 inches. From these recited dimensions, the distance y from the rear of the club to the base support wall can be readily determined. It has been found that these dimensions can further have an effect on the club head body flexing upon ball impact and effect the sound characteristics desired for the golf club head 3000. FIGS. 36-38 disclose further alternative embodiments of the golf club head 3000. As shown in FIG. 36, the base support wall 3030 and interface area 3028 are positioned closer to the ball striking face 3008. In FIGS. 37 and 38, the base support wall 3030 and interface areas 3028 are positioned further away from the ball striking face 3008 and closer towards the rear 3010 of the club head 3000. Thus, these embodiments can be utilized depending on the desired characteristics of the club head.

As further shown in FIGS. 33-34, it is understood that the outer, bottom surfaces of the base 3020 and legs 3022, 3024 generally define the sole of the club head 3000. It is further understood that the length of the base 3020 from the ball striking face 3008 to the interface area 3028 could vary as desired. The first leg and/or base has a first recessed area 3060 proximate the heel 3016 of the club head 3000, and the second leg and/or base has a second recessed area 3062 proximate the toe 3018 of the club head 3000. The first recessed area 3060 is further in communication with a bore 3064. The bore 3064 is dimensioned to receive a releasable adjustable connection mechanism for connecting the shaft to the club head 3000 such as via the hosel 104. It is understood that the connection mechanism may be configured to have the ability to adjust loft, face angle and/or lie angle. It is further understood that the connection mechanism could take various different forms and also form a non-adjustable connection that merely connects the shaft to the golf club head in a non-adjustable manner.

FIGS. 29-34 disclose the cover 3004. As discussed, in this embodiment, the cover 3004 is integrally formed as a portion of the club head body 3002 and generally defines the crown 3012 of the club head 3000. The cover 3004 is configured to be connected to and at least cover portions of the club head body 3002. The cover 3004 may have a certain amount of curvature on an outer, top surface. In the exemplary embodiment shown in FIGS. 29-34, the cover 3004 is dimensioned to substantially cover the club head body 3002.

The cover 3004 will cover the void 3026 as well as the first leg 3022 and second leg 3024. The first leg 3022 and the second leg 3024 may be considered to depend from the cover 3004. With such construction, and as shown generally schematically in FIG. 30, a first segment 3070 of the cover 3004 may be considered to be positioned over the internal cavity 3019, and a second segment 3072 of the cover 3004 may be considered to be positioned over the void 3026. The surface area of the first segment 3070 is generally greater than the surface area of the second segment 3072 in an exemplary embodiment. The cover 3004 has a curved outer periphery at a rear that extends over and to just beyond the distal ends of the first leg 3022 and the second leg 3024. In certain exemplary embodiments, the cover 3004 defines the rear of the club having an outermost periphery of the club head. If the club head body 3002 is formed with a recess as discussed above, peripheral portions of the cover 3004 are dimensioned to correspond with the shape of the recess on the club head body 3002. An underside surface of the cover 3004 confronts and is in communication with the void 3026. In addition to sensor mountings as shown in other embodiments, other structures could be mounted on this surface. An underside of the cover facing into the void may have a plaque member adhered thereto via adhesive. The plaque has sufficient rigidity and the adhesive has sufficient resilience to promote a durable bond and vibration dampening characteristics. The plaque materials may be fiber-reinforcement plastics, metals, plastics and the like. The adhesives could be epoxies, silicone adhesives or 3M VHB double-sided tape. The plaque could also have indicia thereon facing into the void. As discussed, the cover could wrap around the sole surface side the golf club to completely encase the void 3026 wherein the void 3026 is not seen from a top or a bottom of the club head. In an exemplary embodiment, however, the cover 3004 extends over the void 3026 and legs 3022, 3024 wherein at an address position; the golf club head 3000 has the appearance of a traditional golf club head and wherein the void 3026 is not visible.

As further shown in FIGS. 29-35, the cover 3004 is integrally formed as a portion of the club head body 3002. In one exemplary embodiment, the club head body 3002 is formed in a casting manufacturing process. In a further exemplary embodiment, the club head body 3002 is cast entirely from titanium. It is understood that other metal materials could be used, or composite materials, or plastic injection molded materials or a combination thereof. With certain materials, additional coating processes may also be used to add additional strength. It is also understood that the ball striking face 3008 is separately connected to the golf club head body 3002, such as in a welding operation. It is further understood that alternative connection mechanisms between the body 3002 and the cover 3004 can also be employed if an integral connection is not employed. The cover 3004 and the club head body 3002 may be connected, joined, fastened or otherwise fixed together (directly or indirectly through intermediate members) via adhesives, cements, welding, soldering or other boding or finishing techniques; by mechanical connectors (such as threads, screws, nuts, bolts or other connectors); interference fits and the like. As can be appreciated, the cover 3004 may be considered to generally form the crown of the club head 3000. Remaining portions of the club head body 3002 define the ball striking surface and the depending legs spaced apart to define the void underneath the cover.

It is understood that the structures of the golf club head 3000 described herein cooperate to form a club head having enhanced characteristics. The void construction provides the ability to distribute weight more towards the rear at the heel and toe. In further exemplary embodiments, the club head 3000 could be structured wherein wall thicknesses of the first leg and second leg can be increased in the manufacturing process to further increase weight towards the rear at the toe and the heel. Wall thicknesses at the distal ends of the legs can be increased to add weight at the rear at the toe and heel. It is further understood that weight members can be internally supported in the legs. Additional structures such as the gusset members provide for the desired amount of rigidity and flexing. The resulting club head provides enhanced performance and sound characteristics.

FIGS. 39-44 disclose another embodiment of the club head according to at least some aspects of the invention, and the club head is also generally designated with the reference numeral 3000. Because of the similarities in structure to the embodiment of the club head shown in FIGS. 29-35, the additional features and differences will be described with the understanding that the above description is applicable to the club head 3000 shown in FIGS. 39-44. In this embodiment, the golf club head 3002 includes a receptacle, or a weight port 3070 on a sole surface of the club head 3000. The weight port 3070 is positioned proximate the interface area 3028 and in particular, at the base support wall 3030 adjacent the void 3026. The weight port 3070 may have internal threads or other further connection structure. A weight member 3072 is provided and may have multiple parts, outer threads or other connection mechanisms. The weight member 3072 may have a certain weight value and may be secured in the weight port 3070. The weight member 3072 may comprise multiple parts connected together to allow adjustability of weight. Using the weight member 3072 in the weight port 3070 allows the golfer to customize the swing weight of the golf club as desired. It is understood that internal support members or gussets are not utilized in this embodiment although such structures could be incorporated if desired.

Several different embodiments of the golf club head of the present invention have been described herein. The various embodiments have several different features and structures providing benefits and enhanced performance characteristics. It is understood that any of the various features and structures may be combined to form a particular club head of the present invention.

The structures of the golf club heads disclosed herein provide several benefits. The unique geometry of the golf club head provides for beneficial changes in mass properties of the golf club head. The geometric weighting feature provides for reduced weight and/or improved weight redistribution. The void defined in the club head can reduce overall weight as material is removed from a conventional golf club head wherein a void is defined in place of such material that would normally be present. The void also aids in distributing weight throughout the club head to order to provide improved performance characteristics. The void provides for distributing weight to the rear corners of the club head, at the toe and the heel. Increases in moment of inertia have been achieved while optimizing the location of the center of gravity of the club head. This can provide a more forgiving golf club head as well as a golf club head that can provide more easily lofted golf shots. In certain exemplary embodiments, the weight associated with the portion of the golf club head removed to form the void may be approximately 4-15 grams and more particularly, 8-9 grams. In other exemplary embodiments, this weight savings may be redistributed to other areas of the club head such as towards the rear at the toe and the heel. In certain exemplary embodiments, approximately 2% to 7.5% of the weight is redistributed from a more traditional golf club head design. In still further examples, the void may be considered to have a volume defined by an imaginary plane extending from the sole surfaces and rear of the club and to cooperate with the side surfaces of the legs and underside portion of the cover. The internal cavity may also have a certain volume. The volumes are dimensioned to influence desired performance characteristics. It is further understood that certain portions of the club head can be formed from alternative materials to provide for weight savings or other weight redistribution. In one exemplary embodiment, the walls defining the void may be made from other materials such as composites or polymer based materials.

As discussed, the weight can be redistributed to more desired locations of the club head for enhanced performance. For example, with the centrally-located void and the legs extending outwardly towards the rear on the heel side and the toe side, more weight is located at such areas. This provides more desired moment of inertia properties. In the designs described herein, the moment of inertia (MOI) about a vertical axis (z-axis) through the center of gravity of the club head (Izz) can range from approximately 1500 gm-cm² to 5900 gm-cm² depending on the type of golf club. In an exemplary embodiment for a driver type golf club, the moment of inertia about a vertical axis (z-axis) through the center of gravity of the club head (Izz) can range from approximately 3800 gm-cm² to 5900 gm-cm², and in a further exemplary embodiment, the Izz moment of inertia can range from 4300 gm-cm² to 5200 gm-cm². In an exemplary embodiment of a fairway wood type golf club, the moment of inertia about a vertical axis (z-axis) through the center of gravity of the club head (Izz) can range from approximately 2000 gm-cm² to 3500 gm-cm², and in a further exemplary embodiment, the Izz moment of inertia can range from 2200 gm-cm² to 3000 gm-cm². In an exemplary embodiment of a hybrid type golf club, the moment of inertia about a vertical axis (z-axis) through the center of gravity of the club head (Izz) can range from approximately 2000 gm-cm² to 3500 gm-cm², and in a further exemplary embodiment, the Izz moment of inertia can range from 2200 gm-cm² to 3000 gm-cm², and in a further exemplary embodiment, the Izz moment of inertial can range from 1800 gm-cm² to 2800 gm-cm². In a particular embodiment utilizing the adjustable connection mechanism in the hosel, the Izz moment of inertia is approximately 4400 gm-cm² to 4700 gm-cm². These values can vary. With such moment of inertia properties, improved ball distance can be achieved on center hits. Also, with such moment of inertia properties, the club head has more resistance to twisting on off-center hits wherein less distance is lost and tighter ball dispersion is still achieved. Thus, a more forgiving club head design is achieved. As a result, golfers can feel more confident with increasing their golf club swing speed.

In addition, the center of gravity of the club head is positioned at a location to enhance performance. In the structures of the exemplary embodiments of the golf club head, the center of gravity is positioned outside of the void location of the club head, and inside the internal cavity or internal volume of the club head. In certain exemplary embodiments, the center of gravity is located between an inner surface of the ball striking face and an inner surface of the base support wall, or within the internal cavity.

In addition, the geometry and structure of the golf club head provides enhanced sound characteristics. With the structure of the crown, geometric weighting feature as well as the internal support members as described above such as in FIGS. 29-44, it has been determined that the first natural frequency of the golf club head, other than the six rigid body modes of the golf club head, is in the range of 2750-3200 Hz. In additional exemplary embodiments, the first natural frequency of the golf club head is at least 3000 Hz. It has been found that golf club head structures providing such a frequency of less than 2500 Hz tend to be displeasing to the user by providing undesirable feel including sound and/or tactical feedback. The structures provided herein provide for increased frequencies at more desirable levels.

In addition, the moveable weight mechanisms employed herein provide additional options for distributing weight providing further adjustability of moment of inertia and center of gravity properties. For example, embodiments described herein providing weights that can be further moved towards the rear of the club head at the heel and toe can provide more easily lofted golf shots. Weights can also be more towards the front of the club head to provide more boring shots, such as those desired in higher wind conditions. Weights can also be positioned more towards a crown or sole of the golf club head in certain embodiments. Such moveable weighting features provide additional customization. Finally, adjustable connection mechanisms can be used with the club heads to provide club head adjustability regarding face angle, loft angle and/or lie angle. Such adjustable connection mechanisms are disclosed, for example, in U.S. Ser. Nos. 61/577,660 and 61/526,325, which applications are incorporated by reference herein. Other adjustable mechanisms could also be used. A further embodiment utilizing the adjustable connection mechanism described above allows the golfer to adjust parameters of the golf club such as loft angle of the golf club. Certain golfers desire a lower loft angle setting such as but not limited to 7.5 degrees, 8 degrees, or 8.5 degrees or even 9 degrees. Such low loft angle settings may provide lower ball spin at ball impact. The moveable weight mechanisms, such as shown in FIGS. 17-20 could be utilized to place a heavier weight low towards a sole of the golf club head. This weighting configuration can provide for increased ball spin at the low loft angle settings. Certain other golfers may desire a higher loft setting such as but not limited to 11 degrees, 11.5 degrees, 12 degrees or 12.5 degrees. Such high loft angle settings may provide higher ball spin at ball impact. The moveable weight mechanism could be utilized to place a heavier weight high towards the top of the golf club head. This weighting configuration can provide for reduced ball spin at the high loft angle settings. Additional moveable weight mechanisms such as provided in FIGS. 20A-20B could provide combinations of high/low and fore/aft weighting configurations to affect performance characteristics and provide particular desired launch conditions at particular loft angle settings.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A golf club head comprising:
   a body comprising a ball striking surface, a crown, a sole, a plurality of sidewalls, a rear, a toe portion, and a heel portion;
   the plurality of sidewalls comprises at least a first sidewall, a second sidewall, and a third sidewall that extends downwardly in a direction from the crown of the golf club head towards the sole of the golf club head;
   the body further comprises a first leg extending away from the ball striking face and a second leg extending away from the ball striking face to form a void;
   the first leg comprises a first side and the second leg comprises a second side;
   the body further includes a cover;
   the first side of the first leg and the second side of the second leg converge toward the ball striking face to form an interface area;
   a weight operably associated with the interface area;
   wherein:

the first sidewall of the plurality of sidewalls is generally parallel to the ball striking face;

the second sidewall of the plurality of sidewalls is substantially vertical and positioned proximal to the toe portion;

the third sidewall of the plurality of sidewalls is substantially vertical and positioned proximal to the heel portion;

the first sidewall, the second sidewall, and the third sidewall form a recessed region in the rear of the body;

the body defines a receiver at the interface area and the weight being received in the receiver.

2. The golf club head of claim 1, wherein the cover extends over the void.

3. The golf club head of claim 2, wherein the receiver is in the form of a receiver tube having a closed end proximate the cover and an open end proximate the sole of the body.

4. The golf club head of claim 1, wherein the weight has a first end and a second end.

5. The golf club head of claim 4, wherein the first end is denser than the second end.

6. The golf club head of claim 5, wherein the weight is positioned in the receiver in a first position such that the first end is positioned at the closed end.

7. The golf club head of 5, wherein the weight is positioned in the receiver in a second position such that the second end is positioned at the closed end.

8. The golf club head of claim 1, wherein the weight is moveable among a plurality of positions.

9. The golf club head of claim 1, wherein the weight comprises a plurality of weight members releasably connected to one another.

10. The golf club head of claim 9, wherein each of the plurality of weight members have different weight values.

11. A golf club head comprising:

a body comprising a ball striking surface, a crown, a sole, a plurality of sidewalls, a rear, a toe portion, and a heel portion;

the plurality of sidewalls comprises at least a first sidewall, a second sidewall, and a third sidewall that extends downwardly in a direction from the crown of the golf club head towards the sole of the golf club head;

the body further comprises a first leg extending away from the ball striking face and a second leg extending away from the ball striking face to form a v-shaped void;

the first leg comprises a first side and the second leg comprises a second side;

the body further includes a cover;

the first side of the first leg and the second side of the second leg converge toward the ball striking face to form an interface area;

a weight operably associated with the interface area;

wherein:

the first sidewall of the plurality of sidewalls is generally parallel to the ball striking face;

the second sidewall of the plurality of sidewalls is substantially vertical and positioned proximal to the toe portion;

the third sidewall of the plurality of sidewalls is substantially vertical and positioned proximal to the heel portion;

the first sidewall, the second sidewall, and the third sidewall form a recessed region in the rear of the body;

the body defines a receiver at the interface area and the weight being received in the receiver.

12. The golf club head of claim 11, wherein the cover extends over the v-shaped void.

13. The golf club head of claim 11, wherein the receiver is in the form of a receiver tube, and wherein the receiver tube includes a closed end proximate the cover and an open end proximate the sole of the body.

14. The golf club head of claim 11, wherein the weight has a first end and a second end.

15. The golf club head of claim 14, wherein the first end is denser than the second end.

16. The golf club head of claim 15, wherein the weight is positioned in the receiver in a first position such that the first end is positioned at the closed end.

17. The golf club head of 15, wherein the weight is positioned in the receiver in a second position such that the second end is positioned at the closed end.

18. The golf club head of claim 11, wherein the weight is moveable among a plurality of positions.

19. The golf club head of claim 11, wherein the weight comprises a plurality of weight members releasably connected to each other.

20. The golf club head of claim 19, wherein the weight members have different weight values.

\* \* \* \* \*